US012435131B2

(12) United States Patent
Tam et al.

(10) Patent No.: US 12,435,131 B2
(45) Date of Patent: Oct. 7, 2025

(54) AGENTS THAT INTERFERE WITH THYMIC STROMAL LYMPHOPOIETIN (TSLP)-RECEPTOR SIGNALING

(71) Applicant: Tavotek Biotherapeutics (Hong Kong) Limited, Hong Kong (CN)

(72) Inventors: Susan H. Tam, Garnet Valley, PA (US); Di Zhang, Hillsborough, NJ (US); Lihua Shi, Wynnewood, PA (US); Man-Cheong Fung, Ringoes, NJ (US)

(73) Assignee: Tavotek Biotherapeutics (Hong Kong) Limited, Hong Kong (CN)

( * ) Notice: Subject to any disclaimer, the term of this patent is extended or adjusted under 35 U.S.C. 154(b) by 942 days.

(21) Appl. No.: 17/625,934

(22) PCT Filed: Jul. 10, 2020

(86) PCT No.: PCT/US2020/041642
§ 371 (c)(1),
(2) Date: Jan. 10, 2022

(87) PCT Pub. No.: WO2021/007533
PCT Pub. Date: Jan. 14, 2021

(65) Prior Publication Data
US 2022/0251186 A1 Aug. 11, 2022

Related U.S. Application Data

(60) Provisional application No. 62/873,051, filed on Jul. 11, 2019.

(51) Int. Cl.

| | |
|---|---|
| *C07K 16/24* | (2006.01) |
| *A61K 39/00* | (2006.01) |
| *A61K 39/395* | (2006.01) |
| *A61K 45/06* | (2006.01) |

(52) U.S. Cl.
CPC ........ *C07K 16/244* (2013.01); *A61K 39/3955* (2013.01); *A61K 45/06* (2013.01); *A61K 2039/505* (2013.01); *C07K 2317/24* (2013.01); *C07K 2317/52* (2013.01); *C07K 2317/565* (2013.01); *C07K 2317/71* (2013.01); *C07K 2317/73* (2013.01); *C07K 2317/76* (2013.01); *C07K 2317/92* (2013.01); *C07K 2317/94* (2013.01)

(58) Field of Classification Search
CPC .............. C07K 16/244; C07K 2317/24; C07K 2317/52; C07K 2317/565; C07K 2317/71; C07K 2317/73; C07K 2317/76; C07K 2317/92; C07K 2317/94; C07K 2317/33; C07K 2317/524; C07K 2317/72; C07K 2317/90; A61K 39/3955; A61K 45/06; A61K 2039/505; A61P 11/06
See application file for complete search history.

(56) References Cited

U.S. PATENT DOCUMENTS

| | | | |
|---|---|---|---|
| 4,683,195 | A | 7/1987 | Mullis et al. |
| 8,163,284 | B2 | 4/2012 | Comeau et al. |
| 2005/0208042 | A1 | 9/2005 | Co et al. |
| 2008/0050368 | A1 | 2/2008 | Celniker et al. |
| 2008/0064856 | A1 | 3/2008 | Warne et al. |
| 2009/0182127 | A1 | 7/2009 | Kjaergaard et al. |
| 2010/0015133 | A1 | 1/2010 | Igawa et al. |
| 2010/0028637 | A1 | 2/2010 | Tavsanli et al. |
| 2011/0123532 | A1 | 5/2011 | Gurney et al. |
| 2016/0069900 | A1 | 3/2016 | Ayanoglu et al. |
| 2016/0289332 | A1 | 10/2016 | Santaguida et al. |
| 2016/0376371 | A1 | 12/2016 | Ravetch et al. |
| 2017/0002077 | A1 | 1/2017 | Tam et al. |
| 2017/0210797 | A1 | 7/2017 | Kretz-Rommel et al. |
| 2017/0320960 | A1 | 11/2017 | Williams et al. |
| 2017/0320967 | A1 | 11/2017 | Yang et al. |
| 2018/0044427 | A1 | 2/2018 | Armstrong et al. |
| 2018/0296669 | A1 | 10/2018 | Parnes et al. |
| 2018/0327489 | A1* | 11/2018 | Edwards et al. ....... C07K 16/24 |

FOREIGN PATENT DOCUMENTS

| | | | |
|---|---|---|---|
| WO | WO-8801649 | A1 | 3/1988 |
| WO | WO-9201047 | A1 | 1/1992 |
| WO | WO-9413804 | A1 | 6/1994 |
| WO | WO-9844001 | A1 | 10/1998 |

(Continued)

OTHER PUBLICATIONS

Angal S., et al. "A Single Amino Acid Substitution Abolishes the Heterogeneity of Chimeric Mouse/human (IgG4) Antibody," Molecular Immunology, 1993, 30(1):105-108.

Bedu-Addo, F.K. et al. "Use of Biophysical Characterization in Preformulation Development of a Heavy-Chain Fragment of Botulinum Serotype B: Evaluation of Suitable Purification Process Conditions," Pharmaceutical Research, Aug. 2004, 21(8):1353-1361.

Bjerkan, L. et al. "Multiple Functions of the New Cytokine-Based Antimicrobial Peptide Thymic Stromal Lymphopoietin (TSLP)," Pharmaceuticals, Jul. 5, 2016, 9(41):1-13.

Bleecker, E.R. et al. "Efficacy and safety of benralizumab for patients with severe asthma uncontrolled with high-dosage inhaled corticosteroids and long-acting $\beta_2$-agonists (SIROCCO): a randomised, multicentre, placebo-controlled phase 3 trial," Lancet, Oct. 29, 2016, 388:2115-2127.

(Continued)

*Primary Examiner* — Misook Yu
*Assistant Examiner* — James Lyle Mclellan
(74) *Attorney, Agent, or Firm* — COOLEY LLP

(57) ABSTRACT

The present disclosure is related to antibodies (e.g., human antibodies) and antigen-binding fragments thereof that specifically bind and neutralize (human) thymic stromal lymphopoietin (TSLP). Such molecules may have modified $F_c$ regions that increase antibody half-life, increase resistance to proteases, and/or reduce ability to interact with $F_c$ gamma receptors. These molecules are useful for treatment of allergic and non-allergic inflammation associated with TSLP-related disorders and diseases.

40 Claims, 10 Drawing Sheets

Specification includes a Sequence Listing.

(56) References Cited

FOREIGN PATENT DOCUMENTS

| | | |
|---|---|---|
| WO | WO-2006023791 A2 | 3/2006 |
| WO | WO-2006028936 A2 | 3/2006 |
| WO | WO-2007096149 A1 | 8/2007 |
| WO | WO-2016194363 A1 | 12/2016 |
| WO | WO-2019126594 A2 | 6/2019 |

OTHER PUBLICATIONS

Bolt, S. et al. "The generation of a humanized, non-mitogenic CD3 monoclonal antibody which retains in vitro immunosuppressive properties," Eur. J. Immunol., 1993, 23:403-411.

Booth, B. et al. "Extending human IgG half-life using structure-guided design," MABS, 2018, 10(7):1098-1110.

Carillo, H. et al. "The Multiple Sequence Alignment Problem," SIAM J. Applied Math. Oct. 1988, 48(5):1073-1082.

Castro, M. et al. "Dupilumab Efficacy and Safety in Moderate-to-Severe Uncontrolled Asthma," New England Journal of Medicine, May 21, 2018, 378:2486-2496.

Castro, M. et al. "Reslizumab for inadequately controlled asthma with elevated blood eosinophil counts: results from two multicentre, parallel, double-blind, randomised, placebo-controlled, phase 3 trials," Lancet Respir Med., May 2015, 3:355-366.

Chothia, C. et al. "Canonical Structures for the Hypervariable Regions of Immunoglobulins," Journal of Molecular Biology, 1987, 196:901-917.

Chu, S. et al. "Inhibition of B cell receptor-mediated activation of primary human B cells by coengagement of CD19 and FcγRIIb with Fc-engineered antibodies," Molecular Immunology, Aug. 8, 2008, 45:3926-3933.

Cianferoni, A. et al. "The importance of TSLP in allergic disease and its role as a potential therapeutic target," Expert Rev Clin Immunol., Nov. 2014, 10(11):1463-1474.

Corren, J. et al. "Tezepelumab in Adults with Uncontrolled Asthma," New England Journal of Medicine, Sep. 7, 2017, 377(10):936-946.

Corren, J. et al. "TSLP: from allergy to cancer," Nature Immunology, Dec. 2019, 20:1603-1609.

Dall'acqua, W.F. et al. "Properties of Human IgG1s Engineered for Enhanced Binding to the Neonatal Fc Receptor (FcRn)," The Journal of Biological Chemistry, Aug. 18, 2006, 281(33):23514-23524.

Datta, A. et al. "Evidence for a functional TSLP signalling axis in fibrotic lung disease," J Immunol., Nov. 1, 2013, 191(9):4867-4879 (31 pages total).

De Monte, L. et al. "Intratumor T helper type 2 cell infiltrate correlates with cancer-associated fibroblast thymic stromal lymphopoietin production and reduced survival in pancreatic cancer," J Exp Med., 2011, 208(3):469-478.

Ebner, S. et al. "Thymic stromal lymphopoietin converts human epidermal Langerhans cells into antigen-presenting cells that induce proallergic T cells," J Allergy Clin Immunol., 2007, 119(4):982-990.

Francis, O.L. et al. "A novel xenograft model to study the role of TSLP-induced CRLF2 signals in normal and malignant human B lymphopoiesis," Haematologica, 2016, 101(4):417-426.

Gauvreau, G.M. et al. "Effects of an Anti-TSLP Antibody on Allergen-Induced Asthmatic Responses," New England Journal of Medicine, May 20, 2014, 370(22):2102-2110.

Gunasekeran, K. et al., "Enhancing Antibody Fc Heterodimer Formation through Electrostatic Steering Effects: Applications to Bispecific Molecules Monovalent IgG," J. Biol. Chem., Jun. 18, 2010, 285(25):19637-19646.

Gupta, S. et al. "Development of a Multidose Formulation for a Humanized Monoclonal Antibody Using Experimental Design Techniques," AAPS PharmSci., 2003, 5(2):1-9.

Headley, MB et al. "TSLP conditions the lung immune environment for the generation of pathogenic innate and antigen-specific adaptive immune responses," J Immunol., Feb. 1, 2009, 182(3):1641-1647.

Hezareh, M. et al. "Effector Function Activities of a Panel of Mutants of a Broadly Neutralizing Antibody against Human Immunodeficiency Virus Type 1," Journal of Virology, Dec. 2001, 75(24):12161-12168.

Hinton, P. et al. "An Engineered Human IgG1 Antibody with Longer Serum Half-Life," The Journal of Immunology, 2006, 176:346-356.

International Search Report and Written Opinion issued in PCT/US2020/041642, mailed on Oct. 19, 2020, 13 pages.

Kay, A.B. "Allergy and Allergic Diseases," New England Journal of Medicine, Jan. 4, 2001, 344(1):30-37.

Kinder, et al. "Engineered Protease-resistant Antibodies with Selectable Cell-Killing Functions." The Journal of Biological Chemistry, Oct. 25, 2013, 288(43):30843-30854.

Knight, D.M., et al. "Pharmacodynamic enhancement of the anti-platelet antibody fab abciximab by site-specific pegylation," Platelets, Nov. 2004, 15(7):409-418.

Koyama, K. et al. "A possible role for TSLP in inflammatory arthritis," Biochemical and Biophysical Research Communications, 2007, 357:99-104.

Labrijn, A. et al., "Efficient generation of stable bispecific IgG1 by controlled Fab-arm exchange," PNAS, Mar. 26, 2013, 110(13):5145-5150.

Labrijn, A. et al. "Therapeutic IgG4 antibodies engage in Fab-arm exchange with endogenous human IgG4 in vivo," Nature Biotechnology, Aug. 2009, 27(8):767-771.

Lefranc, M-P. et al. "IMGT unique numbering for immunoglobulin and T cell receptor variable domains and Ig superfamily V-like domains," Developmental & Comparative Immunology, 2003, 27:55-77.

Leong, S.R. et al. "Adapting Pharmacokinetic Properties of a Humanized Anti-Interleukin-8 Antibody for Therapeutic Applications using Site-Specific Pegylation," Cytokine, Nov. 7, 2001, 16(3):106-119.

Liu, Y.J. et al. "TSLP: An Epithelial Cell Cytokine that Regulates T Cell Differentiation by Conditioning Dendritic Cell Maturation," Annu Rev Immunol., 2007, 25:193-219.

Maa, Y.F. et al. "Aggregation of recombinant human growth hormone induced by phenolic compounds," Int. J. Pharm., 1996, 140:155-168.

MacLennan, D.H. et al. "Structure-Function Relationships in the $Ca^{2+}$-Binding and Translocation Domain of SERCA1: physiological correlates in Brody disease," Acta Physiol. Scand., 1998(Suppl 643):55-67.

Moret F.M. et al. "Thymic Stromal Lymphopoietin, a Novel Proinflammatory Mediator in Rheumatoid Arthritis That Potently Activates CD1c+ Myeloid Dendritic Cells to Attract and Stimulate T Cells," Arthritis & Rheumatology, May 2014, 66(5):1176-1184.

Ortega, H.G. et al. "Mepolizumab Treatment in Patients with Severe Eosinophilic Asthma," The New England Journal of Medicine, Sep. 25, 2014, 371(13):1198-1207.

Park, J.H. et al. "Insight into the role of TSLP in inflammatory bowel diseases," Autoimmunity Reviews, 2017, 16:55-63.

Park, L.S. et al. "Cloning of the Murine Thymic Stromal Lymphopoietin (TSLP) Receptor: Formation of a Functional Heteromeric Complex Requires Interleukin 7 Receptor," The Journal of Experimental Medicine, Sep. 4, 2000, 192(5):659-670.

Pawankar, R. "Allergic diseases and asthma: a global public health concern and a call to action," World Allergy Organization Journal, 2014, 7(12):1-3.

Petkova S.B., et al. "Enhanced Half-Life of Genetically Engineered Human IgG1 Antibodies in a Humanized FcRn Mouse Model: Potential Application in Humorally Mediated Autoimmune Disease," International Immunology, Dec. 2006, 18(12):1759-1769.

Piliponsky, A.M. et al. "Thymic Stromal Lymphopoietin Improves Survival and Reduces Inflammation in Sepsis," American Journal of Respiratory Cell and Molecular Biology, Aug. 2016, 55(2):264-274.

Quentmeier, H. et al. "Cloning of human thymic stromal lymphopoietin (TSLP) and signaling mechanisms leading to proliferation," Leukemia, 2001, 15(8):1286-1292.

Reche, P.A. et al. "Human Thymic Stromal Lymphopoietin Preferentially Stimulates Myeloid Cells," The Journal of Immunology, 2001, 167:336-343.

(56) References Cited

OTHER PUBLICATIONS

Remmele, R.L. et al. "Differential Scanning Calorimetry: A Practical Tool for Elucidating Stability of Liquid Biopharmaceuticals," Biopharm., Jun. 2000, 13:36-46.
Remmele, R.L. et al. "Interleukin-1 receptor (IL-1R) liquid formulation development using differential scanning calorimetry," Pharm. Res., 1998, 15(2):200-208.
Ridgway, J. et al. "Knobs-into-holes engineering of antibody $C_H3$ domains for heavy chain heterodimerization," Protein Engineering, 1996, 9(7):617-621.
Rizos, C.V. et al. "The role of angiopoietin-like 3 in the metabolism of lipoproteins: Therapeutic perspectives," Hellenic Atherosclerosis Society, Jul.-Sep. 2017, 8(3):61-66.
Rochman, Y. et al. "Thymic stromal lymphopoietin: a new cytokine in asthma," Curr. Opin. Pharmacol., Jun. 2008, 8(3):249-254.
Rochman, Y. et al. "Thymic stromal lymphopoietin-mediated STAT5 phosphorylation via kinases JAK1 and JAK2 reveals a key difference from IL-7-induced signaling," PNAS, Nov. 9, 2010, 107(45):19455-19460.
Sasaki, N. et al. "Structure-Mutation Analysis of the ATPase Site of Dictyostelium Discoideum Myosin II," Adv Biophys, 1998, 35:1-24.
Shields, et al. "High Resolution Mapping of the Binding Site on Human IgG1 for FcγRI, FcγRII, FcγRIII, and FcRn and Design of IgG1 Variants with Improved Binding to the FcγR*," The Journal of Biological Chemistry, Mar. 2, 2001, 276(9):6591-6604.
Sokol, C.L. et al. "A Mechanism for the Initiation of the Th2 Response by an Allergen," Nat Immunol., Mar. 2008, 9(3):310-318.
Soumelis, V. et al. "Human epithelial cells trigger dendritic cell-mediated allergic inflammation by producing TSLP," Nature Immunology, Jul. 2002, 3(7):673-680.
Soumelis, V. et al. "Human thymic stromal lymphopoietin: a novel epithelial cell-derived cytokine and a potential key player in the induction of allergic inflammation," Springer Semin Immun., 2004, 25:325-333.
Tam, S.H. et al. "Functional, Biophysical, and Structural Characterization of Human IgG1 and IgG4 Fc Variants with Ablated Immune Functionality," Antibodies, Sep. 1, 2017, 6(12):1-34.
Usategui, A. et al. "A profibrotic role for thymic stromal lymphopoietin in systemic sclerosis," Ann Rheum Dis., Dec. 2013, 72(12):2018-2023.
Vafa, et al. "An engineered Fc variant of an IgG eliminates all immune effector functions via structural perturbations," Methods, 2014, 65:114-126.
Vannella, K.M. et al. "Combinatorial targeting of TSLP, IL-25, and IL-33 in type 2 cytokie-driven inflammation and fibrosis," Sci. Transl. Med., May 4, 2016, 8(337):1-12.
Verstraete, K. et al. "Structural basis of the proinflammatory signaling complex mediated by TSLP," Nature Structural & Molecular Biology, 2014, 21(4):375-82 (16 pages total).
Wörn, A. et al. "Stability Engineering of Antibody Single-chain Fv Fragments," J. Mol. Biol., 2001, 305:989-1010.
Wu, T. et al. "An Analysis of the Sequences of the Variable Regions of Bence Jones Proteins and Myeloma Light Chains and their Implications for Antibody Complementarity," Journal of Experimental Medicine, Mar. 26, 1970, 132(2):211-250.
Xu, D. et al. "In vitro characterization of five humanized OKT3 effector function variant antibodies," Cell Immunol., 2000, 200:16-26.
Yang, K. et al. "Tailoring structure-function and pharmacokinetic properties of single-chain Fv proteins by site-specific PEGylation," Protein Engineering, 2003, 16(10):761-770.
Yates, Z., et al. "Histidine Residue Mediates Radical-induced Hinge Cleavage of Human IgG1," The Journal of Biological Chemistry, Jun. 11, 2010, 285(24):18662-18671.
Ying, G. et al. "Functions of thymic stromal lymphopoietin in non-allergic diseases," Cell Immunol., 2015, 295:144-9.
Ying, S. et al. "Thymic Stromal Lymphopoietin Expression is Increased in Asthmatic Airways and Correlates with Expression of Th2-Attracting Chemokines and Disease Severity," The Journal of Immunology, 2005, 174(12):8183-8190.
Zalevsky, et al. "Enhanced antibody half-life improves in vivo activity," Nat Biotechnol, Feb. 2010, 28(2):157-159.
Zhang, Y. et al. "Functions of Thymic Stromal Lymphopoietin in Immunity and Disease," Immunologic Research, 2012, 52:211-223.
Zhang, Y. et al. "Mechanism for Benzyl Alcohol-Induced Aggregation of Recombinant Human Interleukin-1 Receptor Antagonist in Aqueous Solution," J. Pharm. Sci., Dec. 2004, 93(12):3076-3089.
Zhong, J. et al. "TSLP signaling pathway map: a platform for analysis of TSLP-mediated signaling," Jan. 20, 2014, 2014(bau007):1-8.
Ziegler, S.F. et al. "The biology of thymic stromal lymphopoietin (TSLP)," Advances in pharmacology (San Diego, Calif.), 2013, 66:129-155.
Extended European Search Report for European Application No. EP20836933 dated Jul. 19, 2023, 11 pages.

* cited by examiner

FIGURE 4

VL
```
         10         20         30         40         50         60         70         80         90        100
          .          .          .          .          .          .          .          .          .          .
Chothia
202    EIVLTQSPAIMAASPGERVTITCSVSSISSSNLHWYQQKSETSPKPWIYGTSNLASGVPVRFSGSGSGTSYSLTISSMEAEDAATYYCQQWSSYPLTFGGGTKLEIK   SEQ ID NO: 2
202L3  DIQLTQSPSFLSASVGDRVTITCSVSSISSSNLHWYQQKPGKAPKPWIYGTSNLASGVPSRFSGSGSGTEXTLTISSLQPEDAATYYCQQWSSYPLTFGQGTKLEIK   SEQ ID NO: 10
202L4  EIVLTQSPDFQSVTPKEKVTITCSVSSISSSNLHWYQQKPDQSPKPWIYGTSNLASGVPSRFSGSGSGTDYTLTIMNSLEAEDAATYYCQQWSSYPLTFGQGTKLEIK  SEQ ID NO: 11
```

VH
```
         10         20         30         40         50         60         70         80         90        100        110
          .          .          .          .          .          .          .          .          .          .          .
Chothia
202    QVQLQQSGAELVRPGSSVKISCKASGYTFSSYWVNWVKQRPGQGLEWIGQIYPGDGDTDYNGKFKGKATLTADKSSTAIMQLSSLTSEDSAVYFCARGTYYNNYGTDYWGQGTSVTVSS   SEQ ID NO: 1
202H2  QVQLVQSGAEVKKPGSSVKVSCKASGYTFSSYWVNWVRQAPGQGLEWIGQIYPGDGDTDYAQKFQGRATLTADKSTSTAYMELSSLRSEDTAVYFCARGTYYNNYGTDYWGQGTTVTVSS   SEQ ID NO: 9
```

CDRs are underscored

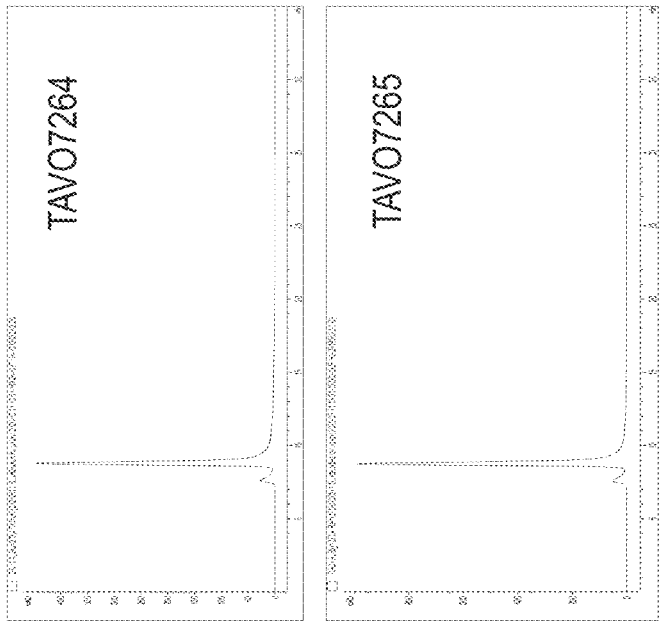
FIGURE 5C
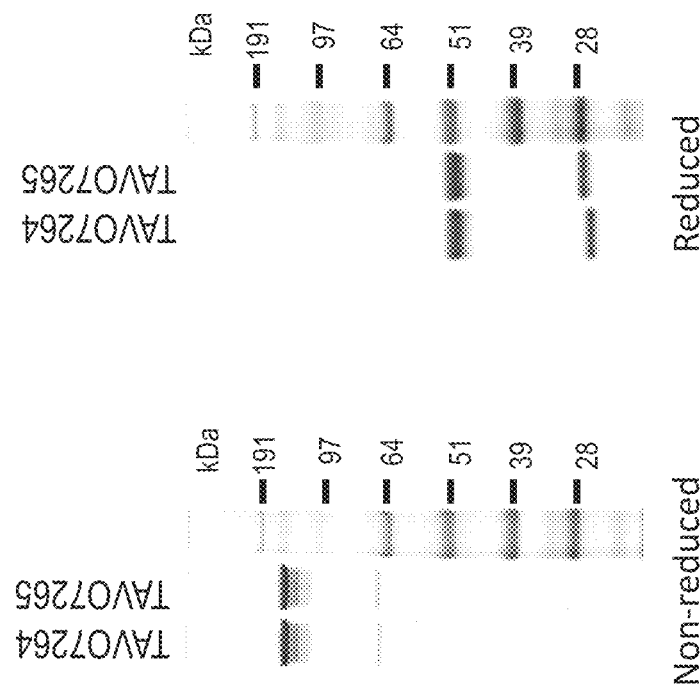
FIGURE 5B
FIGURE 5A

AGENTS THAT INTERFERE WITH THYMIC STROMAL LYMPHOPOIETIN (TSLP)-RECEPTOR SIGNALING

CROSS REFERENCE TO RELATED APPLICATIONS

This application is the National Stage of International Application No. PCT/US2020/041642, filed Jul. 10, 2020, which claims the benefit of priority to U.S. Provisional Application No. 62/873,051, filed on Jul. 11, 2019, which is herein incorporated by reference in their entireties.

DESCRIPTION OF THE TEXT FILE SUBMITTED ELECTRONICALLY

The contents of the text file submitted electronically herewith are incorporated by reference in their entirety: A computer readable format copy of the Sequence Listing (filename: TABI_002_01US_SeqList_ST25; date recorded Jan. 10, 2022; file size 49 kilobytes).

BACKGROUND OF THE DISCLOSURE

Thymic stromal lymphopoietin, TSLP, is an interleukin 7-like cytokine that plays a critical role in the regulation of immune responses and in the differentiation of hematopoietic cells. TSLP is widely expressed in epithelial cells of the lung, skin and gut, Hassall's corpuscles in the thymic medulla, mucosa-associated lymphoid tissues and tonsils (Liu, Soumelis et al. 2007, Rochman and Leonard 2008, Sokol, Barton et al. 2008). High TSLP expression levels are found in the heart, liver, spleen and prostate compared to expression levels in lung, skeletal muscle, kidney, spleen, ovary, small intestine and colon (Quentmeier, Drexler et al. 2001).

The epithelial cell-derived cytokine is produced m response to environmental and proinflammatory stimuli. It induces the release of T-cell attracting chemokines from monocytes and enhances maturation of myeloid dendritic cells. Within the thymus, TSLP activates myeloid and plasmacytoid dendritic cells, resulting in production of regulatory T cells. TSLP is important in regulating type 2 (Th2, T2) immunity through its activity on dendritic cells, T and B cells, and production of cytokines by antigen-specific Th2 cells (Ziegler, Roan et al. 2013).

TSLP signals through a heterodimeric receptor complex composed of the thymic strotnal lymphopoietin receptor (TSLPR) and the IL-7R alpha-chain (Verstraete, van Schie et al. 2014). On binding its receptor complex, TSLP can activate multiple signal transduction pathways (Zhong, Sharma et al. 2014). Stimulation of IL7R/TSLPR complex by TSLP induces the phosphorylation and activation of Janus kinases (JAKs). Activated JAKs, in turn, regulate the activity of multiple transcription (STAT) factors, which include STAT1, STAT3, STAT4, STAT5a, STAT5b and STAT6. Several other proteins such as AKT1, ERK1/2, JNKs, ribosomal protein S6 kinase and 4E-BP1 are also activated by TSLP stimulation. In addition, phosphoproteomic analyses reveal that TSLP can regulate phosphorylation of 226 proteins including kinases and protein phosphatases such as SHP-1 and SHP-2.

TSLP is known to be involved in the initiation of an inflammatory cascade and can contribute to development of chronic disease including allergic asthma, atopic dermatitis, allergic rhinitis, ulcerative colitis, and many chronic fibroproliferative disorders (Vannella, Ramalingam et al. 2016).

Studies have suggested also that TSLP is involved in immune disorders including infection (Piliponsky et al. 2016), cancer (De Monte et al. 2011), autoimmunity (Moret et al. 2011); as well as in innate and adaptive immune responses (Ziegler, Roan, 2013; Headley et al. 2009).

TSLP is a master regulator of allergic inflammation, particularly type 2 inflammatory pathways, and therefore has been a promising target for treatment of asthma. Asthma is a disorder characterized by inflammation of the bronchial tubes with increased production of mucous inside the tubes. People with asthma experience symptoms such as coughing, wheezing, shortness of breath, chest tightness, pain or pressure due to chronic airway hyper-responsiveness, typically with eosinophil infiltration (Ohta, Nagase et al. 2017). Some patients with severe asthma have frequent exacerbations associated with persistent eosinophilic inflammation despite continuous treatment with high-dose inhaled glucocorticoids with or without oral glucocorticoids. A certain percentage of refractile asthma patients, those who do not respond to conventional treatment, have severe symptoms due most likely to a non-eosinophil, non-Th2 cell population. TSLP expression is higher in the airways of patients with asthma than in those of healthy controls, and its levels correlate with Th2 cytokine and chemokine expression and disease severity (Gauvreau, O'Byrne et al. 2014). More recently, Tezepelumab (AMG 157), a human anti-TSLP $IgG_2$ antibody that specifically binds human TSLP, is in clinical trials for uncontrolled asthma (Comeau, DESMEDT et al. 2006) (Comeau, Smothers et al. 2012) (Corren, Parnes et al. 2017).

Besides targeting TSLP, three mAbs directed toward IL-5 have been approved for patients with severe asthma and an eosinophilic phenotype, Mepolizumab and Reslizumab, which bind directly to IL-5, and Benralizumab which binds to the IL-5 receptor (Ortega, Liu et al. 2014) (Castro, Zangrilli et al. 2015) (Bleecker, FitzGerald et al. 2016). Dupilumab, an antibody that binds to the Il-4 receptor alpha chain and prevents binding of both IL-4 and IL-13, has been approved for patients with moderate-to-severe eosinophilic asthma (Castro, Corren et al. 2018). Notably, all these therapeutic antibodies appear to be more efficacious in patients with increasing levels of T2 biomarkers relative to those with lower levels.

The prevalence of TSLP in other nonallergic diseases and several fibrotic conditions should also be considered as a justification for targeted therapy (Ying, Zhang 2015). In systemic sclerosis, an autoimmune disease, TSLP is highly expressed in perivascular areas and in immune cells of the skin. TSLP is upregulated in cutaneous epithelial cells, mast cells, and fibroblasts of patients with systemic sclerosis (Usategui, Criado et al. 2013). TSLP and its receptor are strongly expressed in lungs of patients with idiopathic pulmonary fibrosis, a severe fibrotic lung disease (Datta, Alexander et al. 2013). In a fibrotic skin disease, dermal fibroblasts produce high levels of TSLP in response to TGFβ in keloidal tissues.

Further support for TSLP as a therapeutic target comes from the finding that TSLP has a role in the initiation and progression of a variety of tumors. These include solid tumors (such as breast, colon, and pancreatic) as well as hematological tumors (such as B cell acute lymphocytic leukemia (B-ALL)) (Corren, Ziegler 2019). Tumors displaying Th2-type responses generally have a worse prognosis than those tumors with predominantly Th-type responses. Tumor cells secrete Il-1α and IL-1β which are required for TSLP expression by the cancer associated fibroblasts, suggesting that the tumor and tumor microenvironment are important in induction of TSLP. Studies with human cervical carcinoma cells, gastric and ovarian cancers also provide evidence that there is TSLP mediated cross-talk between hematopoietic cells that infiltrate the tumor and stroma, and the tumor itself.

While TSLP has an important role in cancer, its function as a pro or anti-tumor factor is dependent on the type of tumor. TSLP in metastatic breast cancer is an area of intense study, but there have been contradictory findings in mouse models and human breast-tumor cell lines. Similarly, the role of TSLP in skin tumors is dichotomous. The role of TSLP in B-ALL is complicated by the presence of genetic lesions with mutations in genes encoding components of the TSLP signaling pathway which occur in 50-60% of patients with poor prognosis (Corren, Ziegler 2019).

These observations suggest an important role for TSLP in human disease, and disruption of TSLP and TSLP receptor signalling pathways may have clinical benefit for diseases that lack effective treatment. For asthma, as an example, mortality due to asthma related symptoms is around 250,000 per year globally, and the number is predicted to grow by more than 100 million by 2025 (Pawankar 2014). People with allergic asthma often have other conditions like diabetes, obesity, cardiovascular disease, gastro-oesophageal disease leading to more complicated and worse outcomes. About 70% of asthmatics also have allergies. Allergic diseases include anaphylaxis, food allergies, certain forms of asthma, rhinitis, conjunctivitis, angioedema, urticaria, atopic dermatitis, eczema, eosinophilic disorders, including eosinophilic esophagitis and drug and insect allergies (Pawankar 2014) (Kay 2001).

Owing to the high health care costs, morbidity, impact on quality of life, absenteeism, poorer work performance, increasing patient population with allergic and non-allergic diseases, there is undoubtedly a significant need to reduce Th2 cytokine related inflammation. Agents such as neutralizing antibody molecules that interfere with TSLP receptor binding and signalling, and have the desired efficacy and pharmacokinetic profiles, is an unmet need for inhibiting (both T2 high and T2 low) symptoms associated with chronic inflammatory conditions.

SUMMARY OF THE DISCLOSURE

The disclosure provides for monoclonal antibodies and antigen-binding fragments thereof that specifically bind and neutralize, inhibit, block, abrogate, reduce, or interfere with, at least one activity of thymic stromal lymphopoietin, TSLP. The activity of TSLP that can be neutralized, inhibited, blocked, abrogated, reduced or interfered, by the antibodies or fragments thereof as disclosed herein, includes, but is not limited by, neutralization of TSLP activation of its receptor complex, and the like. In embodiments, the antibodies are monoclonal antibodies, e.g., mouse monoclonal antibodies or humanized antibodies. In embodiments, the antibodies are antigen-binding antibody fragments.

The disclosure provides for a mouse monoclonal antibody to human TSLP, designated as TAVO202, comprising a heavy chain variable region sequence with amino acid sequence of SEQ ID NO. 1, and a light chain variable region sequence with amino acid sequence of SEQ ID NO. 2.

The disclosure provides for the heavy chain variable region of TAVO202 comprising three Complementarity Determining Regions (CDRs), designated as HCDR1, HCDR2 and HCDR3, with amino acid sequence set forth as SEQ ID NO. 3, SEQ ID NO. 4 and SEQ ID NO. 5, respectively.

The disclosure provides for the light chain variable region of TAVO202 comprising three CDRs, designated as LCDR1, LCDR2 and LCDR3, with amino acid sequence set forth as SEQ ID NO. 6, SEQ ID NO. 7 and SEQ ID NO. 8, respectively.

The disclosure provides for one humanized heavy chain variable region of TAVO202, designated as 202H2, with amino acid sequence set forth as SEQ ID NO. 9.

The disclosure provides for two humanized light chain variable region of TAVO202, designated as 202L3 and 202L4, with amino acid sequences set forth as SEQ ID NO. 10 and SEQ ID NO. 11, respectively.

In embodiments, the disclosure provides a humanized antibody or antigen-binding fragment thereof that comprises HCDR1, HCDR2, HCDR3, LCDR1, LCDR2, and LCDR3 according to SEQ ID NO. 3, SEQ ID NO. 4 SEQ ID NO. 5, SEQ ID NO. 6, SEQ ID NO. 7 and SEQ ID NO. 8, respectively. In an embodiment, the humanized antibody comprises a heavy chain variable region having at least 80%, at least 85%, at least 90%, at least 95%, or at least 99% sequence identity to SEQ ID NO: 9. In an embodiment, the humanized antibody comprises a light chain variable region having at least 80%, at least 85%, at least 90%, at least 95%, or at least 99% sequence identity to SEQ ID NO: 10 or SEQ ID NO: 11.

As a non-limiting example, the disclosure provides for a first humanized antibody for TAVO202 comprising humanized heavy chain variable region 202H2 and humanized light chain variable region 202L3 with human IgG2 Fc, designated as TAVO6264, comprising heavy chain sequence set forth as SEQ ID NO. 12 and light chain sequence set forth as SEQ ID NO. 13.

The disclosure provides for a second humanized antibody for TAVO202 comprising humanized heavy chain variable region 202H2 and humanized light chain variable region 202L4 with human IgG2 Fc, designated as TAVO6265, comprising heavy chain sequence set forth as SEQ ID NO. 12 and light chain sequence set forth as SEQ ID NO. 14.

The disclosure provides for a third humanized antibody for TAVO202 comprising humanized heavy chain variable region 202H2 and humanized light chain variable region 202L3 with human IgG1 Fc with L234F, L235E, D265A, F405L mutations, designated as TAVO7264, comprising heavy chain sequence set forth as SEQ ID NO. 15 and light chain sequence set forth as SEQ ID NO. 13.

The disclosure provides for a fourth humanized antibody for TAVO202 comprising humanized heavy chain variable region 202H2 and humanized light chain variable region 202L4 with human IgG1 Fc with L234F, L235E, D265A, F405L mutations, designated as TAVO7265, comprising heavy chain sequence set forth as SEQ ID NO. 15 and light chain sequence set forth as SEQ ID NO. 14.

The disclosure provides for a fifth humanized antibody for TAVO202 comprising humanized heavy chain variable region 202H2 and humanized light chain variable region 202L3 with human IgG1 Fc with L234A, L235A, M428L, N434S mutations, designated as TAVO9764, comprising heavy chain sequence set forth as SEQ ID NO. 16 and light chain sequence set forth as SEQ ID NO. 13.

The disclosure provides for a sixth humanized antibody for TAVO202 comprising humanized heavy chain variable region 202H2 and humanized light chain variable region 202L4 with human IgG1 Fc with L234A, L235A, M428L, N434S mutations, designated as TAVO9765, comprising heavy chain sequence set forth as SEQ ID NO. 16 and light chain sequence set forth as SEQ ID NO. 14.

The anti-TSLP monoclonal antibodies can be full length IgG$_1$, IgG$_2$, IgG$_3$, IgG$_4$ antibodies or may comprise only an antigen-binding portion including a F$_{ab}$, F$(_{ab'})_2$, or say fragment that specifically binds (eg, human) TSLP, neutralizes, inhibits, blocks, abrogates, reduces, or interferes with at least one activity of TSLP. The antibody backbones may be modified to affect functionality, e.g. to eliminate residual effector functions.

The disclosure also provides for anti-TSLP monoclonal antibodies with an extended half-life when compared to the wild-type antibody. The extension of half-life can be realized by engineering the C$_{H2}$ and C$_{H3}$ domains of the antibody with any one set of mutations selected from M252Y/S254T/T256E, M428L/N434S, T250Q/M428L, N434A. and T307A/E380A/N434A when compared to a parental wild-type antibody, residue numbering according to the EU Index.

The disclosure also provides for anti-TSLP monoclonal antibodies with enhanced resistant to proteolytic degradation by a protease that cleaves the wild-type antibody between or at residues 222-237 (EU numbering). The resistance to proteolytic degradation can be realized by engineering E233P/L234V/L235A mutations in the hinge region with G236 deleted when compared to a parental wild-type antibody, residue numbering according to the EU Index.

The disclosure also provides for vectors comprising the polynucleotides of the disclosure. The disclosure also provides for a method of producing the anti-TSLP monoclonal antibodies of the disclosure, comprising culturing the host cell of the disclosure under conditions that the antibody is expressed, and purifying the antibody.

The disclosure also provides for a pharmaceutical composition comprising the anti-TSLP antibodies or antigen-binding fragments thereof of the disclosure and a pharmaceutically acceptable carrier.

The disclosure also provides for methods of detecting the binding of the anti-TSLP antibodies.

The disclosure also provides for methods of blocking the binding of TSLP to its receptor TLPR, the method comprises contacting the TSLPR with any one of the anti-TSLP antibodies or antigen binding fragments thereof provided herein.

The disclosure also provides for a method of treating asthma comprising administering to a subject in need a therapeutically effective amount of the provided antibodies to TSLP.

The disclosure also provides for a method of treating COPD and idiopathic pulmonary fibrosis, comprising administering to a subject in need a therapeutically effective amount of the provided antibodies to TSLP.

The disclosure also provides for a method of treating symptoms of atopic dermatitis, comprising administering to a subject in need a therapeutically effective amount of the provided antibodies to TSLP.

The disclosure also provides for a method of treating symptoms of eczema, comprising administering to a subject in need a therapeutically effective amount of the provided antibodies to TSLP.

The disclosure also provides for a method of treating symptoms of other allergic states such as eosinophilic esophagitis, comprising administering to a subject in need a therapeutically effective amount of the provided antibodies to TSLP.

The disclosure also provides for a method of treating symptoms of inflammatory bowel diseases, comprising administering to a subject in need a therapeutically effective amount of the provided antibodies to TSLP.

The disclosure also provides for a method of treating fibrotic conditions such as systemic sclerosis, systemic idiopathic pulmonary fibrosis, and keloidal disease, comprising administering to a subject in need a therapeutically effective amount of the provided antibodies to TSLP.

The disclosure also provides for a method of treating cancers, i.e., breast, pancreatic, colorectal, lymphoblastic leukemia, head and neck cancer, comprising administering to a subject in need therapeutically effective amounts of the provided antibodies to TSLP.

BRIEF DESCRIPTION OF THE DRAWINGS

FIG. 4: Sequence alignments of heavy chain and light chain variable regions of TAVO202 with humanized V$_H$ and V$_L$ variants. Humanized antibodies can be formed by pairing the humanized V$_H$ variant (202H2) and two humanized V$_L$ variants (202L3 and 202L4) with different IgG Fc.

FIG. 5: SDS-PAGE analysis of example humanized anti-TSLP IgG antibodies under (A) non-reduced and (B) reduced conditions. (C). Size Exclusion Chromatography (SEC) analysis of example anti-TSLP IgG antibodies.

DETAILED DESCRIPTION OF THE DISCLOSURE

Definitions

Figures 1A, 1B:
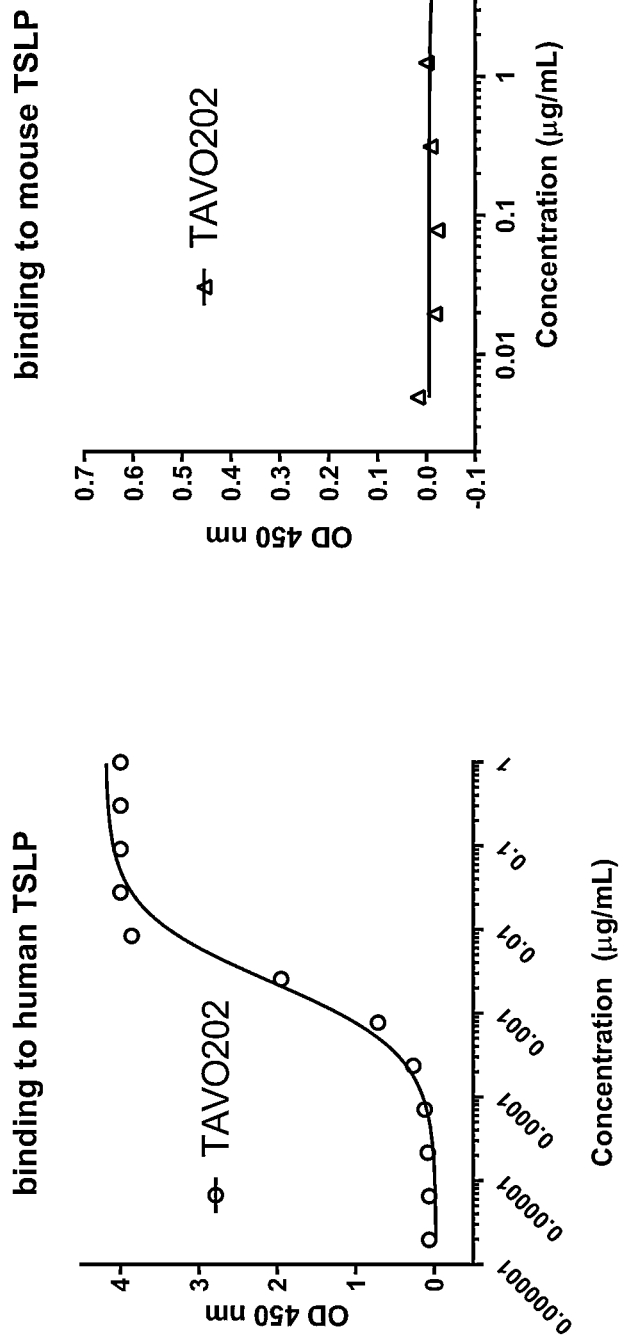
FIG. 1: Binding to (A) human and (B) mouse TSLP by mouse monoclonal anti-human TSLP antibody TAVO202.

The terminology used herein is for describing embodiments only and is not intended to be limiting. Unless defined otherwise, all technical and scientific terms used herein have the same meaning as commonly understood by one of ordinary skill in the art to which the disclosure pertains. In describing and claiming the present disclosure, the following terminology will be used.

As used in this specification and the appended claims, the singular forms "a," "an," and "the" include plural referents unless the content clearly dictates otherwise. Thus, for example, reference to "a cell" includes a combination of two or more cells, and the like.

"Antibodies" is meant in a broad sense and includes immunoglobulin molecules including monoclonal antibodies including murine, human, humanized and chimeric monoclonal antibodies, antibody fragments, bispecific or multi-specific antibodies, dimeric, tetrameric or multimeric antibodies, single chain antibodies, domain antibodies and any other modified configuration of the immunoglobulin molecule that comprises an antigen binding site of the required specificity. "Full length antibody molecules" are comprised of two heavy chains (HC) and two light chains inter-connected by disulfide bonds as well as multimers thereof (e.g. IgM). Each heavy chain is comprised of a heavy chain variable region (NTH) and a heavy chain constant region (comprised of domains $C_{H1}$, hinge, $C_{H2}$ and $C_{H3}$). Each light chain is comprised of a light chain variable region ($V_L$) and a light chain constant region ($C_L$). The $V_H$ and the $V_L$ regions may be further subdivided into regions of hyper variability, termed complementarity determining regions (CDR), interspersed with framework regions (FR). Each $V_H$ and $V_L$ is composed of three CDRs and four FR segments, arranged from amino-to-carboxyl-terminus in the following order: FR1, CDR1, FR2, CDR2, FR3, CDR3 and FR4.

"Complementarity determining regions (CDR)" are "antigen binding sites" in an antibody. CDRs may be defined using various terms: (i) Complementarity Determining Regions (CDRs), three in the $V_H$ (HCDR1, HCDR2, HCDR3) and three in the $V_L$ (LCDR1, LCDR2, LCDR3) are based on sequence variability (Wu and Kabat 1970) (Kabat, National Institutes of et al. 1991); (ii) "Hypervariable regions," "HVR," or "HV," three in the $V_H$ (H1, H2, H3) and three in the $V_L$ (L1, L2, L3) refer to the regions of an antibody variable domains which are hypervariable in structure as defined by Chothia and Lesk (Chothia and Lesk 1987) (The International ImMunoGeneTics (IMGT) database (http://www_imgt_org) provides a standardized numbering and definition of antigen-binding sites. The correspondence between CDRs, HVs and IMGT delineations is described in Lefranc et al. (Lefranc, Pommie et al. 2003). The term "CDR," "HCDR1," "HCDR2," "HCDR3," "LCDR1," "LCDR2" and "LCDR3" as used herein includes CDRs defined by any of the methods described supra, Kabat. Chothia or IMGT, unless otherwise explicitly stated in the specification.

Immunoglobulins may be assigned to five major classes, IgA, IgD, IgE, IgG and IgM, depending on the heavy chain constant region amino acid sequence. IgA and IgG are further sub-classified as the isotypes $IgA_1$, $IgA_2$, $IgG_1$, $IgG_2$, $IgG_3$ and $IgG_4$. Antibody light chains of any vertebrate species may assign to one of two clearly distinct types, namely kappa (κ) and lambda (λ), based on the amino acid sequences of their constant regions.

"Antibody fragments" refers to a portion of an immunoglobulin molecule that retains the heavy chain and/or the light chain antigen binding site, such as heavy chain complementarity determining regions (HCDR) 1, 2 and 3, light chain complementarity determining regions (LCDR) 1, 2 and 3, a heavy chain variable region ($V_H$), or a light chain variable region ($V_L$). Antibody fragments include well known $F_{ab}$, $F(_{ab'})_2$, $F_d$ and $F_v$ fragments as well as domain antibodies (dAb) consisting of one $V_H$ domain. $V_H$ and $V_L$ domains may be linked together via a synthetic linker to form various types of single chain antibody designs where the $V_H$/$V_L$ domains may pair intramolecularly, or intermolecularly in those cases when the $V_H$ and $V_L$ domains are expressed by separate single chain antibody constructs, to form a monovalent antigen binding site, such as single chain FV (scFv) or diabody; described for example in Int. Patent Publ. Nos. WO1998/44001, WO1988/01649, WO1994/13804 and WO1992/01047.

"Monoclonal antibody" refers to an antibody population with single amino acid composition in each heavy and each light chain, except for possible well-known alterations such as removal of C-terminal lysine from the antibody heavy chain. Monoclonal antibodies typically bind one antigenic epitope, except that bispecific monoclonal antibodies bind two distinct antigenic epitopes. Monoclonal antibodies may have heterogeneous glycosylation within the antibody population. Monoclonal antibody may be monospecific or multi-specific, or monovalent, bivalent or multivalent. A bispecific antibody is included in the term monoclonal antibody.

"Isolated antibody" refers to an antibody or antibody fragment that is substantially free of other antibodies having different antigenic specificities (e.g., an isolated antibody specifically binding for example TSLP is substantially free of antibodies that specifically bind antigens other than TSLP).

"Isolated antibody" encompasses antibodies that are isolated to a higher purity, such as antibodies that are 80%, 81%, 82%, 83%, 84%, 85%, 86%, 87%, 88%, 89%, 90%, 91%, 92%, 93%, 94%, 95%, 96%, 97%, 98%, 99% or 100% pure.

"Humanized antibody" refers to an antibody in which the antigen binding sites are derived from non-human species and the variable region frameworks are derived from human immunoglobulin sequences. Humanized antibody may include substitutions in the framework so that the framework may not be an exact copy of expressed human immunoglobulin or human immunoglobulin germLine gene sequences.

"Human antibody" refers to an antibody having heavy and light chain variable regions in which both the framework and the antigen binding site are derived from sequences of human origin and is optimized to have minimal immune response when administered to a human subject. If the antibody contains a constant region or a portion of the constant region, the constant region also is derived from sequences of human origin.

The numbering of amino acid residues in the antibody constant region throughout the specification is according to the EU index as described in Kabat et al., unless otherwise explicitly stated (Kabat, National Institutes of et al. 1991).

Conventional one and three-letter amino acid codes are used herein as shown in Table 1.

TABLE 1

| Amino acid | Three-letter code | One-letter code |
|---|---|---|
| Alanine | Ala | A |
| Arginine | Arg | R |
| Asparagine | Asn | N |
| Aspartate | Asp | D |
| Cysteine | Cys | C |
| Glutamate | Gln | E |
| Glutamine | Glu | Q |
| Glycine | Gly | G |
| Histidine | His | H |
| Isoleucine | Ile | I |
| Leucine | Leu | L |
| Lysine | Lys | K |
| Methionine | Met | M |
| Phenylalanine | Phe | F |

TABLE 1-continued

| Amino acid | Three-letter code | One-letter code |
|---|---|---|
| Proline | Pro | P |
| Serine | Ser | S |
| Threonine | Thr | T |
| Tryptophan | Trp | W |
| Tyrosine | Tyr | Y |
| Valine | Val | V |

A "variant" of a polypeptide (e.g., an antigen binding protein, or an antibody) comprises an amino acid sequence wherein one or more amino acid residues are inserted into, deleted from and/or substituted into the amino acid sequence relative to another polypeptide sequence.

Variants include antibodies and fragments thereof that have a recited percent identity to an antibody or fragment provided herein or to an antibody or fragment having a recited DNA or amino acid sequence.

The term "identity" refers to a relationship between the sequences of two or more polypeptide molecules or two or more nucleic acid molecules, as determined by aligning and comparing the sequences. "Percent identity," "percent homology," "sequence identity," or "sequence homology" and the like mean the percent of identical residues between the amino acids or nucleotides in the compared molecules and is calculated based on the size of the smallest of the molecules being compared. For these calculations, gaps in alignments (if any) are preferably addressed by a particular mathematical model or computer program (i.e., an "algorithm"). Methods that can be used to calculate the identity of the aligned nucleic acids or polypeptides include those described in Computational Molecular Biology, (Lesk, A. M., ed.), 1988, New York: Oxford University Press; Biocomputing Informatics and Genome Projects, (Smith, D. W., ed.), 1993, New York: Academic Press; Computer Analysis of Sequence Data, Part I, (Griffin, A. M., and Griffin, H. G., eds.), 1994, New Jersey: Humana Press; von Heinje, G., 1987, Sequence Analysis in Molecular Biology, New York: Academic Press; Sequence Analysis Primer, (Gribskov, M. and Devereux, J., eds.), 1991, New York: M. Stockton Press; and Carillo et al., 1988, SIAM J. Applied Math. 48:1073. In calculating percent identity, the sequences being compared are typically aligned in a way that gives the largest match between the sequences.

The constant region sequences of the mammalian IgG heavy chain are designated in sequence as $C_{H1}$-hinge-$C_{H2}$-$C_{H3}$. The "hinge," "hinge region" or "hinge domain" of an IgG is generally defined as including Glu216 and terminating at Pro230 of human $IgG_1$ according to the EU Index but functionally, the flexible portion of the chain may be considered to include additional residues termed the upper and lower hinge regions, such as from Glu216 to Gly237 and the lower hinge has been referred to as residues 233 to 239 of the Fc region where $F_c\gamma yR$ binding was generally attributed. Hinge regions of other IgG isotypes may be aligned with the $IgG_1$ sequence by placing the first and last cysteine residues forming inter-heavy chain S—S bonds. Although boundaries may vary slightly, as numbered according to the EU Index, the $C_{H1}$ domain is adjacent to the $V_H$ domain and amino terminal to the hinge region of an immunoglobulin heavy chain molecule and includes the first (most amino terminal) constant region of an immunoglobulin heavy chain, e.g., from about EU positions 118-215. The Fc domain extends from amino acid 231 to amino acid 447; the $C_{H2}$ domain is from about Ala231 to Lys340 or Gly341 and the $C_{H3}$ from about Gly341 or Gln342 to Lys447. The residues of the IgG heavy chain constant region of the $C_{H1}$ region terminate at Lys. The $F_c$ domain containing molecule comprises at least the $C_{H2}$ and the $C_{H3}$ domains of an antibody constant region, and therefore comprises at least a region from about Ala231 to Lys447 of IgG heavy chain constant region. The $F_c$ domain containing molecule may optionally comprise at least portion of the hinge region.

"Epitope" refers to a portion of an antigen to which an antibody specifically binds. Epitopes typically consist of chemically active (such as polar, non-polar or hydrophobic) surface groupings of moieties such as amino acids or polysaccharide side chains and may have specific three-dimensional structural characteristics, as well as specific charge characteristics. An epitope may be composed of contiguous and/or discontinuous amino acids that form a conformational spatial unit. For a discontinuous epitope, amino acids from differing portions of the linear sequence of the antigen come near in 3-dimensional space through the folding of the protein molecule. Antibody "epitope" depends on the methodology used to identify the epitope.

A "leader sequence" as used herein includes any signal peptide that can be processed by a mammalian cell, including the human B2M leader. Such sequences are well-known in the art.

The terms "peptide," "polypeptide," and "protein" are used interchangeably herein, and refer to a polymeric form of amino acids of any length, which can include coded and non-coded amino acids, chemically or biochemically modified or derivatized amino acids, and polypeptides having modified peptide backbones. The terms also include polypeptides that have co-translational (e.g., signal peptide cleavage) and post-translational modifications of the polypeptide, such as, for example, disulfide-bond formation, glycosylation, acetylation, phosphorylation, proteolytic cleavage, and the like. Furthermore, as used herein, a "polypeptide" refers to a protein that includes modifications, such as deletions, additions, and substitutions (generally conservative in nature as would be known to a person in the art) to the native sequence, if the protein maintains the desired activity. These modifications can be deliberate, as through site-directed mutagenesis, or can be accidental, such as through mutations of hosts that produce the proteins, or errors due to PCR amplification or other recombinant DNA methods.

The term "recombinant," as used herein to describe a nucleic acid molecule, means a polynucleotide of genomic, cDNA, viral, semisynthetic, and/or synthetic origin, which, by its origin or manipulation, is not associated with all or a portion of the polynucleotide sequences with which it is associated in nature. The term "recombinant," as used with respect to a protein or polypeptide, refers to a polypeptide produced by expression from a recombinant polynucleotide. The term "recombinant," as used with respect to a host cell or a virus, refers to a host cell or virus into which a recombinant polynucleotide has been introduced. Recombinant is also used herein to refer to, with reference to material (e.g., a cell, a nucleic acid, a protein, or a vector) that the material has been modified by the introduction of a heterologous material (e.g., a cell, a nucleic acid, a protein, or a vector).

The terms "polynucleotide," "oligonucleotide," "nucleic acid" and "nucleic acid molecule" are used interchangeably herein to include a polymeric form of nucleotides, either ribonucleotides or deoxyribonucleotides. This term refers only to the primary structure of the molecule.

"Vector" refers to a polynucleotide capable of being duplicated within a biological system or that can be moved between such systems. Vector polynucleotides typically contain elements, such as origins of replication, polyadenylation signal or selection markers, that function to facilitate the duplication or maintenance of these polynucleotides in a biological system, such as a cell, virus, animal, plant, and reconstituted biological systems utilizing biological components capable of duplicating a vector. The vector polynucleotide may be DNA or RNA molecules, cDNA, or a hybrid of these, single stranded or double stranded.

"Expression vector" refers to a vector that can be utilized in a biological system or in a reconstituted biological system to direct the translation of a polypeptide encoded by a polynucleotide sequence present in the expression vector.

"Valent" refers to the presence of a specified number of binding sites specific for an antigen in a molecule. As such, the terms "monovalent," "bivalent," "tetravalent," and "hexavalent" refer to the presence of one, two, four and six binding sites, respectively, specific for an antigen in a molecule.

As used herein, the term "heterologous" used about nucleic acid sequences, proteins or polypeptides, means that these molecules are not naturally occurring in the cell from which the heterologous nucleic acid sequence, protein or polypeptide was derived. For example, the nucleic acid sequence coding for a human polypeptide that is inserted into a cell that is not a human cell is a heterologous nucleic acid sequence in that context. Whereas heterologous nucleic acids may be derived from different organism or animal species, such nucleic acid need not be derived from separate organism species to be heterologous. For example, in some instances, a synthetic nucleic acid sequence or a polypeptide encoded therefrom may be heterologous to a cell into which it is introduced in that the cell did not previously contain the synthetic nucleic acid. As such, a synthetic nucleic acid sequence or a polypeptide encoded therefrom may be considered heterologous to a human cell, e.g., even if one or more components of the synthetic nucleic acid sequence or a polypeptide encoded therefrom was originally derived from a human cell.

A "host cell," as used herein, denotes an in vivo or in vitro eukaryotic cell or a cell from a multicellular organism (e.g., a cell line) cultured as a unicellular entity, which eukaryotic cells can be, or have been, used as recipients for a nucleic acid (e.g., an expression vector that comprises a nucleotide sequence encoding a multimeric polypeptide of the present disclosure), and include the progeny of the original cell which has been genetically modified by the nucleic acid. It is understood that the progeny of a single cell may not necessarily be completely identical in morphology or in genomic or total DNA complement as the original parent, due to natural, accidental, or deliberate mutation.

A "recombinant host cell" (also referred to as a "genetically modified host cell") is a host cell into which has been introduced a heterologous nucleic acid, e.g., an expression vector. For example, a genetically modified eukaryotic host cell is genetically modified by introduction into a suitable eukaryotic host cell a heterologous nucleic acid, e.g., an exogenous nucleic acid that is foreign to the eukaryotic host cell, or a recombinant nucleic acid that is not normally found in the eukaryotic host cell.

"Specific binding" or "specifically binds" or "binds" refer to an antibody binding to a specific antigen with greater affinity than for other antigens. Typically, the antibody "specifically binds" when the equilibrium dissociation constant ($K_D$) for binding is about $1\times10^{-8}$ M or less, for example about $1\times1.0^{-9}$ M or less, about $1\times1.0^{-10}$ M or less, about $1\times10^{-11}$ M or less, or about $1\times10^{-12}$ M or less, typically with the $K_D$ that is at least one hundred-fold less than its $K_D$ for binding to a non-specific antigen (e.g., BSA, casein). The $K_D$ may be measured using standard procedures.

As used herein, the terms "treatment," "treating," and the like, refer to obtaining a desired pharmacologic and/or physiologic effect. The effect may be prophylactic in terms of completely or partially preventing a disease or symptom thereof and/or may be therapeutic in terms of a partial or complete cure for a disease and/or adverse effect attributable to the disease.

"Treatment," as used herein, covers any treatment of a disease in a mammal, e.g., in a human, and includes: (a) preventing the disease from occurring in a subject which may be predisposed to the disease but has not yet been diagnosed as having it; (b) inhibiting the disease, i.e., arresting its development; and (c) relieving the disease, i.e., causing regression of the disease.

The terms "individual," "subject," "host," and "patient," used interchangeably herein, refer to a mammal, including, but not limited to, murine (e.g., rats, mice), lagomorphs (e.g., rabbits), non-human primates, humans, canines, felines, ungulates (e.g., equine, bovine, ovine, porcine, caprine), etc.

A "therapeutically effective amount" or "efficacious amount" refers to the amount of an agent, or combined amounts of two agents, that, when administered to a mammal or other subject for treating a disease, is sufficient to affect such treatment for the disease. The "therapeutically effective amount" will vary depending on the agent(s), the disease and its severity and the age, weight, etc., of the subject to be treated.

Before the present disclosure is further described, it is to be understood that this disclosure is not limited to embodiments described, as such may, of course, vary. It is also to be understood that the terminology used herein is for describing embodiments only, and is not intended to be limiting, since the scope of the present disclosure will be limited only by the appended claims.

Composition of Anti-TSLP Antibody and Antigen Binding Fragment

Herein is described monoclonal antibodies and antigen-binding fragments thereof that specifically bind and neutralize, inhibit, block, abrogate, reduce, or interfere with, at least one activity of TSLP, e.g., a functional activity of mu? to its receptor complex. The anti-TSLP antibodies and antigen binding fragments can be therapeutically administered to a subject to treat TSLP mediated diseases.

The disclosure provides for a mouse monoclonal antibody, designated as TAVO202, which was identified from a mouse hybridoma screening, that specifically binds and neutralizes, inhibits, blocks, abrogates, reduces, or interferes with, at least one activity of human thymic stromal lymphopoietin (TSLP). TAVO202 comprises a heavy chain variable region sequence with amino acid sequence of SEQ ID NO. 1, and a light chain variable region sequence with amino acid sequence of SEQ ID No. 2. The heavy chain variable region of TAVO202 comprises three Complementarity Determining Regions, designated as HCDR1, HCDR2 and HCDR3, with amino acid sequence set forth as SEQ ID NO. 3, SEQ ID NO. 4 and SEQ ID NO. 5, respectively. The light chain variable region of TAVO202 comprises three Complementarity Determining Regions, designated as LCDR1, LCDR2 and LCDR:3, with amino acid sequence set forth as SEQ ID NO. 6, SEQ ID NO. 7 and SEQ ID NO. 8, respectively.

Heavy chain variable region sequence of anti-human TSLP mouse monoclonal antibody TAVO202

(SEQ ID NO: 1)
QVQLQQSGAELVRPGSSVKISCKAS<u>GYTFSSYWVN</u>WVKQRPGQGLEWIGQ
<u>IYPGDGDTDYNGKFKG</u>KATLTADKSSSTAYMQLSSLTSEDSAVYFCAR<u>GT</u>
<u>YYNNYYGTDY</u>WGQGTSVTVSS

The sequence of three CDRs of heavy chain are underlined.

Light chain variable region sequence of Anti-human TSLP mouse monoclonal antibody TAVO202

(SEQ ID NO: 2)
EIVLTQSPALMAASPGEKVITC<u>SVSSSISSSNLH</u>WYQQKSETSPKPWIY<u>GT</u>
<u>SNLAS</u>GVPVRFSGSGSGTSYSLTISSMEAEDAATYYC<u>QQWSSYPLT</u>FGGGT
KLEIK

The sequence of three CDRs of light chain are underlined.

HCDR1 sequence of Anti-human TSLP mouse monoclonal antibody TAVO202

(SEQ ID NO: 3)
GYTFSSYWVN

HCDR2 sequence of Anti-human TSLP mouse monoclonal antibody TAVO202

(SEQ ID NO: 4)
QIYPGDGDTD

HCDR3 sequence of Anti-human TSLP mouse monoclonal antibody TAVO202

(SEQ ID NO: 5)
GTYYNNYYGTDY

LCDR1 sequence of Anti-human TSLP mouse monoclonal antibody TAVO202

(SEQ ID NO: 6)
SVSSSISSSNLH

LCDR2 sequence of Anti-human TSLP mouse monoclonal antibody TAVO202

(SEQ ID NO: 7)
GTSNLAS

LCDR3 sequence of Anti-human TSLP mouse monoclonal antibody TAVO202

(SEQ ID NO: 8)
QQWSSYPLT

The mouse anti-human TSLP antibody TAVO202 can be humanized by grafting of mouse CDRs onto human germ-Line scaffolds. A few key mouse residues are preserved by back mutations to achieve higher stability and better expression while minimizing immunogenicity. For TAVO202, one humanized VI-I variant (202H2) is designed based on IGHV1-69*02 and two humanized $V_L$ variants are designed with 202L3 based on IGKV1-9*01 and 202L4 based on IGKV6-21*01 with a couple of back mutations in framework.

Based on the foregoing, the disclosure provides for one humanized heavy chain variable region of TAVO202, designated as 202H2, with amino acid sequence set forth as SEQ ID NO. 9.

Humanized heavy chain variable region 202H2 sequence (SEQ ID TO: 9)
QVQLVQSGAEVKKPGSSVKVSCKAS<u>GYTFSSYWVN</u>WVRQAPGQGLEWIGQ<u>I</u>
<u>YPGDGDTDY</u>AQKFQGRATLTADKSTSTAYMELSSLRSEDTAVYFCAR<u>GTYY</u>
<u>NNYYGTDY</u>WGQGTTVTVSS The sequences of three CDRs of humanized heavy chain are underlined.

The disclosure provides for two humanized light chain variable region of TAVO202, designated as 202L3 and 202L4, with amino acid sequences set forth as SEQ ID NO. 10 and SEQ ID NO. 11, respectively.

Humanized light chain variable region 202L3 sequence (SEQ ID NO: 10)
DIQLTQSPSFLSASVGDRVTITC<u>SVSSSISSSNLH</u>WYQQKPGKAPKPWIYG
<u>TSNLAS</u>GVPSRFSGSGSGTEYTLTISSLQPEDAATYYC<u>QQWSSYPLT</u>FGQG
TKLEIK The sequences of three CDRs of humanized light chain are underlined.

Humanized light chain variable region 202L4 sequence (SEQ ID NO: 11)
EIVLTQSPDFQSVTPKEKVTITC<u>SVSSSISSSNLH</u>WYQQKPDQSPKPWIYG
<u>TSNLAS</u>GVPSRFSGSGSGTDYTLTINSLEAEDAATYYC<u>QQWSSYPLT</u>FGQG
TKLEIK The sequences of three CDRs of humanized light chain are underlined.

As a non-limiting example, by pairing the humanized 202H2 heavy chain variable region and the two humanized light chain variable regions 202L3 and 202L4 with different IgG Fc, six humanized antibodies for TAVO202 can be generated (FIG. 4, Table 2).

TABLE 2

Exemplary antibodies

| Humanized mAb | $V_H$ | $N_L$ | Fc |
|---|---|---|---|
| TAVO6264 | 202H2 | 202L3 | IgG2 |
| TAVO6265 | 202H2 | 202L4 | IgG2 |
| TAVO7264 | 202H2 | 202L3 | IgG1 (L234F, L235E, D265A, F405L) |
| TAVO7265 | 202H2 | 202L4 | IgG1 (L234F, L235E, D265A, F405L) |
| TAVO9764 | 202H2 | 202L3 | IgG1 (L234A, L235A, M428L, N434S) |
| TAVO9765 | 202H2 | 202L4 | IgG1 (L234A, L235A, M428L, N434S) |

The disclosure provides for a first humanized antibody for TAVO202 comprising humanized heavy chain variable region 202H2 and humanized light chain variable region 202L3 with human IgG2 Fc, designated as TAVO6264, comprising heavy chain sequence set forth as SEQ ID NO. 12 and light chain sequence set forth as SEQ ID NO. 13.

The disclosure provides for a second humanized antibody for TAVO202 comprising humanized heavy chain variable region 202H2 and humanized light chain variable region 202L4 with human IgG2 Fc, designated as TAVO6265, comprising heavy chain sequence set forth as SEQ ID NO. 12 and light chain sequence set forth as SEQ ID NO. 14.

The disclosure provides for a third humanized antibody for TAVO202 comprising humanized heavy chain variable region 202H2 and humanized light chain variable region 202L3 with human IgG1 Fc with L234F, L235E, D265A, 17405L mutations, designated as TAVO7264, comprising heavy chain sequence set forth as SEQ ID NO. 15 and light chain sequence set forth as SEQ ID NO. 13.

The disclosure provides for a fourth humanized antibody for TAVO202 comprising humanized heavy chain variable region 202H2 and humanized light chain variable region 202L4 with human IgG1 Fc with L234F, L235E, D265A, F405L mutations, designated as TAVO7265, comprising heavy chain sequence set forth as SEQ ID NO. 15 and light chain sequence set forth as SEQ ID NO. 14.

The disclosure provides for a fifth humanized antibody for TAVO202 comprising humanized heavy chain variable region 202H2 and humanized light chain variable region 202L3 with human IgG1 Fc with L234A, L235A, M428L, N434S mutations, designated as TAVO9764, comprising heavy chain sequence set forth as SEQ ID NO. 16 and light chain sequence set forth as SEQ ID NO. 13.

The disclosure provides for a sixth humanized antibody for TAVO202 comprising humanized heavy chain variable region 202H2 and humanized light chain variable region 202L4 with human IgG1 Fc with L234A, L235A, M428L N434S mutations, designated as TAVO9765, comprising heavy chain sequence set forth as SEQ ID NO. 16 and light chain sequence set forth as SEQ ID NO. 14.

Anti-TSLP humanized antibody Heavy Chain based on 202H2 with IgG2 Fc
(SEQ ID NO: 12)
QVQLVQSGAEVKKPGSSVKVSCKASGYTFSSYWVNWVRQAPGQGLEWIGQI

YPGDGDTDYAQKFQGRATLTADKSTSTAYMELSSLRSEDTAVYFCARGTYY

NNYYGTDYWGQGTTVTVSSASTKGPSVFPLAPCSRSTSESTAALGCLVKDY

FPEPVTVSWNSGALTSGVHTFPAVLQSSGLYSLSSVVTVPSSNFGTQTYTC

NVDHKPSNTKVDKTVERKCCVECPPCPAPPVAGPSVFLFPPKPKDTLMISR

TPEVTCVVVDVSHEDPEVQFNWYVDGVEVHNAKTKPREEQFNSTFRVVSVL

TVVHQDWLNGKEYKCKVSNKGLPAPIEKTISKTKGQPREPQVYTLPPSREE

MTKNQVSLTCLVKGFYPSDIAVEWESNGQPENNYKTTPPMLDSDGSFFLYS

KLTVDKSRWQQGNVFSCSVMHEALHNHYTQKSLSLSPGK

The sequence of variable domain of heavy chain is underlined.

Anti-TSLP humanized antibody Light Chain based on 202L3
(SEQ ID NO: 13)
DIQLTQSPSFLSASVGDRVTITCSVSSSISSSNLHWYQQKPGKAPKPWIYG

TSNLASGVPSRFSGSGSGTEYTLTISSLQPEDAATYYCQQWSSYPLTFGQG

TKLEIKRTVAAPSVFIFPPSDEQLKSGTASVVCLLNNFYPREAKVQWKVDN

ALQSGNSQESVTEQDSKDSTYSLSSTLTLSKADYEKHKVYACEVTHQGLSS

PVTKSFNRGEC

The sequence of variable domain of light chain is underlined.

Anti-TSLP humanized antibody Light Chain based on 202L4
(SEQ ID NO: 14)
EIVLTQSPDFQSVTPKEKVTITCSVSSSISSSNLHWYQQKPDQSPKPWIYG

TSNLASGVPSRFSGSGSGTDYTLTINSLEAEDAATYYCQQWSSYPLTFGQG

TKLEIKRTVAAPSVFIFPPSDEQLKSGTASVVCLLNNFYPREAKVQWKVDN

ALQSGNSQESVTEQDSKDSTYSLSSTLTLSKADYEKHKVYACEVTHQGLSS

PVTKSFNRGEC

The sequence of variable domain of light chain is underlined.

Anti-TSLP humanized antibody Heavy Chain based on 202H2 with IgG1 Fc with L234F, L235E, D265A, F405L mutations
(SEQ ID NO: 15)
QVQLVQSGAEVKKPGSSVKVSCKASGYTFSSYWVNWVRQAPGQGLEWIGQI

YPGDGDTDYAQKFQGRATLTADKSTSTAYMELSSLRSEDTAVYFCARGTYY

NNYYGTDYWGQGTTVTVSSASTKGPSVFPLAPSSKSTSGGTAALGCLVKDY

FPEPVTVSWNSGALTSGVHTFPAVLQSSGLYSLSSVVTVPSSSLGTQTYIC

NVNHKPSNTKVDKKVEPKSCDKTHTCPPCPAPEFEGGPSVFLFPPKPKDTL

MISRTPEVTCVVVAVSHEDPEVKFNWYVDGVEVHNAKTKPREEQYNSTYRV

VSVLTVLHQDWLNGKEYKCKVSNKALPAPIEKTISKAKGQPREPQVYTLPP

SREEMTKNQVSLTCLVKGFYPSDIAVEWESNGQPENNYKTTPPVLDSDGSF

LLYSKLTVDKSRWQQGNVFSCSVMHEALHNHYTQKSLSLSPGK

The sequence of variable domain of heavy chain is underlined. The L234F, L235E, D265A, F405L mutations are bolded.

Anti-TSLP humanized antibody Heavy Chain based on 202H2 with IgG1 Fc with L234A, L235A, M428L, N434S mutations
(SEQ ID NO: 16)
QVQLVQSGAEVKKPGSSVKVSCKASGYTFSSYWVNWVRQAPGQGLEWIGQI

YPGDGDTDYAQKFQGRATLTADKSTSTAYMELSSLRSEDTAVYFCARGTYY

NNYYGTDYWGQGTTVTVSSASTKGPSVFPLAPSSKSTSGGTAALGCLVKDY

FPEPVTVSWNSGALTSGVHTFPAVLQSSGLYSLSSVVTVPSSSLGTQTYIC

NVNHKPSNTKVDKKVEPKSCDKTHTCPPCPAPEAAGGPSVFLFPPKPKDTL

MISRIPEVTCVVVDVSHEDPEVKFBWYVDGVEVHNAKTKPREEQYNSTYRV

VSVLTVLHQDWLNGKEYKCKVSNKALPAPIEKTISKAKGQPREPQVYTLPP

SREEMTKNQVSLTCLVKGFYPSDIAVEWESNGQPENNYKTTPPVLDSDGSF

FLYSKLTVDKSRWQQGNVFSCSVLHEALHSHYTQKSLSLSPGK

The sequence of variable domain of heavy chain is underlined. The L234A, L235A, M428L, N434S mutations are bolded.

The disclosure also provides for preparation of a bispecific antibody or multispecific antibody that can include the engagement of any two, three, or four TSLP epitopes by having Fab or scFv domains comprising the one humanized heavy chain variable region of TAVO202, designated as 202H2, with amino acid sequence set forth as SEQ ID NO. 9 with one of the two humanized light chain variable region of TAVO202, designated as 202L3 and 202L4, with amino acid sequences set forth as SEQ ID NO. 10 and SEQ ID NO.

11, respectively. For instance, this can be a bispecific antibody that has Fab or scFv domains 202H2 with 202L3 and 202H2 with 202L4, or any other permutation of domains that can engagement two, three, or four epitopes.

The TSLP binding antibodies and fragments of the present disclosure encompass antigen-binding fragments that retain sufficient ability to specifically bind to TSLP. The TSLP binding fragments as used herein may include any 3 or more contiguous amino acids (e.g., 4 or more, 5 or more 6 or more, 8 or more, or even 10 or more contiguous amino acids) of the antibody and encompasses Fab, Fab', F(ab')2, and F(v) fragments, or the individual light or heavy chain variable regions or portions thereof. These fragments lack the $F_c$ fragment of an intact antibody, clear more rapidly from the circulation, and can have less non-specific tissue binding than an intact antibody. These fragments can be produced from intact antibodies using well known methods, for example by proteolytic cleavage with enzymes such as papain (to produce Fab fragments) or pepsin (to produce F(ab')2 fragments).

The TSLP binding antibodies and fragments of the present disclosure may also encompass diabodies, which are bivalent antibodies in which VH and VL domains are expressed on a single polypeptide chain, but using a linker that is too short to allow for pairing between the two domains on the same chain, thereby forcing the domains to pair with complementary domains of another chain and creating two antigen binding sites.

The TSLP binding antibodies and fragments of the present disclosure may also encompass single-chain antibody fragments (scFv) that bind to TSLP. An scFv comprises an antibody heavy chain variable region ($V_H$) operably linked to an antibody light chain variable region ($V_L$) wherein the heavy chain variable region and the light chain variable region, together or individually, form a binding site that binds TSLP. Such TSLP binding fragments can be prepared by methods known in the art such as, for example, the synthesis or PCR mediated amplification of the variable portions of the heavy and light chains of an antibody molecule and a flexible protein linker composed of the amino acids Gly and Ser. The resulting DNA fragment is cloned for expression in *E. coli* or mammalian cells. The expressed TSLP binding fragments are purified from the host cells.

The TSLP binding antibodies and fragments of the present disclosure encompass full length antibody comprising two heavy chains and two light chains. Exemplary human or humanized antibodies include IgG, IgM, IgE, IgA, and IgD antibodies. The present antibodies can be of any class (IgG, IgM, IgE, IgGA, IgD, etc.) or isotype. For example, a human antibody can comprise an IgG Fc domain, such as at least one of isotypes, $IgG_1$, $IgG_2$, $IgG_3$ or $IgG_4$.

In some instances, an IgG Fc domain comprises an amino acid sequence having at least 70%, at least 75%, at least 80%, at least 85%, at least 90%, at least 95%, at least 98%, at least 99%, or 100%, amino acid sequence identity to an IgG1 Fc sequence as SEQ ID NO: 17.

In some instances, an IgG Fc domain comprises an amino acid sequence having at least 70%, at least 75%, at least 80%, at least 85%, at least 90%, at least 95%, at least 98%, at least 99%, or 100%, amino acid sequence identity to an IgG2 Fc sequence as SEQ ID NO: 18.

In some instances, an IgG Fc domain comprises an amino acid sequence having at least 70%, at least 75%, at least 80%, at least 85%, at least 90%, at least 95%, at least 98%, at least 99%, or 100%, amino acid sequence identity to an IgG3 Fc sequence as SEQ ID NO: 19.

In some instances, an IgG Fc domain comprises an amino acid sequence having at least 70%, at least 75%, at least 80%, at least 85%, at least 90%, at least 95%, at least 98%, at least 99%, or 100%, amino acid sequence identity to an IgG4 Fc sequence as SEQ m NO: 20. A S228P mutation may be made into IgG4 antibodies to enhance $IgG_4$ stability.

```
IgG₁ F_c (SEQ m NO: 17):
KVEPKSCDKTHTCPPCPAPELLGGPSVFLFPPKPKDTLMISRTPEVTCVVV

DVSHEDPEVKFNWYVDGVEVHNAKTKPREEQYNSTYRVVSVLTVLHQDWLN

GKEYKCKVSNKALPAPIEKTISKAKGQPREPQVYTLPPSRDELTKNQVSLT

CLVKGFYPSDIAVEWESNGQPENNYKTTPPVLDSDGSFFLYSKLTVDKSRW

QQGNVFSCSVMHEALHNHYTQKSLSESPGK

IgG₂ F_c (SEQ ID NO: 18):
TVERKCCVECPPCPAPPVAGPSVFLFPPKPKDTLMISRTPEVTCVVVDVSH

EDPEVQFNWYVDGVEVHNAKTKPREEQENSTFRVVSVLTVVHQDWLNGKEY

KCKVSNKGLPAPIEKTISKTKGQPREPQVYTLPPSREEMTEKNQVSLTCLV

KGFYPSDIAVEWESNGQPENNYKTTPPMLDSDGSFFLYSKLTVDKSRWQQG

NVFSCSVMHEALHNHYTQKSLSLSPGK

IgG₃ F_c (SEQ ID NO: 19):
RVELKTPLGDTTHTCPPCPAPELLGGPSVFLFPPKPKDTLMISRTPEVTCV

VVDVSHEDPEVKFNWYVDGVEVHNAKTKPREEQYNSTYRVVSVLTVLHQDW

LNGKEYKCKVSNKALPAPIEKTISKAKGQPREPQVYTLPPSRDELTKNQVS

LTCLVKGFYPSDIAVEWESNGQPENNYKTTPPVLDSDGSFFLYSKLTVDKS

RWQQGNVFSCSVMHEALHNHYTQKSLSLSPGK

IgG₄ F_c (SEQ ID NO: 20)
RVESKYGPPCPSCPAPEFLGGPSVFLFPPKPKDTLMISRTPEVCVVVDVSQ

EDPEVQFNWYVDGVEVHNAKTKPREEQFNSTYRVVSVLTVLHQDWLNGKEY

KCKVSNKGLPSSIEKTISKAKGQPREPQVYTLPPSQEEMTKNQVSLTCLVK

GFYPSDIAVEWESNGQPENNYKTTPPVLDSDGSFFLYSRLTVDKSRWQEGN

VFSCSVMHEALHNHYTQKSLSLSLGK
```

The present anti-TSLP antibodies may comprise a modified $F_c$ region, wherein the modified $F_c$ region comprises at least one amino acid modification relative to a wild-type $F_c$ region. In some embodiments, the present anti-TSLP antibodies are provided with a modified $F_c$ region where a naturally-occurring $F_c$ region is modified to extend the half-life of the antibody when compared to the parental wild-type antibody in a biological environment, for example, the serum half-life or a half-life measured by an in vitro assay.

Exemplary mutations that may be made singularly or in combinations are T250Q, M252Y, I253A, S254T, T256E, P257I, T307A, D376V, E380A, M428L, H433K, N434S, N434A, N434H, N434F, H435A and H435R mutations, or a fusion of an albumin-binding peptide onto the C terminus of the Fc) with enhanced circulating antibody half-life relative to a control without said Fc mutation.

In certain embodiments, the extension of half-life can be realized by engineering the M252Y/S254T/T256E mutations in IgG1 Fc as SEQ ID NO: 21, residue numbering according to the EU Index (Dall'Acqua, Kiener et al. 2006).

In certain embodiments, the extension of half-life can also be realized by engineering the M428L/N434S mutations in IgG1 Fc as SEQ ID NO: 22 (Zalevsky, Chamberlain et al. 2010).

In certain embodiments, the extension of half-life can also be realized by engineering the T250Q/M428L mutations in IgG1 Fc as SEQ ID NO: 23 (Hinton, Xiong et al. 2006).

In certain embodiments, the extension of half-life can also be realized by engineering the N434A mutations in IgG1 Fc as SEQ ID NO: 24 (Shields, Namenuk et al. 2001).

In certain embodiments, the extension of half-life can also be realized by engineering the T307A/E380A/N434A mutations in IgG1 Fc as SEQ ID NO: 25 (Petkova, Akilesh et al. 2006).

The effect Fc engineering on the extension of antibody half-life can be evaluated in PK studies in mice relative to antibodies with native IgG $F_c$.

IgG$_1$ F$_c$ with M252Y/S254T/T256E mutations
(SEQ ID NO: 21)
KVEPKSCDKTHTCPPCPAPELLGGPSVFLFPPKPKDTLYITREPEVTCVVV

DVSHEDPEVKFNWYVDGVEVHNAKTKPREEQYNSTYRVVSVLTVLHQDWLN

GKEYKCKVSNKALPAPIEKTISKAKGQPREPQVYTLPPSRDELTKNQVSLT

CLVKGFYPSDIAVEWESNGQPENNYKTTPPVLDSDGSFFLYSKLTVDKSRW

QQGNVFSCSVMHEALHNHYTQKSLSLSPGK

IgG$_1$ F$_c$ with M428L/N434S mutations
(SEQ ID NO: 22)
KVEPKSCDKTHTCPPCPAPELLGGPSVFLFPPKPKDTLMISRTPEVTCVVV

DVSHEDPEVKFNWYVDGVEVHNAKTKPREEQYNSTYRVVSVLTVLHQDWLN

GKEYKCKVSNKALPAPIEKTISKAKGQPREPQVYTLPPSRDELTKNQVSLT

CLVKGFYPSDIAVEWESNGQPENNYKTTPPVLDSDGSFFLYSKLTVDKSRW

QQGNVFSCSVLHEALHSHYTQKSLSLSPGK

IgG$_1$ F$_c$ with T250Q/M428L mutations
(SEQ ID NO: 23)
KVEPKSCDKTHTCPPCPAPELLGGPSVFLFPPKPKDQLMISRTPEVTCVVV

DVSHEDPEVKFNWYVDGVEVHNAKTKPREEQYNSTYRVVSVLTVLHQDWLN

GKEYKCKVSNKALPAPIEKTISKAKGQPREPQVYTLPPSRDELTKNQVSLT

CLVGFYPSDIAVEWESNGQPENNYKTTPPVLDSDGSFFLYSKLTVDKSRWQ

QGNVFSCSVLHEALHNHYTQKSLSLSPGK

IgG$_1$ F$_c$ with N434A mutations
(SEQ ID NO: 24)
KVEPKSCDKTHTCPPCPAPELLGGPSVFLFPPKPKDTLMISRTPEVTCVVV

DVSHEDPEVKFNWYVDGVEVHNAKTKPREEQYNSTYRVVSVLTVLHQDWLN

GKEYKCKVSNKALPAPIEKTISKAKGQPREPQVYTLPPSRDELTKNQVSLT

CLVKGFYPSDIAVEWESNGQPENNYKTTPPVLDSDGSFFLYSKLTVDKSRW

QQGNVFSCSVMHEALHAHYTQKSLSLSPGK

IgG$_1$ f$_c$ with T307A/E380A/N434A mutations
(SEQ ID NO: 25)
KVEPKSCDKTHTCPPCPAPELLGGPSVFLFPPKPKDTLMISRTPEVTCVVV

DVSHEDPEVKFNWYVDGVEVHNAKTKPREEQYNSTYRVVSVLAVLHQDWLN

GKEYKCKVSNKALPAPIEKTISKAKGQPREPQVYTLPPSRDELTKNQVSLT

CLVKGFYPSDIAVAWESNGQPENNYKTTPPVLDSDGSFFLYSKLTVDKSRW

QQGNVFSCSVMHEALHAHYTQKSLSLSPGK

In some embodiments, the present anti-TSLP antibodies are provided with a modified F$_c$ region where a naturally-occurring F$_c$ region is modified to enhance the antibody resistance to proteolytic degradation by a protease that cleaves the wild-type antibody between or at residues 222-237 (EU numbering).

In certain embodiments, the antibody or antigen binding fragment thereof further comprises a mutation in the lower hinge region of Fc (e.g., equivalent to residues 222-237 of IgG1 Fc) and allowing for increased protease resistance (e.g., resistance to degradation by MMP-3, MMP-7, MMP-12, MMP-13, cathepsin G, pepsin, IdeS, or GluV8) relative to the native IgG1 antibody in environments with endogenous proteolytic activity.

In certain embodiments, the resistance to proteolytic degradation can be realized by engineering E233P/L234V/L235A mutations in the hinge region with G236 deleted when compared to a parental wild-type antibody as SEQ ID NO: 26, residue numbering according to the EU Index (Kinder, Greenplate et al. 2013).

IgG$_1$ F$_c$ with E233P/L234V/L235A mutations and G236 deleted
(SEQ ID NO: 26)
KVEPKSCDKTHTCPPCPAPPVAGPSVFLFPPKPKDTLMISRTPEVTCVVVD

VSHEDREVKFNWYVDGVEVHNAKTKPREEQYNSTYRVVSVLIVLHQDWLNG

KEYKCKVSNKALPAPIEKTISKAKCQPREPQVYTLPPSRDELTKNQVSLTC

LVKGFYPSDIAVEWESNGQPENNYKTTPPVLDSDGSFFLYSKLTVDKSRWQ

QGNVFSCSVMHEALHNHYTQKSLSLSPGK

In instances where effector functionality is not desired, the antibodies of the disclosure may further be engineered to introduce at least one mutation in the antibody F$_c$ that reduces binding of the antibody to an activating F$_c$γ receptor (F$_c$γR) and/or reduces F$_c$ effector functions such as C1q binding, complement dependent cytotoxicity (CDC), antibody-dependent cell-mediated cytotoxicity (ADCC) or phagocytosis (ADCP).

F$_c$ positions that may be mutated to reduce binding of the antibody to the activating F$_c$γk and subsequently to reduce effector functions are those described for example in (Xu, Alegre et al. 2000) (Vafa, Gilliland et al. 2014) (Bolt, Routledge et al. 1993) (Chu, Vostiar et al. 2008) (Shields, Namenuk et al. 2001). Fc mutations with minimal ADCC, ADCP, CDC, Fc medicated cellular activation have been described also as sigma mutations for IgG1, IgG2 and IgG$_4$ (Tam, McCarthy et al. 2017).

Exemplary mutations that may be made singularly or in combinations are K214T, E233P, L234V, L234A, deletion of G236, V234A, F234A, L235A, G237A, P238A, P238S, D265A, S267E, H268A, H268Q, Q268A, N297A, A327Q, P329A, D270A, Q295A, V309L, A327S, L328F, A330S and P331 S mutations on IgG., IgG$_2$, IgG$_3$ or IgG4.

Exemplary combination mutations that may be made to reduce ADCC are 1.234A/L235A on IgG$_1$, V234A/G237A/P238S/H268A/V309L/A330S/P331S on IgG$_2$, F234A/L235A on IgG$_4$, S228P/F234A/L235A on IgG$_4$, N297A on IgG$_1$, IgG$_2$, IgG$_3$ or IgG$_4$, V234A/G237A on IgG$_2$, K214T/E233P/L234V/L235A/G236-deleted/A327G/P331A/D365E/L358M on IgG$_1$, H268Q/V309L/A330S/P331S on IgG$_2$, S267E/L328F on IgG1, L234F/L235E/D265A on IgG$_1$, L234A/235A/G237A/P238S/H268A/A330S/P331S on IgG$_1$, S228P/F234A/L235A/G 37A/P238S on IgG4, and S228P/F234A1L235A/G236-deleted/G237A/P238S on IgG$_4$. Hybrid IgG$_{2/4}$ F$_c$ domains may also be used, such as F$_c$ with residues 117-260 from IgG$_2$, and residues 261-447 from IgG$_4$.

In some embodiments, the present anti-TSLP antibodies are provided with a modified $F_c$ region where a naturally-occurring $F_c$ region is modified to facilitate the generation of bispecific antibody by $F_c$ heterodimerization.

In certain embodiments, the eterodimerization can be realized by engineering F405L and K409R mutations on two parental antibodies and the generation of bispecific antibody in a process known as Fab arm exchange (Labrijn, Meesters et al. 2014).

In certain embodiments, the Fc heterodimerization can also be realized by Fc mutations to facilitate Knob-in-Hole strategy (see, e.g., Intl. Publ. No. WO 2006/028936). An amino acid with a small side chain (hole) is introduced into one $F_c$ domain and an amino acid with a large side chain (knob) is introduced into the other $F_c$ domain. After co-expression of the two heavy chains, a heterodimer is formed as a result of the preferential interaction of the heavy chain with a "hole" with the heavy chain with a "knob" (Ridgway, Presta et al. 1996).

Exemplary $F_c$ mutation pairs forming a knob and a hole are: T366Y/F405A, T366W/F405W, F405W/Y407A, T394W/Y407T, T394S/Y407A, T366W/T394S, F405W/T394S and T366W/T366S/L368A/Y407V.

In certain embodiments, the Fc heterodimerization can also be realized by Fc mutations to facilitate the electrostatically-matched interactions strategy (Gunasekaran, Pentony et al. 2010). Mutations can be engineered to generate positively charged residues at one Fc domain and negatively charged residues at the other Fc domain as described in US Patent Publ. No. US2010/0015133; US Patent Publ. No. US2009/0182127; US Patent Publ. No. US2010/028637 or US Patent Publ. No. US2011/0123532. Heavy chain heterodimerization can be formed by electrostatically-matched interactions between two mutated Fc.

Antibodies of the disclosure further comprising conservative modifications are within the scope of the disclosure.

"Conservative modifications" refer to amino acid modifications that do not significantly affect or alter the binding characteristics of the antibody containing the amino acid sequences. Conservative modifications include amino acid substitutions, additions and deletions. Conservative substitutions are those in which the amino acid is replaced with an amino acid residue having a similar side chain. The families of amino acid residues having similar side chains are well defined and include amino acids with acidic side chains (e.g., aspartic acid, glutamic acid), basic side chains (e.g., lysine, arginine, histidine), nonpolar side chains (e.g., alanine, valine, leucine, isoleucine, proline, phenylalanine, methionine), uncharged polar side chains (e.g., glycine, asparagine, glutamine, cysteine, serine, threonine, tyrosine, tryptophan), aromatic side chains (e.g., phenylalanine, tryptophan, histidine, tyrosine), aliphatic side chains (e.g., glycine, alanine, valine, leucine, isoleucine, serine, threonine), amide (e.g., asparagine, glutamine), beta-branched side chains (e.g., threonine, valine, isoleucine) and sulfur-containing side chains (cysteine, methionine). Furthermore, any native residue in the polypeptide may also be substituted with alanine, as has been previously described for alanine scanning mutagenesis ((MacLennan, Rice et al. 1998); (Sasaki and Sutoh 1998)). Amino acid substitutions to the antibodies of the disclosure may be made by known methods for example by PCR mutagenesis (U.S. Pat. No. 4,683,195). Alternatively, libraries of variants may be generated for example using random (NNK) or non-random codons, for example DVK codons, which encode 11 amino acids (Ala, Cys, Asp, Glu, Gly, Lys, Asn, Arg, Ser, Tyr, Trp). The resulting antibody variants may be tested for their characteristics using assays described herein.

The antibodies of the disclosure may be post-translationally modified by processes such as glycosylation, isomerization, deglycosylation or non-naturally occurring covalent modification such as the addition of polyethylene glycol moieties (pegylation) and lipidation. Such modifications may occur in vivo or in vitro. For example, the antibodies of the disclosure may be conjugated to polyethylene glycol (PEGylated) to improve their pharmacokinetic profiles. Conjugation may be carried out by techniques known to those skilled in the art. Conjugation of therapeutic antibodies with PEG has been shown to enhance pharmacodynamics while not interfering with function (Leong, DeForge et al. 2001, Yang, Basta et al. 2003, Knight, Jordan et al. 2004).

Antibodies of the disclosure may be modified to improve stability, selectivity, cross-reactivity, affinity, immunogenicity or other desirable biological or biophysical property are within the scope of the disclosure. Stability of an antibody is influenced by a number of factors, including (1) core packing of individual domains that affects their intrinsic stability, (2) protein/protein interface interactions that have impact upon the BC and LC pairing, (3) burial of polar and charged residues. (4) H-bonding network for polar and charged residues; and (5) surface charge and polar residue distribution among other intra- and inter-molecular forces (Worn and Pluckthun 2001). Potential structure destabilizing residues may be identified based upon the crystal structure of the antibody or by molecular modelling in certain cases, and the effect of the residues on antibody stability may be tested by generating and evaluating variants harboring mutations in the identified residues. One of the ways to increase antibody stability is to raise the thermal transition midpoint ($T_m$) as measured by differential scanning calorimetry (DSC). In general, the protein $T_m$ is correlated with its stability and inversely correlated with its susceptibility to unfolding and denaturation in solution and the degradation processes that depend on the tendency of the protein to unfold (Remmele and Gombotz 2000). A number of studies have found correlation between the ranking of the physical stability of formulations measured as thermal stability by DSC and physical stability measured by other methods (Maa and Hsu 1996, Remmele, Nightlinger et al. 1997, Gupta and Kaisheva 2003, Bedu-Addo, Johnson et al. 2004, Zhang, Roy et al. 2004). Formulation studies suggest that a Fab $T_m$ has implication for long-term physical stability of a corresponding mAb.

Antibodies of the disclosure may have amino acid substitutions in the $F_c$ region that improve manufacturing and drug stability. An example for $IgG_1$ is H2245 (or H224Q) in the hinge 221-DKTHTC-226 (Eu numbering) which blocks radically induced cleavage (Yates, Gunasekaran et al. 2010); and for $IgG_4$, the S228P mutation blocks half-antibody exchange (Angal, King et al. 1993, Labrijn, Buijsse et al. 2009).

Expression and purification of the anti-TSLP antibodies

The anti-TSLP antibodies and fragments of the disclosure can be encoded by a single nucleic acid (e.g., a single nucleic acid comprising nucleotide sequences that encode the light and heavy chain polypeptides of the antibody), or by two or more separate nucleic acids, each of which encode a different part of the antibody or antibody fragment.

As a non-limiting example, the disclosure provides nucleic acid sequence as SEQ ID NO: 27 which encodes anti-TSLP humanized antibody heavy chain based on 202H2 with IgG2 Fc, nucleic acid sequence as SEQ II) NO: 28 which encodes the anti-TSLP antibody light chain sequence based on 202L3, and nucleic acid sequence as SEQ ID NO: 29 which encodes the anti-TSLP antibody light chain sequence based on 202L4.

Nucleotide sequence for anti-TSLP humanized antibody heavy chain based on 202H2 with IgG2 Fc (SEQ ID NO: 27)

caagtgcagctggtgcagtccggagccgaggtgaagaagcccggctccagcgtgaaggtgagctgcaaagcctccggctacaccttca gcagctactgggtgaactgggtcagacaagccccggccaaggactggagtggattggccagatctatcccggcgacggcgacaccga ttacgcccagaagttccaaggcagagccacactgaccgccgacaagtccaccagcaccgcctacatggagctgagctctctgaggagcg aggataccgccgtgtacttctgcgctagaggcacctactacaacaactactacggcaccgactactggggccaaggcaccaccgtgaccg tgagcagcgccagcaccaagggcccatccgtcttccccctggccccttgctccagaagcacctccgagagcacagccgccctcggatgt ctggtgaaagactacttccccgagcctgtgaccgtgagctggaacagcggcgccctgacaagcggcgtgcataccttcctgccgtgctgc agagcagcggcctgtactccctgtccagcgtggtgaccgtgcccagcagcaatttcggcacccagacctacacctataacgtggatcaca agccctccaacaccaaagtggacaagaccgtggagaggaagtgctgtgtggaatgccccccttgtcctgcccctcccgtggctggcccca gcgtgttcctcttccctcccaagcccaaggacaccctcatgatcaacagaacacccgaggtgacctgcgtcgtggtggacgtgtcccacga ggaccccgaggtgcagttcaactggtacgtggacggcgtggaggtgcacaacgccaagaccaagcccagggaggagcagttcaattcc accttcagggtggtgagcgtgctgaccgtggtgcaccaggactggctgaacggcaaggagtacaagtgcaaggtgagcaacaagggcc tgcccgcccccatcgaaaagaccatttccaaaaccaaaggccagcccagggagcccagggtgtacacactgcccccagcagagagga gatgacaaagaaccaggtgagcctgacatgcctggtgaagggcttttaccctagcgacatcgctgtggagtgggagagcaacggccagc ccgagaacaactacaagacaaccctcccatgctggattccgatggctccttcttcctgtactccaagctgaccgtggacaagagcaggtg gcagcagggcaacgtgttctcctgttccgtgatgcatgaggccctgcacaaccactacacccagaagtccctgagcctgagcccggcaa g Nucleotide sequence for anti-TSLP humanized antibody light chain based on 202L3

(SEQ ID NO: 28)

gatatccagctgacccagagccccagctttctgagcgctagcgtggggagacagagtgaccatcacatgcagcgtgtccagcagcatcagc agcagcaatctgcactggtaccagcagaagcccggcaaggcccccaagccttggatctacggaaccagcaatctggccagcggcgtgc ctagcagattttccggatccggaagcggcaccgagtacacactgaccatcagctctctgcagcccgaagacgccgctacctactactgcca gcagtggagcagctaccctctgaccttcggccaaggcaccaagctggagatcaagcgtacggtggctgcaccatctgtcttcatcttcccg ccatctgatgagcagttgaaatctggaactgcctctgttgtgtgcctgctgaataacttctatcccagagaggccaaagtacagtggaaggtg gataacgccctccaatcgggtaactcccaggagagtgtcacagagcaggacagcaaggacagcacctacagcctcagcagcaccctga cgctgagcaaagcagactacgagaaacacaaagtctacgcctgcgaagtcacccatcagggcctgagctcgcccgtcacaaagagcttc aacaggggagagtgt Nucleotide sequence for anti-TSLP humanized antibody light chain based on 202L4

(SEQ ID NO: 29)

gagatcgtgctgacccagagccccgatttccagtccgtgaccccaaggagaaggtgaccattacatgctccgtgagcagcagcatcagc agcagcaatctgcactggtaccagcagaagcccgatcagagccccaagccttggatttacggcacaagcaatctggccagcggagtgcc ctccagattcagcggcagcggaagcggcaccgactacacactgaccatcaactctctggaggccgaggatgccgccacctactactgcc agcagtggagcagctaccctctgaccttcggccaaggcaccaagctggaaatcaagcgtacggtggctgcaccatctgtcttcatcttcccg ccatctgatgagcagttgaaatctggaactgcctctgttgtgtgcctgctgaataacttctatcccagagaggccaaagtacagtggaaggtg gataacgccctccaatcgggtaactcccaggagagtgtcacagagcaggacagcaaggacagcacctacagcctcagcagcaccctga cgctgagcaaagcagactacgagaaacacaaagtctacgcctgcgaagtcacccatcagggcctgagctcgcccgtcacaaagagcttc aacaggggagagtat The nucleic acids can be inserted into vectors, e.g., nucleic acid expression vectors and/or targeting vectors. Such vectors can be used in various ways, e.g., for the expression of anti-TSLP binding antibody or antibody fragment in a cell or transgenic animal. Vectors are typically selected to be functional in the host cell in which the vector will be used. A nucleic acid molecule encoding anti-TSLP binding antibody or fragment may be amplified/expressed in prokaryotic, yeast, insect (baculovirus systems) and/or eukaryotic host cells. Selection of the host cell will depend in part on whether the anti-TSLP binding antibody or fragment is to be post-translationally modified (e.g., glycosylated and/or phosphorylated). If so, yeast, insect, or mammalian host cells are preferable. Expression vectors typically contain one or more of the following components: a promoter, one or more enhancer sequences, an origin of replication, a transcriptional termination sequence, a complete intron sequence containing a donor and acceptor splice site, a leader sequence for secretion, a ribosome binding site, a polyadenylation sequence, a polylinker region for inserting the nucleic acid encoding the polypeptide to be expressed, and a selectable marker element.

In most cases, a leader or signal sequence is engineered at the N-terminus of the anti-TSLP antibodies or fragments to guide its secretion. The secretion of anti-TSLP antibodies or fragments from a host cell will result in the removal of the signal peptide from the antibody or fragment. Thus, the mature antibody or fragment will lack any leader or signal sequence. In some cases, such as where glycosylation is desired in a eukaryotic host cell expression system, one may manipulate the various pre-sequences to improve glycosylation or yield. For example, one may alter the peptidase cleavage site of a signal peptide, or add pro-sequences, which also may affect glycosylation.

The disclosure further provides a cell (e.g., an isolated or purified cell) comprising a nucleic acid or vector of the disclosure. The cell can be any type of cell capable of being transformed with the nucleic acid or vector of the disclosure so as to produce a polypeptide encoded thereby. To express the anti-TSLP binding antibodies or fragments, DNAs encoding partial or full-length light and heavy chains, obtained as described above, are inserted into expression vectors such that the genes are operatively linked to transcriptional and translational control sequences.

Methods of introducing nucleic acids and vectors into isolated cells and the culture and selection of transformed host cells in vitro are known in the art and include the use of calcium chloride-mediated transformation, transduction, conjugation, triparental mating, DEAE, dextran-mediated transfection, infection, membrane fusion with liposomes, high velocity bombardment with DNA-coated microprojectiles, direct microinjection into single cells, and electroporation.

After introducing the nucleic acid or vector of the disclosure into the cell, the cell is cultured under conditions suitable for expression of the encoded sequence. The antibody, antigen binding fragment, or portion of the antibody then can be isolated from the cell.

In certain embodiments, two or more vectors that together encode anti-TSLP binding antibodies, or antigen binding fragments thereof, can be introduced into the cell.

Purification of anti-TSLP binding antibodies or fragments which have been secreted into the cell media can be accomplished using a variety of techniques including affinity, immunoaffinity or ion exchange chromatography, molecular sieve chromatography, preparative gel electrophoresis or isoelectric focusing, chromatofocusing, and high-pressure liquid chromatography. For example, antibodies comprising a $F_c$ region may be purified by affinity chromatography with Protein A, which selectively binds the $F_c$ region.

Modified forms of an antibody or antigen binding fragment may be prepared with affinity tags, such as hexahistidine or other small peptide such as FLAG (Eastman Kodak Co., New Haven. Conn.) or myc (Invitrogen) at either its carboxyl or amino terminus and purified by a one-step affinity column. For example, polyhistidine binds with great affinity and specificity to nickel, thus an affinity column of nickel (such as the Qiagen® nickel columns) can be used for purification of polyhistidine-tagged selective binding agents. In some instances, more than one purification step may be employed.

Modified forms of an antibody or antigen binding fragment may be prepared with affinity tags, such as hexahistidine or other small peptide such as FLAG (Eastman Kodak Co., New Haven. Conn.) or myc Invitrogen) at either its carboxyl or amino terminus and purified by a one-step affinity column. For example, poly histidine binds with great affinity and specificity to nickel, thus an affinity column of nickel (such as the Qiagen® nickel columns) can be used for purification of polyhistidine-tagged selective binding agents. In some instances, more than one purification step may be employed.

TSLP

Thymic stromal lymphopoietin, TSLP, is an epithelial cell derived protein belonging to a cytokine family that is implicated in allergic inflammation (Cianferoni and Spergel 2014). It is produced mainly by non-hematopoietic cells such as fibroblasts, epithelial cells and different—like cells, and plays an important role in the maturation of T cell populations through activation of antigen presenting cells. TSLP is produced in response to proinflammatory stimuli and drives allergic inflammatory responses mainly by influence on dendritic cells for T helper (Th) 2 cytokine production.

Human TSLP has two isoforms. The long form of TSLP, lfTSLP, is expressed in several tissues including heart, liver and prostate and induces release of T-cell attracting chemokines from monocytes and enhances the maturation of CD11c-dendritic cells. It can induce allergic inflammation by directly activating mast cells (Reche, Soumelis el al. 2001, Zhang and Zhou 2012). Isoform 2 is the short form of TSLP, sfTSLP, and is the predominant form in keratinocytes of oral mucosa, skin and in salivary glands, and may function as an antimicrobial peptide (Bjerkan, Sonesson et al. 2016). Human TSLP is mapped to chromosome 5q22.1 (Quentmeier, Drexler et al. 2001).

The amino acid sequence of lfTSLP is provided as SEQ ID No. 30, of which the first 28 amino acids constitute the signal peptide and Y29 to Q159 is the mature form. The amino acid sequence of sfTSLP is provided as SEQ ID No. 31.

```
Amino acid sequence for long form TSLP lfTSLP
                                        (SEQ ID NO: 30)
MFPFALLYVLSVSFRKIFILQLVGLVLTYDFTNCDFEKIKAAYLSTISKDL

ITYMSGTKSTEFNNTVSCSNRPHCLTEIQSLTFNPTAGCASLAKEMTFAMK

TKAALAIWCPGYSETQINATQAMKKRRKRKVTTNKCLEQVSQLQGLWRRFN

RPLLKQQ

Amino acid sequence for short form TSLP sfTSLP
                                        (SEQ ID NO: 1
MFAMKTKAALAIWCPGYSETQINATQAMKKRRKRKVTTNKCLEQVSQLQGL

WRRFNRPLLKQQ
```

TSLP receptor (TSLPR) binds TSLP with low affinity and is a member of the hematopoietin receptor family (Park, Martin et al. 2000). A combination of IL-7 receptor alpha chain (IL-7Rα) and TSLPR is required for high affinity binding of TSLP to form the ternary complex (Verstraete, van Schie et al. 2014). The ternary complex is necessary for cell proliferation and signalling.

After binding of TSLP, STAT5 phosphorylation is induced resulting in expression of downstream transcription factors. Although initial results suggest that TSLP engagement on TSLPR complex activates STAT5 without detectable JAK activation, recent results demonstrate that JAK1 and JAK2, which bind to IL-7Rα and TSLPR chain respectively, is required for TSLP-mediated STAT5 activation (Rochman, Kashyap et al. 2010). Other signalling pathways stimulated by many cytokines, such as activation of ERK1,2 and p70S6K, are not involved in TSLP activity (Quentmeier, Drexler et at 2001).

The homology between mouse and human TSLP is 43% and 39% for the TSLPR, with no cross reactivity between the species. Despite the poor amino acid sequence identity between murine and human TSLP and murine and human TSLPR, the fact that high affinity binding of TSLP to its receptor in both species requires IL-7Rα suggest that human TSLP and TLPLR are orthologs to mouse TSLP and TSLPR. Thus, mouse models have been used for various biological studies, including use of a chimeric human TSLP and human TSLPR transgenic mouse strain (Francis, Milford et al. 2016).

TSLP expression is linked to many disease states including asthma (Ying, O'Connor et. al. 2005), inflammatory arthritis (Koyama, Ozawa et at 2007), inflammatory bowel disease (Park, Jeong et al 2017), atopic dermatitis (Ebner, Nguyen et at 2007), eczema, eosinophilic esophagitis and other allergic states (Soumelis and Liu 2004), (Soumelis, Reche et al. 2002). Understanding the mechanism of TSLP production and those potential substances that block the production may enable better methods to prevent or treat these conditions. Thus, targeting TSLP may inhibit multiple biologic pathways involved in asthma and Th2 cytokine mediated inflammatory disorders (Gauvreau, O'Byrne et al. 2014).

Binding and Functional Activity of Anti-MTP Antibodies

The present disclosure encompasses anti-TSLP monoclonal antibodies or antibody fragments that bind selectively to TSLP with greater affinity than to other antigens. The anti-TSLP monoclonal antibodies and fragments may bind selectively to human TSLP, but also bind detectably to non-human TSLP. Alternatively, or additionally, TSLP binding antibodies and antibody fragments may have the same or substantially the same potency against recombinant human TSLP and endogenous human TSLP.

In vitro and cell-based assays are well described in the art for use in determining binding of TSLP antibodies to its target. For example, the binding of TSLP to their receptors may be determined by immobilizing a TSLP binding antibody, sequestering TSLP with the immobilized antibody and determining whether the TSLP is bound to the antibody, and contacting a soluble form of receptor with the bound TSLP/antibody complex and determining whether the soluble receptor is bound to the complex. The protocol may also include contacting the soluble receptors with the immobilized antibody before the contact with TSLP antibody, to confirm that the soluble receptor does not bind to the immobilized antibody. This protocol can be performed using a Biacore® instrument for kinetic analysis of binding interactions, Such a protocol can also be employed to determine whether an antibody or other molecule permits or blocks the binding of TSLP to their receptors.

For other TSLP/receptor binding assays, the permitting or blocking of TSLP binding to its receptor may be determined by comparing the binding of TSLP to its receptor in the presence or absence of TSLP antibodies or TSLP binding fragments thereof. Blocking is identified in the assay readout as a designated reduction of TSLP binding to its receptor in the presence of anti-TSLP antibodies or TSLP binding fragments thereof, as compared to a control sample that contains the corresponding buffer or diluent but not an TSLP antibody or TSLP binding fragment thereof. The assay readout may be qualitatively viewed as indicating the presence or absence of blocking or may be quantitatively viewed as indicating a percent or fold reduction in binding due to the presence of the antibody or fragment. When an TSLP binding antibody or TSLP binding fragment substantially blocks TSLP binding to its receptor, the TSLP binding to its receptor is reduced by at least 10-fold, alternatively at least about 20-fold, alternatively at least about 50-fold, alternatively at least about 100-fold, alternatively at least about 1000-fold, alternatively at least about 10000-fold, or more, compared to binding of the same concentrations of TSLP and its receptor in the absence of the antibody or fragment.

Preferred anti- TSLP antibodies for use in accordance with the disclosure generally bind to human TSLP with high affinity (e.g., as determined with BIACORE), such as for example with an equilibrium binding dissociation constant (KD) for TSLP of about 10 nM or less, about 5 nM or less, about 1 nM or less, about 500 pM or less, or more preferably about 250 pM or less, about 100 pM or less, about 50 pM or less, about 25 pM or less, about 10 pM or less, about 5 pM or less, about 3 pM or less about 1 p44 or less, about 0.75 pM or less, about 0.5 pM or less, or about 0.3 pM or less.

Antibodies or fragments of the present disclosure may, for example, bind to TSLP with an EC50 of about 10 nM or less, about 5 nM or less, about 2 nM or less, about 1 nM or less, about 0.75 nM or less, about 0.5 nM or less, about 0.4 nM or less, about 0.3 nM or less, or even about 0.2 nM or less, as determined by enzyme linked immunosorbent assay (ELISA).

Preferably, the antibody or antibody fragment of the present disclosure does not cross-react with any target other than TSLP. For example, the present antibodies and fragments may bind to TSLP, but do not detectably bind to, or have at least about 100 times (e.g., at least about 150 times, at least about 200 times, or even at least about 250 times) greater selectivity in its binding of TSLP relative to its binding to other proteins.

The key amino acid residues (epitope) bound by the TSLP binding antibody or fragment described in this disclosure may be determined using a peptide array, such as for example, a PepSpot™ peptide array (JPT Peptide Technologies, Berlin, Germany), wherein a scan of twelve amino-acid peptides, spanning the entire TSLP amino acid sequence, each peptide overlapping by 11 amino acid to the previous one, is synthesized directly on a membrane. Alternatively, or in addition, antibody competition experiments may be performed and such assays are well known in the art.

The present disclosure also encompasses neutralizing antibodies or neutralizing fragments thereof which bind to TSLP so as to neutralize its biological activity. Neutralization of biological activity of TSLP can be assessed by assays for one or more indicators of biological activity, such as TSLP stimulated reporter gene expression in a reporter assay. Neutralization of biological activity of TSLP can also be assessed in vivo by animal models of asthma or atopic dermatitis. Preferably the TSLP binding antibodies and fragments of the present disclosure neutralize the biological activity of TSLP connected with the signalling function of their receptors bound by the TSLP.

The present antibodies or fragments may be neutralizing antibodies or fragments which bind specifically to TSLP epitopes that affects biological activity of TSLP. The present antibodies or fragments can bind to neutralization-sensitive epitopes of TSLP. When a neutralization-sensitive epitope of TSLP is bound by one of the present antibodies or fragments, the result is a loss of biological activity containing the epitope.

In certain embodiments, an antibody or fragment thereof of the present disclosure can neutralize, inhibit, block, abrogate, reduce or interfere with, an activity of TSLP by binding to an epitope of TSLP that is directly involved in the targeted activity of TSLP. In another embodiment, an antibody or fragment thereof of the disclosure can neutralize, inhibit, block, abrogate, reduce or interfere with, an activity of TSLP by binding to an epitope of TSLP that is not directly involved in the targeted activity of TSLP, but the antibody or fragment binding thereto sterically or conformationally inhibits, blocks, abrogates, reduces or interferes with, the targeted activity of TSLP. In yet another embodiment, an antibody or fragment thereof of the disclosure binds to an epitope of TSLP that is not directly involved in the targeted activity of TSLP (i.e., a non-blocking antibody), but the antibody or fragment binding thereto results in the enhancement of the clearance of TSLP.

In certain embodiments, the antibody or antigen-binding fragment thereof: a) inhibits binding of TSLP and TSLPR; b) reduces the expression level of an TSLP-dependent gene; c) inhibits TSLP-induced cell proliferation; d) inhibits TSLP-induced STATS activation; and/or e) inhibits TSLP-induced CCL17 production from primary human dendritic cells.

Pharmaceutical Compositions

TSLP binding antibodies and antibody fragments for use according to the present disclosure can be formulated in compositions, especially pharmaceutical compositions, for use in the methods herein. Such compositions comprise a therapeutically or prophylactically effective amount of an TSLP binding antibody or antibody fragment of the disclosure in admixture with a suitable carrier, e.g., a pharmaceutically acceptable agent. Typically, TSLP binding antibodies and antibody fragments of the disclosure are sufficiently purified for administration to an animal before formulation in a pharmaceutical composition.

Pharmaceutically acceptable agents include carriers, excipients, diluents, antioxidants, preservatives, coloring, flavoring and diluting agents, emulsifying agents, suspending agents, solvents, fillers, bulking agents, buffers, delivery vehicles, tonicity agents, cosolvents, wetting agents, complexing agents, buffering agents, antimicrobials, and surfactants.

The composition can be in liquid form or in a lyophilized or freeze-dried form and may include one or more lyoprotectants, excipients, surfactants, high molecular weight structural additives and/or bulking agents.

Compositions can be suitable for parenteral administration. Exemplary compositions are suitable for injection or infusion into an animal by any route available to the skilled worker, such as intraarticular, subcutaneous, intravenous, intramuscular, intraperitoneal, intracerebral (intraparenchymal), intracerebroventricular, intramuscular, intraocular, intraarterial, intralesional, intrarectal, transdermal, oral, and inhaled routes.

Pharmaceutical compositions described herein can be formulated for controlled or sustained delivery in a manner that provides local concentration of the product (e.g., bolus, depot effect) sustained release and/or increased stability or half-life in a particular local environment.

Methods of Use

The present antibodies and fragments are useful for the prophylaxis and treatment of TSLP-mediated diseases or medical conditions, e.g., asthma, allergic rhinitis, atopic dermatitis, allergies, and certain cancers.

One aspect of the disclosure provides a method of treating moderate to severe uncontrolled asthma, including asthma that is not Th2 driven, by administering to a subject in need thereof a therapeutically effective amount of any one of the subject antibody or antigen binding fragment thereof and the subject pharmaceutical composition.

Another aspect of the disclosure provides a method of treating a fibrotic disease and related condition, including systemic sclerosis, systemic idiopathic pulmonary fibrosis, and keloidal disease, by administering to a subject in need thereof a therapeutically effective amount of any one of the subject antibody or antigen binding fragment thereof and the subject pharmaceutical composition.

Another aspect of the disclosure provides a method of treating chronic obstructive pulmonary disease, such as emphysema, chronic bronchitis, and refractory asthma, by administering to a subject in need of a therapeutically effective amount of any one of the subject antibody or antigen binding fragment thereof and the subject pharmaceutical composition.

Another aspect of the disclosure provides a method of treating disorders associated with inflammatory diseases, including rhinitis, atopic dermatitis, eczema, food allergies, and inflammatory bowel disease; the method comprising administering to a subject in need of a therapeutically effective amount of any one of the subject antibody or antigen-binding fragments thereof and the subject pharmaceutical composition.

Another aspect of the disclosure provides a method of treating certain cancers, including lung, breast, pancreatic, colorectal, lymphoblastic leukemia, head and neck carcinomas; the method comprising administering to a subject in need of a therapeutically effective amount of any one of the subject antibody or antigen-binding fragments thereof and the subject pharmaceutical composition.

An aspect of the disclosure also provides uses of any of the antibodies or antigen binding fragments thereof provided herein, in a the manufacture of a medicament for blocking the binding of TSLP to its receptor TLPR, and/or a medicament for the prophylaxis and treatment of TSLP-mediated diseases or medical conditions such as those provided herein. An aspect of the disclosure also provides for use of the provided antibodies or antigen binding fragments thereof for blocking the binding of TSLP to its receptor TLPR and/or for in methods for the prophylaxis and treatment of TSLP-mediated diseases or medical conditions such as those provided herein. For example, in embodiments, the disclosure provides uses the antibodies provided herein in methods for treating asthma, COPD, idiopathic pulmonary fibrosis, atopic dermatitis, eczema, eosinophilic esophagitis, inflammatory bowel disease, systemic sclerosis systemic idiopathic pulmonary fibrosis, keloidal disease, or cancer.

In addition to therapeutic uses, the present antibodies and fragments can be used in diagnostic methods to detect TSLP (for example, in a biological sample, such as serum or plasma), using a conventional immunoassay, such as an enzyme linked immunosorbent assays (Rizos C. V.), an radioimmunoassay (RIA) or tissue immunohistochemistry.

A method for detecting TSLP in a biological sample can comprise the steps of contacting a biological sample with one or more of the present antibodies or fragments and detecting either the antibody or fragment bound to TSLP or unbound antibody or fragment, to thereby detect TSLP in the biological sample. The antibody or fragment can be directly or indirectly labelled with a detectable substance to facilitate detection of the bound or unbound antibody. Suitable detectable substances include various enzymes, prosthetic groups, fluorescent materials, luminescent materials and radioactive materials.

EXAMPLES

The following examples are provided to describe the present disclosure in greater detail. They are intended to illustrate, not to limit, the present disclosure.

Example 1: MT Binding Affinity for Mouse Anti-TSLP Antibody TAVO202

TAVO202 was identified as a mouse anti-human TSLP antibody by hybridoma screening. ELISA-based binding assay was employed to evaluate TAVO202 binding to recombinant human TSLP. In this assay, 1 µg/mL recombinant human TSLP (R&D Systems) were coated on ELISA plate. Increasing concentrations of TAVO202 antibodies were applied on the plate and their binding to the recombinant human TSLP were detected by HRP-conjugated anti-mouse secondary antibody. It was observed that TAVO202 dose-dependently bound recombinant human TSLP with EC50 at 2.4 ng/mL (FIG. 1A).

The binding of TAVO202 to mouse TSLP was also evaluated in similar ELISA assay by coating the plate with mouse TSLP (R&D Systems). TAVO202 did not show significant binding affinity to mouse TSLP (FIG. 1B).

Example 2: In Vitro Assays for TSLP Neutralization by TAVO202

Figure 2B:
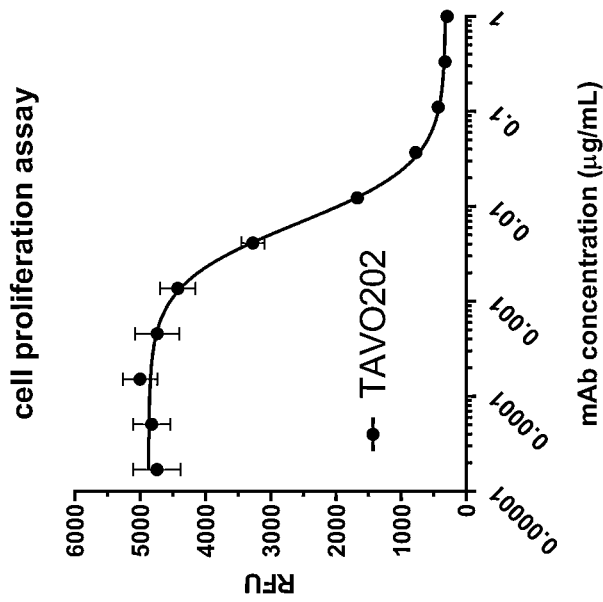
FIG. 2: (A). The response of cell proliferation upon stimulation by human TSLP in BAF cells transfected with human TSLP receptor complex. (B). Dose-dependent neutralizing human TSLP-driven cell proliferation by TAVO202.
Figure 2A:
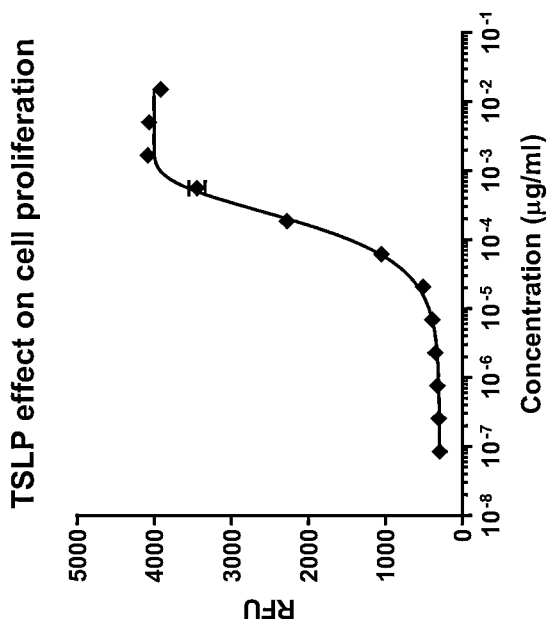

A TSLP-mediated cell proliferation assay was developed to assess functional activity of TAVO202. In this assay, human IL-7 receptor alpha (IL-7Rα) and TSLP receptor (TSLPR) were co-transfected into BAF3 mouse pro-B cells. Recombinant human TSLP was added to the transfected cells and cell proliferation was quantitated with a cell proliferation assay two days later. It was observed that recombinant human TSLP could stimulate the proliferation of the transfected. BAF3 cell line in a dose-dependent manner with EC50 at 0.18 ng/mL (FIG. 2A).

To assess the functional activity of TAVO202, increasing concentrations of TAVO202 along with 0.5 ng/mL human TSLP were applied with BAF3 cells co-transfected with IL-7Rα and TSLPR. It was observed that TAVO202 could dose-dependently neutralize TSLP activity in stimulating transfected BAF3 cell proliferation with IC50 at 6.6 ng/mL (FIG. 2B).

Figure 3B:
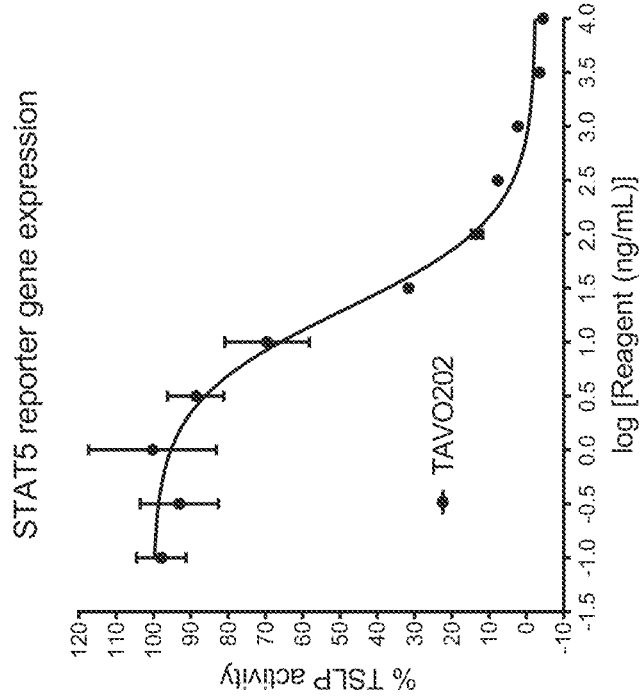
FIG. 3: (A). Dose-dependent STAT5 reporter gene expression upon stimulation by human TSLP in a luciferase reporter assay. (B). Dose-dependent neutralization of reporter gene expression by TAVO202 in human TSLP-driven reporter gene expression assay.
Figure 3A:
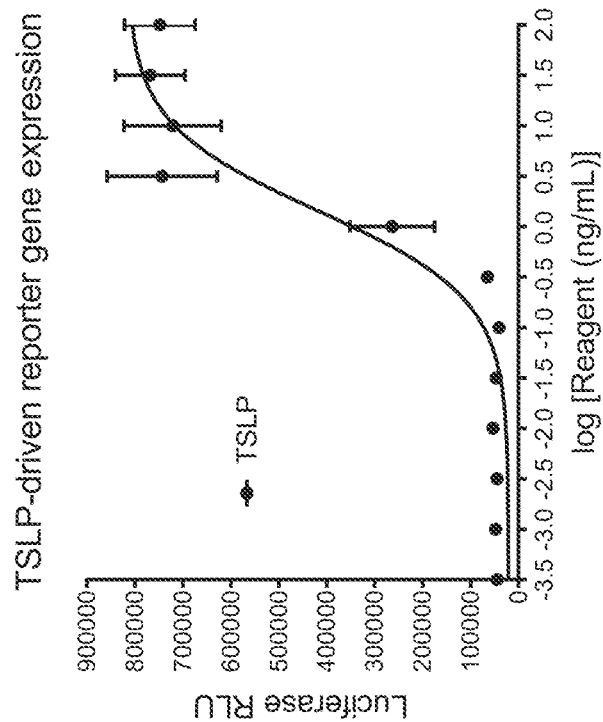

Besides the cell proliferation assay, a TSLP-driven reporter gene expression assay was also developed to assess the functional activity of TAVO202. STAT5 activation is a downstream event that occurs after TSLP binds to and activates its receptor complex (TSLPR:IL-7Rα). In this assay, plasmids expressing TSLPR, IL-7Rα and a STAT5 luciferase reporter construct were transiently transfected into HEK293T cells. One day after transfection, recombinant human TSLP was added and TSLP-driven luciferase reporter gene expression was quantitated 24 hours later. It was observed that human TSLP could dose-dependently drive reporter gene expression with EC50 at 1.4 ng/mL (FIG. 3A).

To assess the functional activity of TAVO202, increasing concentrations of TAVO202 along with 10 ng/mL human TSLP were applied with HEK293T cells co-transfected with IL-7Rα, TSLPR and STAT5 luciferase reporter gene. It was observed that TAVO202 dose-dependently neutralized TSLP activity in stimulating reporter gene expression with IC50 of 20 ng/mL (FIG. 3B).

Example 3: Humanization of Mouse Anti-Human TSLP Antibody TAVO202

The mouse anti-human TSLP antibody TAVO202 was humanized by grafting of mouse CDRs onto human germ-Line scaffolds. A few key mouse residues were preserved by bad(mutations to achieve higher stability and better expression while minimizing immunogenicity. For TAVO202, one humanized $V_H$ variant (202H2) was designed based on IGHV1-69*02 and two humanized $V_L$ variants were designed with 202L3 and 202L4 based on IGKV1-9*01 and IGKV6-21*01 respectively with a couple of back mutations (FIG. 4). By combination of the humanized Vu variant with the two humanized VI, variants, two humanized TAVO202 antibodies with IgG2 Fc, designated as TAVO6264 and TAVO6265, were generated with 202H2 variant pairing with 202L3 and 202L4 respectively (FIG. 4). Likewise, two humanized TAVO202 antibodies with IgG1 Fc with L234Fc L235E, D265A, F405L mutations, designated as TAVO7264 and TAVO7265, were also generated with 202H2 variant pairing with 202L3 and 202L4 respectively. Besides, two humanized TAVO202 antibodies with IgG1 Fc with L234A, L235A, M428L, N434S mutations, designated as 1AV09764 and TAVO9765, were also generated with 202H2 variant pairing with 202L3 and 202L4 respectively (FIG. 4).

Example 4: Expression and Purification of Humanized TAVO202

Plasmids encoding heavy chains and light chains of TAVO6264, TAVO6265, TAVO7264, TAVO7265, TAVO9764, TAVO9765 were co-transfected into Expi293F cells following the transfection kit instructions (Thermo Scientific) Cells were spun down five days post transfection, and the supernatant were passed through a 0.2 µm filter. The purification of expressed antibodies in supernatant was carried out by affinity chromatography over protein A agarose column (GE Healthcare Life Sciences). The purified antibodies were buffer-exchanged into DPBS, pH 7.2 by dialysis, and protein concentrations were determined by UV absorbance at 280 nm.

The purified humanized TAVO202 antibodies were subjected to SDS-PAGE analysis and an example for TAVO7264 and TAVO7265 was shown in FIGS. 5A and 5B. Under the reduced condition, all four antibodies showed heavy chains and light chains with the expected molecular weight. Under the non-reduced condition, all four antibodies migrated as a major protein band with a molecular weight around 150 kDa. The purified humanized TAVO202 antibodies were also assessed by Size Exclusion Chromatography (SEC). FIG. 5C revealed SEC profiles of example antibodies TAVO7264 and TAVO7265.

Example 5: Binding to TSLP by Humanized TAVO202

Figure 6B:
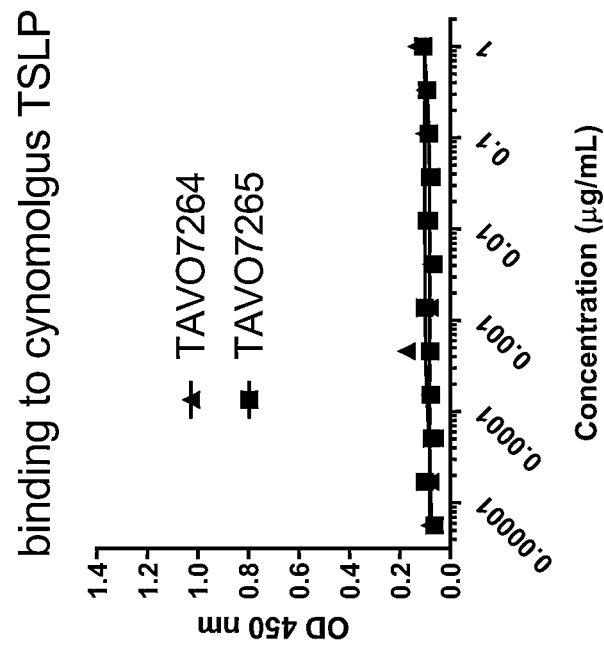
FIG. 6: Binding to (A) human and (B) cynomolgus TSLP by example humanized anti-TSLP IgG antibodies.
Figure 6A:
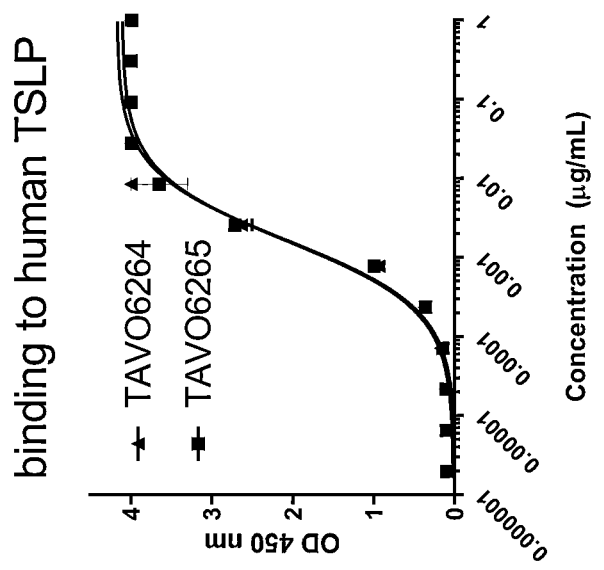

ELISA-based binding assays were employed to evaluate humanized TAVO202 antibodies binding to recombinant human TSLP antigen. In this assay, 1 µg/mL recombinant human TSLP (R&D Systems) were coated on ELISA plate. Increasing concentrations of humanized TAVO202 antibodies were applied on the plate and their binding to the recombinant human TSLP were detected by HRP-conjugated anti-mouse secondary antibody. As an example, it was observed that TAVO6264 and TAVO6265 dose-dependently bound recombinant human TSLP with similar potency and comparable to the mouse antibody TAVO202 (FIG. 6A).

The binding of humanized TAVO202 antibodies on Cynomolgus monkey TSLP were also evaluated in similar ELISA assay by coating the plate with Cynomolgus monkey TSLP. None of TAVO7264 or TAVO7265 antibodies could bind to monkey TSLP (FIG. 6B).

To further measure the binding of humanized antibodies to immobilized recombinant TSLP, surface plasmon resonance (SPR) binding assays will be performed using Biacore. This assay not only can measure binding affinities, but also kinetic rate constants and thermodynamics of binding.

Figure 7:
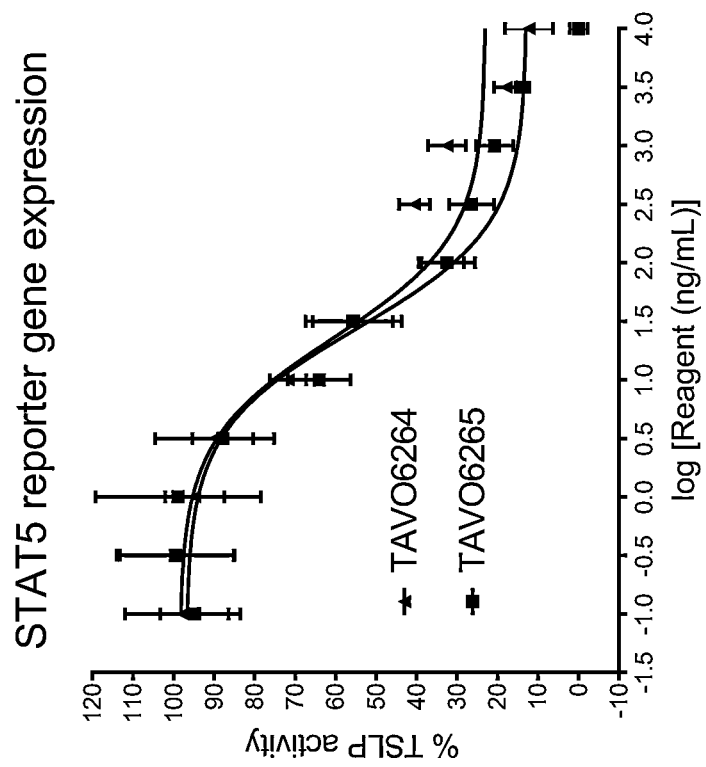
FIG. 7: Neutralizing human TSLP driven reporter gene activation by example humanized anti-TSLP IgG antibodies in STAT5 reporter gene expression assay.

Example 6: In vitro assay for TSLP neutralization by humanized TAVO202 antibodies The TSLP-driven STAT5 luciferase reporter gene expression assay was employed to assess the functional activity of humanized TAVO202 antibodies. Increasing concentrations of TAVO6264 and TAVO6265 along with 10 ng/mL human TSLP were applied with HEK293T cells co-transfected with IL-7Rα, TSLPR and STAT5 luciferase reporter gene. It was observed that both TAVO6264 and TAVO6265 could dose-dependently neutralize TSLP activity in stimulating reporter gene expression with 1050 comparable to TAVO202 (FIG. 7).

Example 7: Inhibition of TSLP-mediated dendritic cell activation by humanized TAVO202

Figure 8:
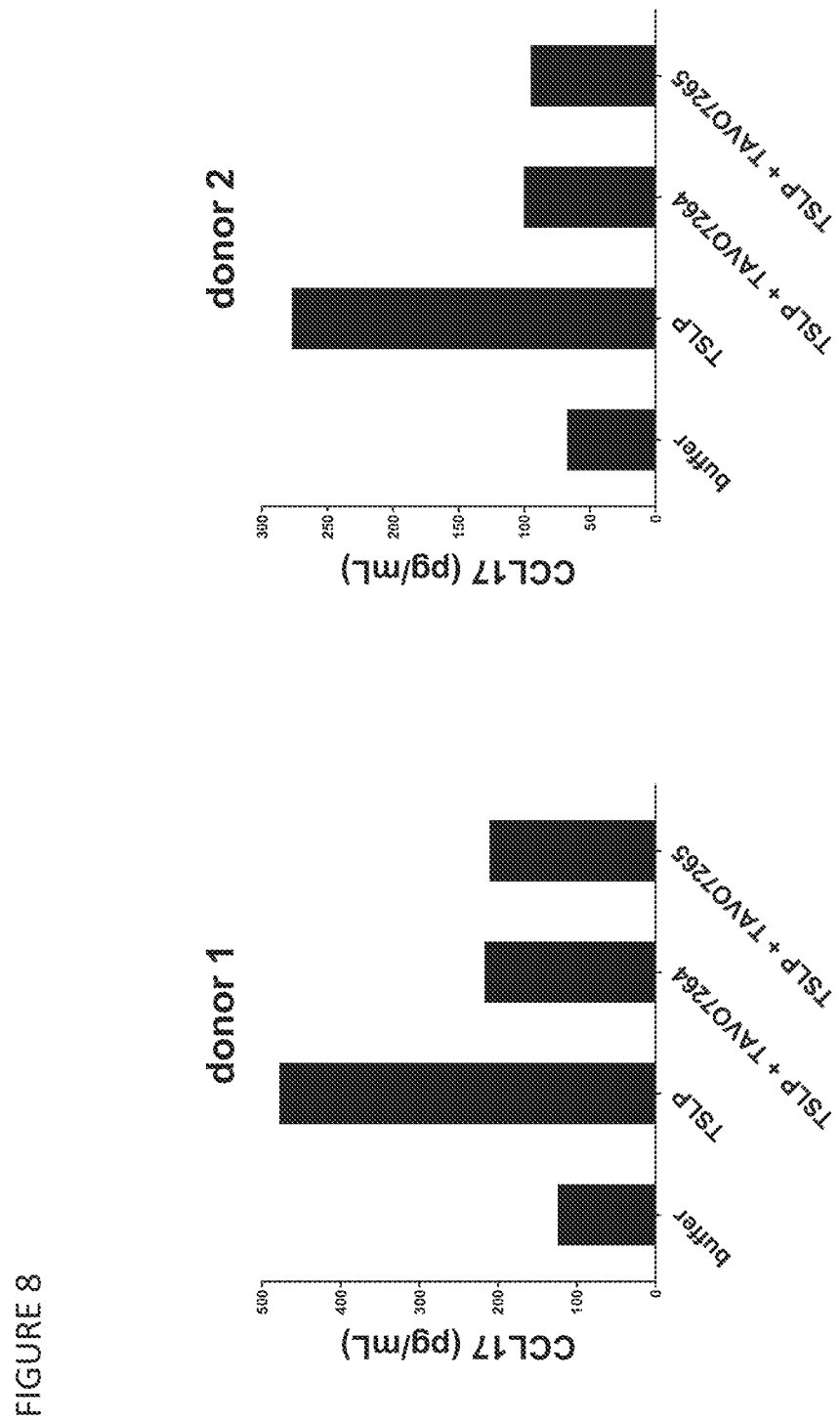
FIG. 8: Neutralizing human TSLP driven CCL17 release from dendritic cells isolated from two donors by humanized anti-TSLP IgG antibodies.

TSLP can stimulate the activation of primary human CD1c+blood dendritic cells with the increased secretion of CCL17 chemokine. An ex vivo assay was set up to evaluate the humanized TAVO202 antibodies in neutralizing TSLP-driven CCL17 release from activated dendritic cells. CD1c±dendritic cells were isolated from donor peripheral blood mononuclear cells (PBMC) by anti-CD1c+antibody coated magnetic beads selection (Miltenyi Biotec). The isolated cells were incubated with recombinant human TSLP and the release of CCL17 was quantitated by ELISA. It was observed that 15 ng/mL recombinant human TSLP could stimulate several folds of enhanced CCL17 release from activated dendritic cells after 48 hours incubation. Both TAVO7264 and TAVO7265 could block TSLP-driven CCL17 release from activated dendritic cells when added at 1 ug/mL along with TSLP. FIG. 8 showed results from assays with PBMC isolated from two different donors.

Example 8: $F_c$ Engineering of Humanized Antibodies for Extended Half-Life and Reduced Effector Functions To improve the PK profile of humanized antibodies, $F_c$ mutations can be introduced to IgG1 antibody to extend antibody half-life. Specifically, M428L/N434S mutations have been demonstrated to extend antibody half-life by increasing FcRn binding affinity (Booth, Ramakrishnan et al. 2018). Furthermore, L234A/L235A $F_c$ mutations can abolish the ADCC and CDC effector functions of IgG1 antibody (Hezareh, Hessen et al. 2001). Therefore, a humanized IgG1 heavy chain based on 202H1 with L234A,1,235, AIM42811N434S (AALS) mutations was generated which comprises sequence set forth as SEQ ID NO. 16. By pairing this Fc-engineered 202H1 heavy chain with either humanized 202L3 or 202L4 light chain, two humanized TAVO202 antibodies with extended half-life and reduced effector functions, were generated and designated as TAVO9764 and TAVO9765, respectively (FIG. 4).

Figure 9:
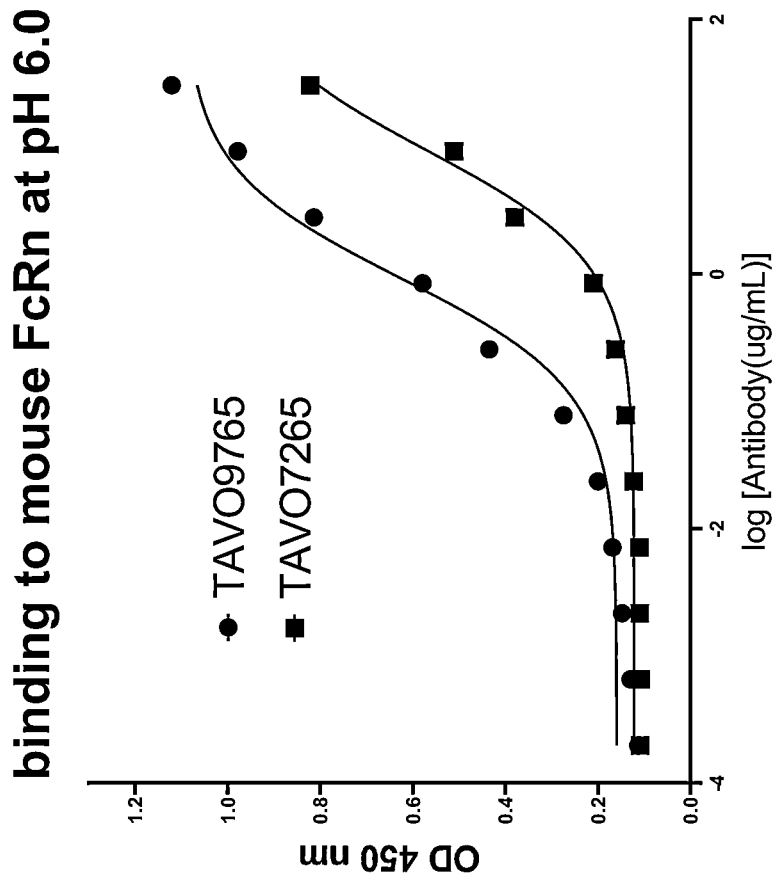
FIG. 9: Binding to mouse FcRn at pH 6.0 by humanized anti-TSLP IgG antibody TAVO9765 with half-life extension Fc mutations and TAVO7265 lacking such mutations.

To study whether the $F_c$ engineered antibody has improved FcRn binding affinity, the binding by TAVO9765 and TAVO7265 to mouse FcRn were assessed in ELISA-based binding assay. 1 µg/mL recombinant mouse FcRn (R&D Systems) were coated on ELISA plate. Increasing concentrations of TAVO9765 and TAVO7265 antibodies were applied on the plate and their binding to the recombinant FcRn under pH 6.0 were detected by HRP-conjugated anti-human secondary antibody. It was observed that TAVO9765, which has the Fc M428L/N434S mutations, could bind FcRn with about 10-fold better potency than TAVO7265 which is lacking such half-life extension mutations (FIG. 9).

Figure 10:
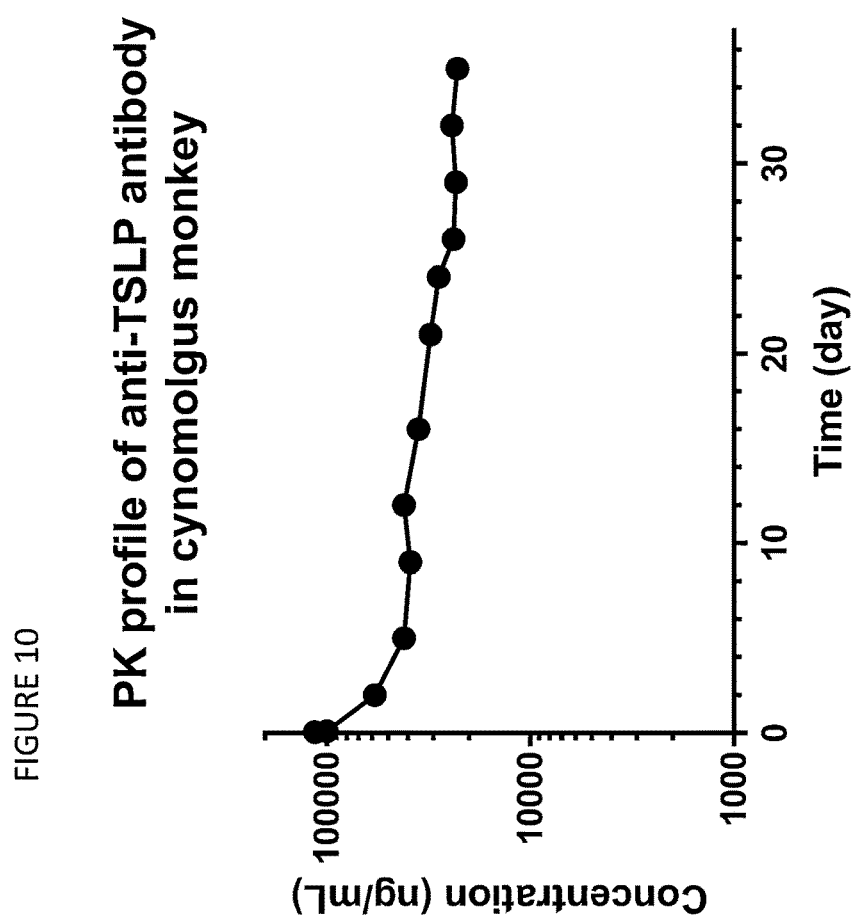
FIG. 10: PK profile of anti-TSLP antibody in a cynomolgus monkey. Anti-TSLP antibody with Fc mutations for half-life extension (TAVO9765) was administered as a 4 mg/kg intravenous dose into a cynomolgus monkey. The plasma concentration is displayed at time points up to day 35 post-dose.

To determine whether the M428L/N434S mutations could extend circulating half-life of an anti-TSLP antibody, TAVO9765 was tested in a cynomolgus monkey PK model. TAVO9765 was administered as an intravenously infusion at 4 mg/kg into a male naive cynomolgus monkey at a volume of 1.0 mL/kg for 3 minutes based on the body weight on day 0. Whole blood was collected into EDTA-K2 collection tubes at pre-dose, and at 111, 2h, and on days 2., 5, 9, 12, 16, 21, 24, 26, 29, 32, 35 post-dose. Plasma was separated by centrifugation at 3500×g for 10 minutes at 4° C., and then transferred to microfuge tubes for storage at −80° C. Plasma samples were measured by a standard ELISA method to detect human IgG. Goat anti-human IgG was the capture antibody and HRP conjugated goat anti-human IgG ($1^1 1 \pm L$) was the detection antibody. Dilution factor for capture and detection antibodies was 13,333 and 30,000, respectively. PK data was analyzed for half-life; $C_0$, AUC, Vd, and clearance using Winnonlin 6.4 software. The PK profile of plasma concentration vs time for TAVO9765 is shown in FIG. 10. PK parameters for TAVO9765 were as follows: $C_0$: 131405 ng·mL$^{-1}$, half-life: 26.131 d, AUC$_{0-4}$: 1268621 ng·d·mL$^{-1}$, AUC$_{0-inf}$: 2128728 ng·d·mL$^{-1}$, clearance: 1.879 mL·kg$^{-1}$·d$^{-1}$, Vd: 71.049 mL·kg$^{-1}$.

REFERENCES

Angal, S., D. J. King, M. W. Bodmer, A. Turner, A. D. Lawson, G. Roberts, B. Pedley and J. R. Adair (1993). "A single amino acid substitution abolishes the heterogeneity of chimeric mouse/human (IgG4) antibody." *Mol Immunol* 30(1): 105-108.

Bedu-Addo, F. K., C, Johnson, S. Jeyarajah, I. Henderson and S. J. Advant (2004), "Use of biophysical characterization in preformulation development of a heavy-chain fragment of botulinutn serotype B: evaluation of suitable purification process conditions." *Pharm. Res.* 21: 1353-1361.

Bjerkan, L., A. Sonesson and K. Schenck (2016). "Multiple Functions of the New Cytokine-Based Antimicrobial Peptide Thymic Stromal Lymphopoietin (TSLP)." *Pharmaceuticals* 9(3): 41.

Bleecker, E. R., J. M. FitzGerald, P. Chanez, A. Papi, S. F. Weinstein, P. Barker, S. Sproule, G. Gilmartin, M. Aurivillius, V. Werkstrom and M. Goldman (2016). "Efficacy and safety of benralizumab for patients with severe asthma uncontrolled with high-dosage inhaled corticosteroids and long-acting beta2-agonists (SIROCCO): a randomised, multicentre, placebo-controlled phase 3 trial." *Lancet* 388(10056): 2115-2127, Bolt, S., E. Routledge, I. Lloyd, L. Chatenoud, H. Pope, S. D. Gorman, M. Clark and H. Waldmann (1993). "The generation of a humanized, non-mitogenic CD3 monoclonal antibody which retains in vitro immunosuppressive properties." *Eur J Immunol* 23(2): 403-411.

Booth, B. J., B. Ramakrishnan, K. Narayan, A. M. Wollacott, G J. Babcock, Z. Shriver and K. Viswanathan (2018). "Extending human IgG half-life using structure-guided design." *MAbs* 10(7): 1098-1110.

Castro, M., J. Corren, I. D. Pavord, J. Maspero, S. Wenzel, K. F. Rabe, W. W. Busse, L. Ford, L. Sher, J. M. FitzGerald, C. Katelaris, Y. Tohda, B. Zhang, H. Staudinger, G. Pirozzi, N. Amin, M. Ruddy, B. Akinlade, A. Khan, J. Chao, R. Martincova, N. M. H. Graham, J. D. Hamilton, B. N. Swanson, N. Stahl, G. D. Yancopoulos and A. Teper (2018). "Dupilumab Efficacy and Safety in Moderate-to-Severe Uncontrolled Asthma." *New England Journal of Medicine* 378(26): 2486-2496.

Castro. M., J. Zangrilli, M. E. Wechsler, E. D. Bateman, G. G Brusselle, P. Bardin, K. Murphy, I F. Maspero, C. O'Brien and S. Korn (2015). "Reslizumab for inadequately controlled asthma with elevated blood eosinophil counts: results from two multicentre, parallel, double-blind, randomised, placebo-controlled, phase 3 trials." *Lancet Respir Med* 3(5): 355-366.

Chothia, C. and A. M. Lesk (1987). "Canonical structures for the hypervariable regions of immunoglobulins." *Mol Biol* 196(4): 901-917.

Chu, S. Y., 1. Vostiar, S. Karki, G. L. Moore, G A. Lazar, E. Pong, P. F. Joyce, D. E. Szymkowski and J. R. Desjarlais (2008). "Inhibition of B cell receptor-mediated activation of primary human B cells by coengagement of CD19 and FcgammaRab with Fc-engineered antibodies." *Mol Immunol* 45(15): 3926-3933.

Cianferoni, A. and J. Spergel (2014). "The importance of TSLP in allergic disease and its role as a potential therapeutic target." *Expert Rev Clin Immunol* 10(11): 1463-1474.

Comeau, M. R., T. N. DESMFDT and D. R. Fitzpatrick (2006). Methods and compositions for treating allergic inflammation. WO 2006023791 A2.

Comeau, M. R, J. F. Smothers, B. R. P. Yoon and C. Mehlin 201 cods of treating TSLP-related inflammatory disorders. US 8,163,284 B2

Corren, I, J. R. Parnes, L. Wang, M. Mo, S. L. Roseti, J. M. Griffiths and R van der Merwe (2017). "Tezepelumab in Adults with Uncontrolled Asthma." *New England Journal of Medicine* 377(10): 936-946.

Corren, J. and Ziegler, S.F. (2019). "TSLP: from allergy to cancer." *Nature Immunology* 20:1603-1609.

Dall'Acqua, W. F., P. A. Kiener and H. Wu (2006). "Properties of human IgGls engineered for enhanced binding to the neonatal Fc receptor (FcRn)." *J Biol Chem* 281(33): 23514-23524, Datta, A, Alexander, R, Sulikowski M. G, et.al. (2013) "Evidence for a functional thymic stromal lymphopoietin signaling axis in fibrotic lung disease." *J Immunol* 191: 4867-79.

De Monte L, et al. (2011). "Intratumor T helper type 2 cell infiltrate correlates with cancer-associated fibroblast thymic stromal lymphopoietin production and reduced survival in pancreatic cancer." *J Exp Med.* 208(3):469-478.

Ebner, S., V. A. Nguyen, M. Forstner, Y. H. Wang, D. Wolfram, Y. J. Liu and N. Romani (2007). "Thymic stromal lymphopoietin converts human epidermal Langerhans cells into antigen-presenting cells that induce proallergic T cells." *J Allergy Clin Immunol* 119(4): 982-990.

Francis, O. L., T. A. Milford, S. R, Martinez, I. Baez. J. S. Coats, K. Mayagoitia, K. R. Concepcion, E. Ginelli, C. Beldiman, A. Benitez, A. J. Weldon, K. Arogyaswamy, P. Shiraz, R. Fisher, C. L. Morris, X. B. Zhang, V. Filippov, B. Van Handel, Z. Ge, C. Song, S. Dovat, R. J. Su and K. J. Payne (2016). "A novel xenograft model to study the role of TSLP-induced CRLF2 signals in normal and malignant human B lymphopoiesis." *Haematologica* 101 (4): 417-426.

Gauvreau, G. M., P. M. O'Byrne, L.-P. Boulet, Y. Wang, D. Cockcroft, J. Bigler, J. M. FitzGerald, M. Boedigheirner, B. E. Davis, C. Dias, K. S. Gorski, L. Smith, E. Bautista, M. R. Comeau , R. Leigh and J. R. Paynes (2014). "Effects of an Anti-TSLP Antibody on Allergen-Induced Asthmatic Responses." *New England Journal of Medicine* 370(22): 2102-2110, Gunasekaran, K., M. Pentony, NI. Shen, L. Garrett, C. Forte, A. Woodward, S. B. Ng, T. Born, M. Retter, K. Manchulenko, H. Sweet, I. N. Foltz, M. Wittekind and W. Yan (2010). "Enhancing antibody Fc heteroditner formation through electrostatic steering effects: applications to hispecific molecules and monovalent IgG." *J Biol Chem* 285(25): 19637-19646.

Gupta, S. and E. Kaisheva (2003). "Development of a multidose formulation for a humanized monoclonal antibody using experimental design techniques." *AAPS PharmSci.* 5E8: 2003.

Headley M B, Zhou B, Shih W X, Aye T, Comeau M R, Ziegler S F. (2009) "TSLP conditions the lung immune environment for the generation of pathogenic innate and antigen-specific adaptive immune responses." *J immunol.* 182(3):1641-1647.

Hezareh, M., A. J. HesseU, R. C. Jensen, J. G. van de Winkel and P. W. Parren (2001). "Effector function activities of a panel of mutants of a broadly neutralizing antibody against human immunodeficiency virus type 1." *J Virol* 75(24): 12161-12168.

Hinton, P. R, J. M. Xiong, M. G. Johlfs, M. T. Tang, S. Keller and N. Tsurushita (2006). "An engineered human IgG1 antibody with longer serum half-life." *J Immunol* 176(1): 346-356.

Kabat, E. A., H. National Institutes of and U. Columbia (1991). *Sequences of proteins of immunological interest*. Bethesda, Md., U.S. Dept. of Health and Human Services, Public Health Service, National Institutes of Health.

Kay, B. (2001). "Allergy and Allergic Diseases." *New England Journal of Medicine* 344(1): 30-37.

Kinder, M., A. R. Greenplate, K. D. Grugan, K. L. Soring, K. A. Heeringa, S. G. McCarthy, G. Bannish, M. Perpetua, F. Lynch, R. E. Jordan, W. R. Strobl and R. J. Brerski. (2013). "Engineered protease-resistant antibodies with selectable cell-killing functions," *J Biol Chem* 288(43): 30843-30854.

Knight, D. M., R. E. Jordan, M. Kruszynski, S. H. Tam, J. Giles-Komar, G. Tracy and G. A. Heavner (2004). "Pharmacodynamic enhancement of the anti-platelet antibody fab abciximab by site-specific pegylation." *Platelets* 15(7): 409-418.

Koyama, K., T. Ozawa, K. Hatsushika, T. Ando, S. Takano, M. Wako, F. Suenaga, Y. Ohnuma, T. Ohba, R. Katoh, H. Sugiyama, Y. Hamada, H. Ogawa, K. Okumura and A. Nakao (2007). "A possible role for TSLP in inflammatory arthritis." *Biochemical and Biophysical Research Communications* 357(1): 99-104.

Labrijn, A. F., A. O. Buijsse, E. T. van den Bremer, A. Y. Verwilligen, W. K. Bleeker, S. J. Thorpe, J. Killestein, C. H. Polinan, R. C. Aalberse, J. Schuurinan, J. G. van de Winkel and P. W. Parren (2009). "Therapeutic IgG$_4$ antibodies engage in Fab-arm exchange with endogenous human IgG$_4$ in vivo." *Nat Biotechnol* 27(8): 767-771.

Labrijn, A. F., J. I. Meesters, B. E. de Goeij, E. T. van den Bremer, J. Neijssen, M. D. van Kampen, K. Strumane, S. Verploegen, A. Kundu, M. J. Granter, P. H. van Berkel, J. G. van de Winkel, J. Schuurman and P. W. Parren (2014). "Efficient generation of stable bispecific IgG1 by controlled Fab-arm exchange." *Proc Natl Acad Sci U S A* 110(13): 5145-5150.

Lefranc, M, P., C. Pomrnie, M, Ruiz, V. Giudicelli, E. Foulquier, L. Truong, V. Thouvenin-Contet and G Lefranc (2003). "IMGT unique numbering for immunoglobulin and T cell receptor variable domains and Ig superfamily V-like domains." *Dev Comp Immunol* 27(1): 55-77.

Leong, S. R., L. DeForge, L. Presta, T. Gonzalez, A. Fan, M. Reichert, A. Chuntharapai, K. J. Kim, D. B. Tumas, W. P. Lee, P. Gribling, B. Snedecor, H. Chen, V. Hsei, M. Schoenhoff, V.

Hale, J. Deveney, I. Koumenis, Z. Shahrokh, P. McKay, W. Galan, B. Wagner, D. Narindray, Hebert and G. Zapata (2001). "Adapting pharmacokinetic properties of a humanized anti-interleukin-8 antibody for therapeutic applications using site-specific pegylation." *Cytokine* 16(3): 106-119.

Liu, Y. J., V. Soumelis, N. Watanabe, T. Ito, Y. H. Wang, W, Malefyt Rde, M. Omori, B. Zhou and S. F. Ziegler (2007). "TSLP: an epithelial cell cytokine that regulates T cell differentiation by conditioning dendritic cell maturation." *Annu Rev Immunol* 25: 193-219.

Maa, Y. F. and C. C. Hsu (1996). "Aggregation of recombinant human growth hormone induced by phenolic compounds." *Int. J. Pharm.* 140: 155-168.

MacLennan, D. H., W. J. Rice, A. Odermatt and N. M. Green (1998). "Structure-function relationships in the Ca(2+)-binding and translocation domain of SERCA.1: physiological correlates in Brody disease." *Acta Physiol Scand Suppl* 643: 5:5-67.

Moret P. M, Hack C. E, van der Wurff-Jacobs K M, Radstake T R, Lafeber F P, van Roon J A. (2014) "Thymic stromal lymphopoietin, a novel proinflammatory mediator in rheumatoid arthritis that potently activates CD1c+ myeloid dendritic cells to attract and stimulate T cells." *Arthritis Rheumatol.* 66(5):1176-1184.

Ortega, H. G, M. C. Liu. I. D. Pavord, G. G Brusselle, J. M. FitzGerald, A. Chetta, M. Humbert, L. E. Katz, O. N. Keene, S. W. Yancey and P. Chanez (2014). "Mepolizumab treatment in patients with severe eosinophilic asthma." *N Engl J Med* 371(13): 1198-1207.

Park, J. H., D. Y. Jeong, L. Peyrin-Biroulet, M. Eisenhut and J. I. Shin (2017). "Insight into the role of TSLP in inflammatory bowel diseases." *Autoitnmun Rev* 16(1): 55-63.

Park, L. S., U. Martin, K. Garka, B. Gliniak, J. P. Di Santo, W. Muller, D. A. Largaespada, N. G. Copeland, N. A. Jenkins, A. G Farr, S. F. Ziegler, P. J. Morrissey, R. Paxton and J. E. Sims (2000), "Cloning of the murine thymic stromal lymphopoietin (TSLP) receptor: Formation of a functional heterotneric complex requires interleukin 7 receptor." *J Exp Med* 192(5): 659-670.

Pawankar, R. (2014). "Allergic diseases and asthma: a global public health concern and a call to action." *World Allergy Organization Journal* 7(1): 1-3.

Petkova, S. B., S. Akilesh, T. J. Sproule, G. J. Christianson, H. Al Khabbaz, A. C. Brown, L. G.

Presta, Y. G Meng and D. C. Roopenian (2006). "Enhanced half-life of genetically engineered human IgG1 antibodies in a humanized FcRn mouse model: potential application in humorally mediated autoimmune disease." *Int Immunol* 18(12): 1759-1769.

Quentmeier, H., H. G Drexler, D. Fleckenstein, M. Zaborski, A. Armstrong, J. E. Sims and S. D. Lyman (2001). "Cloning of human thymic stromal lymphopoietin (TSLP) and signaling mechanisms leading to proliferation." *Leukemia* 15(8): 1286-1292.

Piliponsky AM, Lahiri A, Truong, P et al. (2016) "Thymic strornal lymphopoietin improves survival and reduces inflammation in sepsis." *Am J Respir Cell Mol Biol.* 55(2): 264-274, Reche, P. A., V. Soumelis, D. M. Gorman, T. Clifford, M. Liu, M. Travis, S. M. Zurawski, J. Johnston, Y. J. Liu, H. Spits, R. de Waal Malefyt, R. A. Kastelein and J. F. Bazan (2001). "Human thymic stromal lymphopoietin preferentially stimulates myeloid cells." *J Immunol* 167(1): 336-343.

Remmele, R. L and W. R. Gombotz (2000). "Differential scanning calorimetry: A practical tool for elucidating stability of liquid biopharmaceuticals." *Biopharm.* 13: 36-46.

Remmele, R. L., N. S. Nightlinger, S. Srinivasan and W. R. Gombotz (1997). "Interleukin-1 receptor (1L-1R) liquid formulation development using differential scanning calorimetry." *Pharm. Res.* 15: 200-208.

Ridgway, J. B., L. G. Presta and P. Carter (1996). "'Knobs-into-holes' engineering of antibody $C_{H3}$ domains for heavy chain heterodimerization." *Protein Eng* 9(7): 617-621.

Rizos F. M. E. M. 5, (2017). "The role of angiopoietin-like 3 in the metabolism of lipoproteins: therapeutic perspectives," *Hell J Atheroscler* 8: 61-66.

Rochman, Y., M. Kashyap, G. W. Robinson, K. Sakamoto, J. Gomez-Rodriguez, K. U. Wagner and W. J. Leonard (2010). "Thymic stromal lymphopoietin-mediated STATS phosphorylation via kinases JAK1 and JAK2 reveals a key difference from IL-7-induced signaling." *Proc Natl Acad Sci U S A* 107(45): 19455-19460.

Rochman, Y. and W. J. Leonard (2008). "Thymic stromal lymphopoietin: a new cytokine in asthma." *Curr Opin Pharmacol* 8(3): 249-254.

Sasaki, N. and K. Sutoh (1998). "Structure-mutation analysis of the ATPase site of *Dictyostelium discoideum* myosin II." *Adv Biophys* 35: 1-24.

Shields, R. L, A. K. Natnenuk, K. Hong, Y. G. Meng, J. Rae, J. Briggs, D. Xie, J. Lai, A. Stadlen, B. Li, J. A. Fox and L. G. Presta (2001). "High resolution mapping of the binding site on human IgG1 for Fc gamma RI, Fc gamma RII, Fc gamma RIII, and FcRn and design of IgG1 variants with improved binding to the Fc gamma R" *J Biol Chem* 276(9): 6591-6604.

Sokol, C. L., G. M. Barton, A. G. Farr and R. Medzhitov (2008). "A mechanism for the initiation of allergen-induced T helper type 2 responses." *Nat Immunol* 9(3): 310-318.

Soumelis, V. and Y. J. Liu (2004). "Human thymic stromal lymphopoietin: a novel epithelial cell-derived cytokine and a potential key player in the induction of allergic inflammation." *Springer Semin Immunopathol* 25(3-4): 325-333.

Soumelis, V., P. A. Reche, H. Kanzler, W. Yuan, G. Edward, B. Homey, M. Gilliet, S. Ho, S. Antonenko, A. Lauerma, K. Smith, D. Gorman, S. Zurawski, J. Abrams, S. Menon, T. McClanahan, R. de Waal-Malefyt Rd, F. Bazan, R. A. Kastelein and Y. J. Liu (2002). "Human epithelial cells trigger dendritic cell mediated allergic inflammation by producing TSLP." *Nat Immunol* 3(7): 673-680.

Tam, S. H., S. G. McCarthy, A. A. Armstrong, S. Somani, S. J. Wu, X. Liu, A. Gervais, R Ernst, D. Saro, R Decker, J. Luo, G. L Gilliland, M. L. Chiu and B. J. Scallon (2017). "Functional, Biophysical, and Structural Characterization of Human IgG1 and IgG4 Fc Variants with Ablated Immune Functionality." *Antibodies (Basel)* 6(3).

Usategui A, Criado G, Izquierdo E et al. (2013) "A profibrotic role for thymic stromal lymphopoietin in systemic sclerosis." *Ann Rheum Dis* 72:2018-23.

Vafa, O., G, L. Gilliland, R. J. Brerski, B. Strake, T. Wilkinson, E. R. Lacy, B. Scallon, A. Teplyakov, T. J. Malia and W. R. Stroll (2014). "An engineered Fc variant of an IgG eliminates all immune effector functions via structural perturbations." *Methods* 65(1): 114-126.

Vannella K. M, et al. (2016). "Combinatorial targeting of TSLP, IL-25, and IL-33 in type 2 cytokie-driven inflammation and fibrosis." *Sci. Transl, Med.* 8(337):337ra65, Verstraete, K., L. van Schie, L. Vyncke, Y. Bloch, J. Tavernier, E. Pauwels, F. Peelman and S. N. Savvides (2014). "Structural basis of the proinflammatory signaling complex mediated by TSLP." Nat Struct Mol Biol 21(4): 375-382.

Worn, A. and A. Pluckthun (2001). "Stability engineering of antibody single-chain Fv fragments," *J Mol Biol* 305(5): 989-1010.

Wu, T. T, and E. A. Kabat (1970). "An analysis of the sequences of the variable regions of Bence Jones proteins and myeloma light chains and their implications for antibody complementarity." *J Exp Med* 1.32(2): 211-250.

Xu, D., M. L. Alegre, S. S. Varga, A. L. Rothermel, A. M. Collins, V. L. Pulito, L. S. Hanna, K. P. Dolan, P. W. Parren, J. A. Bluestone, L. K. Jolliffe and R., A. Zivin (2000). "In vitro characterization of five humanized OKT3 effector function variant antibodies." *Cell Immunol* 200(1): 16-26.

Yang, K., A. Basu, M. Wang, R. Chintala, M. C. Hsieh, S. Liu, J. Hua, Z. Zhang, J. Zhou, M. Li, H. Phyu, G. Petti, M. Mendez, H. Janjua, P. Peng, C. Longley, V. Borowski, M. Mehlig and D. Filpula (2003). "Tailoring structure-function and pharmacokinetic properties of single-chain Fv proteins by site-specific PEGylation." Protein Eng 16(10): 761-770.

Yates, Z., K. Gunasekaran, H. Zhou, Z. Hu, Z. Liu, R. R. Ketchem and B. Yan (2010). "Histidine residue mediates radical-induced hinge cleavage of human IgG1." *Biol Chem* 285(24): 18662-18671

Ying G, Zhang y, Tang G, Chen S. (2015) "Functions of thymic stromal lymphopoietin in non-allergic diseases." *Cell Immunol* 295:144-9.

Ying, S., B. O'Connor, J. Ratoff, Q. Meng, K. Mallett, D. Cousins, D. Robinson, G Zhang, J. Zhao, T. H. Lee and C. Corrigan (2005). "Thymic Stromal Lymphopoietin Expression Is Increased in Asthmatic Airways and Correlates with Expression of Th2-Attracting Chemokines and Disease Severity." *The Journal of Immunology* 174 (12): 8183-8190.

Zalevsky, J., A. K. Chamberlain, H. M. Horton, S. Karki., I. W. Leung, T. J. Sproule, G. A. Lazar, D. C, Roopenian and J. R. Desjarlais (2010). "Enhanced antibody half-life improves in vivo activity." *Nat Biotechnol* 28(2): 157-159.

Zhang, Y., S. Roy, L. S. Jones, S. Krishnan, B. A. Kerwin, B. S. Chang, M. C. Manning, T. W. Randolph and J. F. Carpenter (2004). "Mechanism for benzyl alcohol-induced aggregation of recombinant human interleukin-1 receptor antagonist in aqueous solution." *J. Pharm. Sci.* 93: 3076-3089.

Zhang, Y. and B. Zhou (2012). "Functions of Thymic StromalStrorrial Lymphopoietin in Immunity and Disease." *Immunologic Research* 52(3): 211-223.

Zhong, J., J. Sharma, R. Raju, S. M. Palapetta, T. S. K. Prasad, T.-C. Huang, A. Yoda, J. W. Tyner, D. van Bodegom, D. M. Weinstock, S. F. Ziegler and A. Pandey (2014). "TSLP signaling pathway map: a platform for analysis of TSLP-mediated signaling." *Database: the journal of biological databases and curation* 2014: bau007-bau007.

Ziegler, S. F., F. Roan, B. D. Bell, T. A. Stoklasek, Kitajima and H. Han (2013). "The biology of thymic stromal lymphopoietin (TSLP)." *Advances in pharmacology* (San Diego. Calif.) 66: 129-155.

What is claimed:

1. An isolated antibody or an antigen-binding fragment thereof that specifically binds to thymic stromal lymphopoietin TSLP and neutralizes, inhibits, blocks, abrogates, reduces, or interferes with an activity of TSLP;
   wherein the isolated antibody or an antigen-binding fragment thereof comprises complementarity determining region (CDR) sequences HCDR1, HCDR2, HCDR3 of the heavy chain as according to SEQ ID NO: 3, SEQ ID NO: 4 and SEQ ID NO: 5, respectively; and
   wherein the isolated antibody or an antigen-binding fragment thereof comprises complementarity determining region (CDR) sequences LCDR1, LCDR2, LCDR3 of the light chain as according to SEQ ID NO: 6, SEQ ID NO: 7 and SEQ ID NO: 8, respectively.

2. The antibody or antigen-binding fragment thereof of claim 1, wherein the antibody or fragment is a mouse monoclonal antibody or antibody fragment with the heavy chain variable region set forth as SEQ ID NO: 1 and the light chain variable region set forth as SEQ ID NO: 2.

3. The antibody or antigen-binding fragment of claim 1, wherein the antibody or fragment is a humanized antibody or antibody fragment.

4. The antibody or antigen-binding fragment of claim 3, wherein the humanized antibody or fragment comprises a heavy chain variable region set forth as SEQ ID NO: 9.

5. The antibody or antigen-binding fragment of claim 3, wherein the humanized antibody or fragment comprises a light chain variable region set forth as SEQ ID NO: 10.

6. The antibody or antigen-binding fragment of claim 3, wherein the humanized antibody or fragment comprises a light chain variable region set forth as SEQ ID NO: 11.

7. The antibody or antigen-binding fragment of claim 3, wherein the antibody or antigen-binding fragment comprises a heavy chain variable region having at least 80% sequence identity to SEQ ID NO: 9 and a light chain variable region having at least 80% sequence identity to SEQ ID NO: 11.

8. The antibody or antigen-binding fragment of claim 3, wherein the humanized antibody comprises a human IgG heavy chain sequence set forth as SEQ ID NO: 12.

9. The antibody or antigen-binding fragment of claim 3, wherein the humanized antibody comprises a human light chain sequence set forth as SEQ ID NO: 13.

10. The antibody or antigen-binding fragment of claim 3, wherein the humanized antibody comprises a human light chain sequence set forth as SEQ ID NO: 14.

11. The antibody or antigen-binding fragment of claim 3, wherein the humanized antibody comprises a human IgG heavy chain sequence set forth as SEQ ID NO: 15.

12. The antibody or antigen-binding fragment of claim 3, wherein the humanized antibody comprises a human IgG heavy chain sequence set forth as SEQ ID NO: 16.

13. The antibody or antigen-binding fragment of claim 3, wherein the antibody is an $IgG_1$, $IgG_2$, $IgG_3$ or $IgG_4$ isotype.

14. The antibody or antigen-binding fragment of claim 3, wherein the antibody has one or more $F_c$ mutations that extend the half-life of the engineered antibody compared to the parental wild-type antibody.

15. The antibody or antigen-binding fragment of claim 3, wherein the antibody has one or more $F_c$ mutations that enhance the engineered antibody resistance to proteolytic degradation by a protease compared to the parental wild-type antibody.

16. The antibody or antigen-binding fragment of claim 3, wherein the antibody has one or more $F_c$ mutations that reduce or eliminate the effector functions of engineered antibody compared to the parental wild-type antibody.

17. The antibody or antigen-binding fragment of claim 16, wherein the antibody has L234A, L235A, M428L and N434S Fc mutations that extend the half-life and reduce the effector functions of the engineered antibody, residue numbering according to the EU Index, compared to the parental wild-type antibody.

18. The antibody or antigen-binding fragment of claim 17, wherein the humanized antibody or fragment comprises a human IgG1 heavy chain with L234A, L235A, M428L, N434S Fc mutations set forth as SEQ ID NO: 16.

19. The antibody or antigen-binding fragment of claim 3, wherein the antibody or fragment blocks the binding of human TSLP to its receptor complex.

20. The antibody or antigen-binding fragment of claim 3, wherein the antibody or fragment neutralizes, reduces, or interferes the functional activity of TSLP to its receptor complex.

21. The antibody or antigen-binding fragment of claim 3, wherein the antibody or fragment neutralizes the TSLP-driven reporter gene activation in STATS reporter gene assay.

22. The antibody or antigen-binding fragment of claim 3, wherein the antibody or fragment neutralizes the TSLP-driven proliferation of cells expressing TSLP receptor complex in cell proliferation assay.

23. The antibody or antigen-binding fragment of claim 3, wherein the antibody or fragment inhibits the TSLP-driven cytokine release from human dendritic cells in cytokine release assay.

24. The antibody or antigen-binding fragment of claim 3, wherein the antibody or fragment inhibits the TSLP-driven asthma and lung inflammation in animal asthma model.

25. An isolated polynucleotide encoding the anti-TSLP IgG antibody thereof of claim 3.

26. A vector comprising the polynucleotide of claim 25.

27. The vector of claim 26, which is an expression vector.

28. A host cell comprising the vector of claim 26.

29. A method of producing the anti-TSLP IgG antibody or fragment as in claim 5, comprising culturing the host cell of claim 27 in conditions wherein the anti-TSLP IgG antibody or fragment is expressed, and isolating the anti-TSLP IgG antibody or fragment.

30. A method of measuring the half-life of the anti-TSLP IgG antibody or fragment as in claim 3.

31. A method of measuring the resistance to proteolytic degradation of the anti-TSLP IgG antibody or fragment as in claim 3.

32. A method of measuring the effector functions of the anti-TSLP IgG antibody or fragment as in claim 3.

33. A method for treating a TSLP mediated disease or disorder in a subject in need thereof, comprising administering to the subject an effective amount of the anti-TSLP IgG antibody or fragment according to claim 3.

34. The method according to claim 33, wherein the TSLP mediated disease or disorder is asthma, including moderate to severe uncontrolled asthma.

35. The method according to claim 33, wherein the TSLP mediated disease or disorder is a fibrotic disease and related condition, including systemic sclerosis, systemic idiopathic pulmonary fibrosis, and keloidal disease.

36. The method according to claim 33, wherein the TSLP mediated disease or disorder is chronic obstructive pulmonary disease, such as emphysema, chronic bronchitis, and refractory asthma.

37. The method according to claim 33, wherein the TSLP mediated disease or disorder is an inflammatory' disease, including rhinitis, atopic dermatitis, eczema, systemic sclerosis, food allergies, and inflammatory bowel disease.

38. The method according to claim 33, wherein the TSLP mediated disease or disorder is certain cancers, including lung, breast, pancreatic, colorectal, lymphoblastic leukemia, head and neck carcinomas.

39. The method according to claim 33, further comprising administering a second agent to the subject in need of treatment.

40. The method of claim 39, wherein the second agent is a selected from the group consisting of corticosteroid, bronchodilator, antihistamine, anti-leukotriene, PDE-4 inhibitor; anti-cancer drugs, immunomodulatory drugs, and cytokine therapy drugs.

* * * * *

SEQUENCE LISTING

```
<160> NUMBER OF SEQ ID NOS: 31

<210> SEQ ID NO 1
<211> LENGTH: 121
<212> TYPE: PRT
<213> ORGANISM: Mus musculus

<400> SEQUENCE: 1

Gln Val Gln Leu Gln Gln Ser Gly Ala Glu Leu Val Arg Pro Gly Ser
1               5                   10                  15

Ser Val Lys Ile Ser Cys Lys Ala Ser Gly Tyr Thr Phe Ser Ser Tyr
            20                  25                  30

Trp Val Asn Trp Val Lys Gln Arg Pro Gly Gln Gly Leu Glu Trp Ile
        35                  40                  45

Gly Gln Ile Tyr Pro Gly Asp Gly Asp Thr Asp Tyr Asn Gly Lys Phe
    50                  55                  60

Lys Gly Lys Ala Thr Leu Thr Ala Asp Lys Ser Ser Ser Thr Ala Tyr
65                  70                  75                  80

Met Gln Leu Ser Ser Leu Thr Ser Glu Asp Ser Ala Val Tyr Phe Cys
```

```
                85                  90                  95
Ala Arg Gly Thr Tyr Tyr Asn Asn Tyr Tyr Gly Thr Asp Tyr Trp Gly
                100                 105                 110
Gln Gly Thr Ser Val Thr Val Ser Ser
        115                 120

<210> SEQ ID NO 2
<211> LENGTH: 108
<212> TYPE: PRT
<213> ORGANISM: Mus musculus

<400> SEQUENCE: 2

Glu Ile Val Leu Thr Gln Ser Pro Ala Leu Met Ala Ala Ser Pro Gly
1               5                   10                  15
Glu Lys Val Thr Ile Thr Cys Ser Val Ser Ser Ile Ser Ser Ser
            20                  25                  30
Asn Leu His Trp Tyr Gln Gln Lys Ser Glu Thr Ser Pro Lys Pro Trp
        35                  40                  45
Ile Tyr Gly Thr Ser Asn Leu Ala Ser Gly Val Pro Val Arg Phe Ser
    50                  55                  60
Gly Ser Gly Ser Gly Thr Ser Tyr Ser Leu Thr Ile Ser Ser Met Glu
65                  70                  75                  80
Ala Glu Asp Ala Ala Thr Tyr Tyr Cys Gln Gln Trp Ser Ser Tyr Pro
                85                  90                  95
Leu Thr Phe Gly Gly Gly Thr Lys Leu Glu Ile Lys
                100                 105

<210> SEQ ID NO 3
<211> LENGTH: 10
<212> TYPE: PRT
<213> ORGANISM: Mus musculus

<400> SEQUENCE: 3

Gly Tyr Thr Phe Ser Ser Tyr Trp Val Asn
1               5                   10

<210> SEQ ID NO 4
<211> LENGTH: 10
<212> TYPE: PRT
<213> ORGANISM: Mus musculus

<400> SEQUENCE: 4

Gln Ile Tyr Pro Gly Asp Gly Asp Thr Asp
1               5                   10

<210> SEQ ID NO 5
<211> LENGTH: 12
<212> TYPE: PRT
<213> ORGANISM: Mus musculus

<400> SEQUENCE: 5

Gly Thr Tyr Tyr Asn Asn Tyr Tyr Gly Thr Asp Tyr
1               5                   10

<210> SEQ ID NO 6
<211> LENGTH: 12
<212> TYPE: PRT
<213> ORGANISM: Mus musculus

<400> SEQUENCE: 6

Ser Val Ser Ser Ser Ile Ser Ser Ser Asn Leu His
```

<210> SEQ ID NO 7
<211> LENGTH: 7
<212> TYPE: PRT
<213> ORGANISM: Mus musculus

<400> SEQUENCE: 7

Gly Thr Ser Asn Leu Ala Ser
1               5

<210> SEQ ID NO 8
<211> LENGTH: 9
<212> TYPE: PRT
<213> ORGANISM: Mus musculus

<400> SEQUENCE: 8

Gln Gln Trp Ser Ser Tyr Pro Leu Thr
1               5

<210> SEQ ID NO 9
<211> LENGTH: 121
<212> TYPE: PRT
<213> ORGANISM: Artificial Sequence
<220> FEATURE:
<223> OTHER INFORMATION: Humanized heavy chain variable region 202H2

<400> SEQUENCE: 9

Gln Val Gln Leu Val Gln Ser Gly Ala Glu Val Lys Lys Pro Gly Ser
1               5                   10                  15

Ser Val Lys Val Ser Cys Lys Ala Ser Gly Tyr Thr Phe Ser Ser Tyr
                20                  25                  30

Trp Val Asn Trp Val Arg Gln Ala Pro Gly Gln Gly Leu Glu Trp Ile
            35                  40                  45

Gly Gln Ile Tyr Pro Gly Asp Gly Asp Thr Asp Tyr Ala Gln Lys Phe
        50                  55                  60

Gln Gly Arg Ala Thr Leu Thr Ala Asp Lys Ser Thr Ser Thr Ala Tyr
65                  70                  75                  80

Met Glu Leu Ser Ser Leu Arg Ser Glu Asp Thr Ala Val Tyr Phe Cys
                85                  90                  95

Ala Arg Gly Thr Tyr Tyr Asn Asn Tyr Tyr Gly Thr Asp Tyr Trp Gly
                100                 105                 110

Gln Gly Thr Thr Val Thr Val Ser Ser
            115                 120

<210> SEQ ID NO 10
<211> LENGTH: 108
<212> TYPE: PRT
<213> ORGANISM: Artificial Sequence
<220> FEATURE:
<223> OTHER INFORMATION: Humanized light chain variable region 202L3

<400> SEQUENCE: 10

Asp Ile Gln Leu Thr Gln Ser Pro Ser Phe Leu Ser Ala Ser Val Gly
1               5                   10                  15

Asp Arg Val Thr Ile Thr Cys Ser Val Ser Ser Ser Ile Ser Ser Ser
                20                  25                  30

Asn Leu His Trp Tyr Gln Gln Lys Pro Gly Lys Ala Pro Lys Pro Trp
            35                  40                  45

Ile Tyr Gly Thr Ser Asn Leu Ala Ser Gly Val Pro Ser Arg Phe Ser
        50                  55                  60

```
Gly Ser Gly Ser Gly Thr Glu Tyr Thr Leu Thr Ile Ser Ser Leu Gln
 65                  70                  75                  80

Pro Glu Asp Ala Ala Thr Tyr Tyr Cys Gln Gln Trp Ser Ser Tyr Pro
                 85                  90                  95

Leu Thr Phe Gly Gln Gly Thr Lys Leu Glu Ile Lys
            100                 105
```

<210> SEQ ID NO 11
<211> LENGTH: 108
<212> TYPE: PRT
<213> ORGANISM: Artificial Sequence
<220> FEATURE:
<223> OTHER INFORMATION: Humanized light chain variable region 202L4

<400> SEQUENCE: 11

```
Glu Ile Val Leu Thr Gln Ser Pro Asp Phe Gln Ser Val Thr Pro Lys
  1               5                  10                  15

Glu Lys Val Thr Ile Thr Cys Ser Val Ser Ser Ile Ser Ser Ser
                 20                  25                  30

Asn Leu His Trp Tyr Gln Gln Lys Pro Asp Gln Ser Pro Lys Pro Trp
             35                  40                  45

Ile Tyr Gly Thr Ser Asn Leu Ala Ser Gly Val Pro Ser Arg Phe Ser
 50                  55                  60

Gly Ser Gly Ser Gly Thr Asp Tyr Thr Leu Thr Ile Asn Ser Leu Glu
 65                  70                  75                  80

Ala Glu Asp Ala Ala Thr Tyr Tyr Cys Gln Gln Trp Ser Ser Tyr Pro
                 85                  90                  95

Leu Thr Phe Gly Gln Gly Thr Lys Leu Glu Ile Lys
            100                 105
```

<210> SEQ ID NO 12
<211> LENGTH: 447
<212> TYPE: PRT
<213> ORGANISM: Artificial Sequence
<220> FEATURE:
<223> OTHER INFORMATION: Anti-TSLP humanized antibody Heavy Chain based
      on 202H2 with IgG2 Fc

<400> SEQUENCE: 12

```
Gln Val Gln Leu Val Gln Ser Gly Ala Glu Val Lys Lys Pro Gly Ser
  1               5                  10                  15

Ser Val Lys Val Ser Cys Lys Ala Ser Gly Tyr Thr Phe Ser Ser Tyr
                 20                  25                  30

Trp Val Asn Trp Val Arg Gln Ala Pro Gly Gln Gly Leu Glu Trp Ile
             35                  40                  45

Gly Gln Ile Tyr Pro Gly Asp Gly Asp Thr Asp Tyr Ala Gln Lys Phe
 50                  55                  60

Gln Gly Arg Ala Thr Leu Thr Ala Asp Lys Ser Thr Ser Thr Ala Tyr
 65                  70                  75                  80

Met Glu Leu Ser Ser Leu Arg Ser Glu Asp Thr Ala Val Tyr Phe Cys
                 85                  90                  95

Ala Arg Gly Thr Tyr Tyr Asn Asn Tyr Tyr Gly Thr Asp Tyr Trp Gly
            100                 105                 110

Gln Gly Thr Thr Val Thr Val Ser Ser Ala Ser Thr Lys Gly Pro Ser
            115                 120                 125

Val Phe Pro Leu Ala Pro Cys Ser Arg Ser Thr Ser Glu Ser Thr Ala
130                 135                 140
```

```
Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Asn Phe Gly Thr Gln Thr Tyr Thr Cys Asn Val Asp His
        195                 200                 205

Lys Pro Ser Asn Thr Lys Val Asp Lys Thr Val Glu Arg Lys Cys Cys
    210                 215                 220

Val Glu Cys Pro Pro Cys Pro Ala Pro Pro Val Ala Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser His Glu Asp Pro Glu
                260                 265                 270

Val Gln Phe Asn Trp Tyr Val Asp Gly Val Glu Val His Asn Ala Lys
            275                 280                 285

Thr Lys Pro Arg Glu Glu Gln Phe Asn Ser Thr Phe Arg Val Val Ser
        290                 295                 300

Val Leu Thr Val Val His Gln Asp Trp Leu Asn Gly Lys Glu Tyr Lys
305                 310                 315                 320

Cys Lys Val Ser Asn Lys Gly Leu Pro Ala Pro Ile Glu Lys Thr Ile
                325                 330                 335

Ser Lys Thr Lys Gly Gln Pro Arg Glu Pro Gln Val Tyr Thr Leu Pro
                340                 345                 350

Pro Ser Arg Glu Glu Met Thr Lys Asn Gln Val Ser Leu Thr Cys Leu
            355                 360                 365

Val Lys Gly Phe Tyr Pro Ser Asp Ile Ala Val Glu Trp Glu Ser Asn
370                 375                 380

Gly Gln Pro Glu Asn Asn Tyr Lys Thr Thr Pro Pro Met Leu Asp Ser
385                 390                 395                 400

Asp Gly Ser Phe Phe Leu Tyr Ser Lys Leu Thr Val Asp Lys Ser Arg
                405                 410                 415

Trp Gln Gln Gly Asn Val Phe Ser Cys Ser Val Met His Glu Ala Leu
                420                 425                 430

His Asn His Tyr Thr Gln Lys Ser Leu Ser Leu Ser Pro Gly Lys
            435                 440                 445

<210> SEQ ID NO 13
<211> LENGTH: 215
<212> TYPE: PRT
<213> ORGANISM: Artificial Sequence
<220> FEATURE:
<223> OTHER INFORMATION: Anti-TSLP humanized antibody Light Chain based
      on 202L3

<400> SEQUENCE: 13

Asp Ile Gln Leu Thr Gln Ser Pro Ser Phe Leu Ser Ala Ser Val Gly
1               5                   10                  15

Asp Arg Val Thr Ile Thr Cys Ser Val Ser Ser Ser Ile Ser Ser Ser
            20                  25                  30

Asn Leu His Trp Tyr Gln Gln Lys Pro Gly Lys Ala Pro Lys Pro Trp
        35                  40                  45

Ile Tyr Gly Thr Ser Asn Leu Ala Ser Gly Val Pro Ser Arg Phe Ser
    50                  55                  60
```

Gly Ser Gly Ser Gly Thr Glu Tyr Thr Leu Thr Ile Ser Ser Leu Gln
65                  70                  75                  80

Pro Glu Asp Ala Ala Thr Tyr Tyr Cys Gln Gln Trp Ser Ser Tyr Pro
                85                  90                  95

Leu Thr Phe Gly Gln Gly Thr Lys Leu Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 14
<211> LENGTH: 215
<212> TYPE: PRT
<213> ORGANISM: Artificial Sequence
<220> FEATURE:
<223> OTHER INFORMATION: Anti-TSLP humanized antibody Light Chain based
      on 202L4

<400> SEQUENCE: 14

Glu Ile Val Leu Thr Gln Ser Pro Asp Phe Gln Ser Val Thr Pro Lys
1               5                   10                  15

Glu Lys Val Thr Ile Thr Cys Ser Val Ser Ser Ser Ile Ser Ser Ser
            20                  25                  30

Asn Leu His Trp Tyr Gln Gln Lys Pro Asp Gln Ser Pro Lys Pro Trp
        35                  40                  45

Ile Tyr Gly Thr Ser Asn Leu Ala Ser Gly Val Pro Ser Arg Phe Ser
    50                  55                  60

Gly Ser Gly Ser Gly Thr Asp Tyr Thr Leu Thr Ile Asn Ser Leu Glu
65                  70                  75                  80

Ala Glu Asp Ala Ala Thr Tyr Tyr Cys Gln Gln Trp Ser Ser Tyr Pro
                85                  90                  95

Leu Thr Phe Gly Gln Gly Thr Lys Leu Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys

```
                195                 200                 205
Ser Phe Asn Arg Gly Glu Cys
    210                 215

<210> SEQ ID NO 15
<211> LENGTH: 451
<212> TYPE: PRT
<213> ORGANISM: Artificial Sequence
<220> FEATURE:
<223> OTHER INFORMATION: Anti-TSLP humanized antibody Heavy Chain based
      on 202H2 with IgG1 Fc with L234F, L235E, D265A, F405L mutations

<400> SEQUENCE: 15

Gln Val Gln Leu Val Gln Ser Gly Ala Glu Val Lys Lys Pro Gly Ser
1               5                   10                  15

Ser Val Lys Val Ser Cys Lys Ala Ser Gly Tyr Thr Phe Ser Ser Tyr
            20                  25                  30

Trp Val Asn Trp Val Arg Gln Ala Pro Gly Gln Gly Leu Glu Trp Ile
        35                  40                  45

Gly Gln Ile Tyr Pro Gly Asp Gly Asp Thr Asp Tyr Ala Gln Lys Phe
    50                  55                  60

Gln Gly Arg Ala Thr Leu Thr Ala Asp Lys Ser Thr Ser Thr Ala Tyr
65                  70                  75                  80

Met Glu Leu Ser Ser Leu Arg Ser Glu Asp Thr Ala Val Tyr Phe Cys
                85                  90                  95

Ala Arg Gly Thr Tyr Tyr Asn Asn Tyr Tyr Gly Thr Asp Tyr Trp Gly
            100                 105                 110

Gln Gly Thr Thr Val Thr Val Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
    210                 215                 220

Asp Lys Thr His Thr Cys Pro Pro Cys Pro Ala Pro Glu Phe Glu Gly
225                 230                 235                 240

Gly Pro Ser Val Phe Leu Phe Pro Pro Lys Pro Lys Asp Thr Leu Met
                245                 250                 255

Ile Ser Arg Thr Pro Glu Val Thr Cys Val Val Val Ala Val Ser His
            260                 265                 270

Glu Asp Pro Glu Val Lys Phe Asn Trp Tyr Val Asp Gly Val Glu Val
        275                 280                 285

His Asn Ala Lys Thr Lys Pro Arg Glu Glu Gln Tyr Asn Ser Thr Tyr
    290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Ala Leu Pro Ala Pro Ile
                325                 330                 335
```

```
Glu Lys Thr Ile Ser Lys Ala Lys Gly Gln Pro Arg Glu Pro Gln Val
            340                 345                 350

Tyr Thr Leu Pro Pro Ser Arg Glu Glu Met Thr Lys Asn Gln Val Ser
            355                 360                 365

Leu Thr Cys Leu Val Lys Gly Phe Tyr Pro Ser Asp Ile Ala Val Glu
        370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Leu Leu Tyr Ser Lys Leu Thr Val
                405                 410                 415

Asp Lys Ser Arg Trp Gln Gln Gly Asn Val Phe Ser Cys Ser Val Met
            420                 425                 430

His Glu Ala Leu His Asn His Tyr Thr Gln Lys Ser Leu Ser Leu Ser
            435                 440                 445

Pro Gly Lys
        450

<210> SEQ ID NO 16
<211> LENGTH: 451
<212> TYPE: PRT
<213> ORGANISM: Artificial Sequence
<220> FEATURE:
<223> OTHER INFORMATION: Anti-TSLP humanized antibody Heavy Chain based
      on 202H2 with IgG1 Fc with L234A, L235A, M428L, N434S mutations

<400> SEQUENCE: 16

Gln Val Gln Leu Val Gln Ser Gly Ala Glu Val Lys Lys Pro Gly Ser
1               5                   10                  15

Ser Val Lys Val Ser Cys Lys Ala Ser Gly Tyr Thr Phe Ser Ser Tyr
            20                  25                  30

Trp Val Asn Trp Val Arg Gln Ala Pro Gly Gln Gly Leu Glu Trp Ile
        35                  40                  45

Gly Gln Ile Tyr Pro Gly Asp Gly Asp Thr Asp Tyr Ala Gln Lys Phe
    50                  55                  60

Gln Gly Arg Ala Thr Leu Thr Ala Asp Lys Ser Thr Ser Thr Ala Tyr
65                  70                  75                  80

Met Glu Leu Ser Ser Leu Arg Ser Glu Asp Thr Ala Val Tyr Phe Cys
                85                  90                  95

Ala Arg Gly Thr Tyr Tyr Asn Asn Tyr Tyr Gly Thr Asp Tyr Trp Gly
            100                 105                 110

Gln Gly Thr Thr Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
    210                 215                 220

Asp Lys Thr His Thr Cys Pro Pro Cys Pro Ala Pro Glu Ala Ala Gly
225                 230                 235                 240
```

-continued

```
Gly Pro Ser Val Phe Leu Phe Pro Pro Lys Pro Lys Asp Thr Leu Met
            245                 250                 255

Ile Ser Arg Thr Pro Glu Val Thr Cys Val Val Val Asp Val Ser His
            260                 265                 270

Glu Asp Pro Glu Val Lys Phe Asn Trp Tyr Val Asp Gly Val Glu Val
            275                 280                 285

His Asn Ala Lys Thr Lys Pro Arg Glu Glu Gln Tyr Asn Ser Thr Tyr
            290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Ala Leu Pro Ala Pro Ile
            325                 330                 335

Glu Lys Thr Ile Ser Lys Ala Lys Gly Gln Pro Arg Glu Pro Gln Val
            340                 345                 350

Tyr Thr Leu Pro Pro Ser Arg Glu Glu Met Thr Lys Asn Gln Val Ser
            355                 360                 365

Leu Thr Cys Leu Val Lys Gly Phe Tyr Pro Ser Asp Ile Ala Val Glu
            370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Lys Leu Thr Val
            405                 410                 415

Asp Lys Ser Arg Trp Gln Gln Gly Asn Val Phe Ser Cys Ser Val Leu
            420                 425                 430

His Glu Ala Leu His Ser His Tyr Thr Gln Lys Ser Leu Ser Leu Ser
            435                 440                 445

Pro Gly Lys
    450

<210> SEQ ID NO 17
<211> LENGTH: 234
<212> TYPE: PRT
<213> ORGANISM: Artificial Sequence
<220> FEATURE:
<223> OTHER INFORMATION: IgG1 Fc

<400> SEQUENCE: 17

Lys Val Glu Pro Lys Ser Cys Asp Lys Thr His Thr Cys Pro Pro Cys
1               5                   10                  15

Pro Ala Pro Glu Leu Leu Gly Gly Pro Ser Val Phe Leu Phe Pro Pro
            20                  25                  30

Lys Pro Lys Asp Thr Leu Met Ile Ser Arg Thr Pro Glu Val Thr Cys
            35                  40                  45

Val Val Val Asp Val Ser His Glu Asp Pro Glu Val Lys Phe Asn Trp
    50                  55                  60

Tyr Val Asp Gly Val Glu Val His Asn Ala Lys Thr Lys Pro Arg Glu
65                  70                  75                  80

Glu Gln Tyr Asn Ser Thr Tyr Arg Val Val Ser Val Leu Thr Val Leu
            85                  90                  95

His Gln Asp Trp Leu Asn Gly Lys Glu Tyr Lys Cys Lys Val Ser Asn
            100                 105                 110

Lys Ala Leu Pro Ala Pro Ile Glu Lys Thr Ile Ser Lys Ala Lys Gly
            115                 120                 125

Gln Pro Arg Glu Pro Gln Val Tyr Thr Leu Pro Pro Ser Arg Asp Glu
            130                 135                 140
```

Leu Thr Lys Asn Gln Val Ser Leu Thr Cys Leu Val Lys Gly Phe Tyr
145                 150                 155                 160

Pro Ser Asp Ile Ala Val Glu Trp Glu Ser Asn Gly Gln Pro Glu Asn
                165                 170                 175

Asn Tyr Lys Thr Thr Pro Pro Val Leu Asp Ser Asp Gly Ser Phe Phe
            180                 185                 190

Leu Tyr Ser Lys Leu Thr Val Asp Lys Ser Arg Trp Gln Gln Gly Asn
        195                 200                 205

Val Phe Ser Cys Ser Val Met His Glu Ala Leu His Asn His Tyr Thr
    210                 215                 220

Gln Lys Ser Leu Ser Leu Ser Pro Gly Lys
225                 230

<210> SEQ ID NO 18
<211> LENGTH: 230
<212> TYPE: PRT
<213> ORGANISM: Artificial Sequence
<220> FEATURE:
<223> OTHER INFORMATION: IgG2 Fc

<400> SEQUENCE: 18

Thr Val Glu Arg Lys Cys Cys Val Glu Cys Pro Pro Cys Pro Ala Pro
1               5                   10                  15

Pro Val Ala Gly Pro Ser Val Phe Leu Phe Pro Pro Lys Pro Lys Asp
                20                  25                  30

Thr Leu Met Ile Ser Arg Thr Pro Glu Val Thr Cys Val Val Val Asp
            35                  40                  45

Val Ser His Glu Asp Pro Glu Val Gln Phe Asn Trp Tyr Val Asp Gly
    50                  55                  60

Val Glu Val His Asn Ala Lys Thr Lys Pro Arg Glu Glu Gln Phe Asn
65                  70                  75                  80

Ser Thr Phe Arg Val Val Ser Val Leu Thr Val Val His Gln Asp Trp
                85                  90                  95

Leu Asn Gly Lys Glu Tyr Lys Cys Lys Val Ser Asn Lys Gly Leu Pro
            100                 105                 110

Ala Pro Ile Glu Lys Thr Ile Ser Lys Thr Lys Gly Gln Pro Arg Glu
        115                 120                 125

Pro Gln Val Tyr Thr Leu Pro Pro Ser Arg Glu Glu Met Thr Lys Asn
    130                 135                 140

Gln Val Ser Leu Thr Cys Leu Val Lys Gly Phe Tyr Pro Ser Asp Ile
145                 150                 155                 160

Ala Val Glu Trp Glu Ser Asn Gly Gln Pro Glu Asn Asn Tyr Lys Thr
                165                 170                 175

Thr Pro Pro Met Leu Asp Ser Asp Gly Ser Phe Phe Leu Tyr Ser Lys
            180                 185                 190

Leu Thr Val Asp Lys Ser Arg Trp Gln Gln Gly Asn Val Phe Ser Cys
        195                 200                 205

Ser Val Met His Glu Ala Leu His Asn His Tyr Thr Gln Lys Ser Leu
    210                 215                 220

Ser Leu Ser Pro Gly Lys
225                 230

<210> SEQ ID NO 19
<211> LENGTH: 236
<212> TYPE: PRT
<213> ORGANISM: Artificial Sequence
<220> FEATURE:
<223> OTHER INFORMATION: IgG3 Fc

<400> SEQUENCE: 19

Arg Val Glu Leu Lys Thr Pro Leu Gly Asp Thr Thr His Thr Cys Pro
1               5                   10                  15

Pro Cys Pro Ala Pro Glu Leu Leu Gly Gly Pro Ser Val Phe Leu Phe
            20                  25                  30

Pro Pro Lys Pro Lys Asp Thr Leu Met Ile Ser Arg Thr Pro Glu Val
        35                  40                  45

Thr Cys Val Val Val Asp Val Ser His Glu Asp Pro Glu Val Lys Phe
    50                  55                  60

Asn Trp Tyr Val Asp Gly Val Glu Val His Asn Ala Lys Thr Lys Pro
65                  70                  75                  80

Arg Glu Glu Gln Tyr Asn Ser Thr Tyr Arg Val Val Ser Val Leu Thr
                85                  90                  95

Val Leu His Gln Asp Trp Leu Asn Gly Lys Glu Tyr Lys Cys Lys Val
            100                 105                 110

Ser Asn Lys Ala Leu Pro Ala Pro Ile Glu Lys Thr Ile Ser Lys Ala
        115                 120                 125

Lys Gly Gln Pro Arg Glu Pro Gln Val Tyr Thr Leu Pro Pro Ser Arg
    130                 135                 140

Asp Glu Leu Thr Lys Asn Gln Val Ser Leu Thr Cys Leu Val Lys Gly
145                 150                 155                 160

Phe Tyr Pro Ser Asp Ile Ala Val Glu Trp Glu Ser Asn Gly Gln Pro
                165                 170                 175

Glu Asn Asn Tyr Lys Thr Thr Pro Pro Val Leu Asp Ser Asp Gly Ser
            180                 185                 190

Phe Phe Leu Tyr Ser Lys Leu Thr Val Asp Lys Ser Arg Trp Gln Gln
        195                 200                 205

Gly Asn Val Phe Ser Cys Ser Val Met His Glu Ala Leu His Asn His
    210                 215                 220

Tyr Thr Gln Lys Ser Leu Ser Leu Ser Pro Gly Lys
225                 230                 235

<210> SEQ ID NO 20
<211> LENGTH: 231
<212> TYPE: PRT
<213> ORGANISM: Artificial Sequence
<220> FEATURE:
<223> OTHER INFORMATION: IgG4 Fc

<400> SEQUENCE: 20

Arg Val Glu Ser Lys Tyr Gly Pro Pro Cys Pro Ser Cys Pro Ala Pro
1               5                   10                  15

Glu Phe Leu Gly Gly Pro Ser Val Phe Leu Phe Pro Pro Lys Pro Lys
            20                  25                  30

Asp Thr Leu Met Ile Ser Arg Thr Pro Glu Val Thr Cys Val Val Val
        35                  40                  45

Asp Val Ser Gln Glu Asp Pro Glu Val Gln Phe Asn Trp Tyr Val Asp
    50                  55                  60

Gly Val Glu Val His Asn Ala Lys Thr Lys Pro Arg Glu Glu Gln Phe
65                  70                  75                  80

Asn Ser Thr Tyr Arg Val Val Ser Val Leu Thr Val Leu His Gln Asp
                85                  90                  95

Trp Leu Asn Gly Lys Glu Tyr Lys Cys Lys Val Ser Asn Lys Gly Leu

```
            100                 105                 110
Pro Ser Ser Ile Glu Lys Thr Ile Ser Lys Ala Lys Gly Gln Pro Arg
        115                 120                 125

Glu Pro Gln Val Tyr Thr Leu Pro Pro Ser Gln Glu Met Thr Lys
    130                 135                 140

Asn Gln Val Ser Leu Thr Cys Leu Val Lys Gly Phe Tyr Pro Ser Asp
145                 150                 155                 160

Ile Ala Val Glu Trp Glu Ser Asn Gly Gln Pro Glu Asn Asn Tyr Lys
            165                 170                 175

Thr Thr Pro Pro Val Leu Asp Ser Asp Gly Ser Phe Phe Leu Tyr Ser
        180                 185                 190

Arg Leu Thr Val Asp Lys Ser Arg Trp Gln Glu Gly Asn Val Phe Ser
    195                 200                 205

Cys Ser Val Met His Glu Ala Leu His Asn His Tyr Thr Gln Lys Ser
210                 215                 220

Leu Ser Leu Ser Leu Gly Lys
225                 230

<210> SEQ ID NO 21
<211> LENGTH: 234
<212> TYPE: PRT
<213> ORGANISM: Artificial Sequence
<220> FEATURE:
<223> OTHER INFORMATION: IgG1 Fc with M252Y/S254T/T256E mutations

<400> SEQUENCE: 21

Lys Val Glu Pro Lys Ser Cys Asp Lys Thr His Thr Cys Pro Pro Cys
1               5                   10                  15

Pro Ala Pro Glu Leu Leu Gly Gly Pro Ser Val Phe Leu Phe Pro Pro
            20                  25                  30

Lys Pro Lys Asp Thr Leu Tyr Ile Thr Arg Glu Pro Glu Val Thr Cys
        35                  40                  45

Val Val Val Asp Val Ser His Glu Asp Pro Glu Val Lys Phe Asn Trp
    50                  55                  60

Tyr Val Asp Gly Val Glu Val His Asn Ala Lys Thr Lys Pro Arg Glu
65                  70                  75                  80

Glu Gln Tyr Asn Ser Thr Tyr Arg Val Val Ser Val Leu Thr Val Leu
            85                  90                  95

His Gln Asp Trp Leu Asn Gly Lys Glu Tyr Lys Cys Lys Val Ser Asn
            100                 105                 110

Lys Ala Leu Pro Ala Pro Ile Glu Lys Thr Ile Ser Lys Ala Lys Gly
        115                 120                 125

Gln Pro Arg Glu Pro Gln Val Tyr Thr Leu Pro Pro Ser Arg Asp Glu
    130                 135                 140

Leu Thr Lys Asn Gln Val Ser Leu Thr Cys Leu Val Lys Gly Phe Tyr
145                 150                 155                 160

Pro Ser Asp Ile Ala Val Glu Trp Glu Ser Asn Gly Gln Pro Glu Asn
            165                 170                 175

Asn Tyr Lys Thr Thr Pro Pro Val Leu Asp Ser Asp Gly Ser Phe Phe
        180                 185                 190

Leu Tyr Ser Lys Leu Thr Val Asp Lys Ser Arg Trp Gln Gln Gly Asn
    195                 200                 205

Val Phe Ser Cys Ser Val Met His Glu Ala Leu His Asn His Tyr Thr
210                 215                 220

Gln Lys Ser Leu Ser Leu Ser Pro Gly Lys
```

<210> SEQ ID NO 22
<211> LENGTH: 234
<212> TYPE: PRT
<213> ORGANISM: Artificial Sequence
<220> FEATURE:
<223> OTHER INFORMATION: IgG1 Fc with M428L/N434S mutations

<400> SEQUENCE: 22

```
Lys Val Glu Pro Lys Ser Cys Asp Lys Thr His Thr Cys Pro Pro Cys
1               5                   10                  15

Pro Ala Pro Glu Leu Leu Gly Gly Pro Ser Val Phe Leu Phe Pro Pro
            20                  25                  30

Lys Pro Lys Asp Thr Leu Met Ile Ser Arg Thr Pro Glu Val Thr Cys
        35                  40                  45

Val Val Val Asp Val Ser His Glu Asp Pro Glu Val Lys Phe Asn Trp
    50                  55                  60

Tyr Val Asp Gly Val Glu Val His Asn Ala Lys Thr Lys Pro Arg Glu
65                  70                  75                  80

Glu Gln Tyr Asn Ser Thr Tyr Arg Val Val Ser Val Leu Thr Val Leu
                85                  90                  95

His Gln Asp Trp Leu Asn Gly Lys Glu Tyr Lys Cys Lys Val Ser Asn
            100                 105                 110

Lys Ala Leu Pro Ala Pro Ile Glu Lys Thr Ile Ser Lys Ala Lys Gly
        115                 120                 125

Gln Pro Arg Glu Pro Gln Val Tyr Thr Leu Pro Pro Ser Arg Asp Glu
    130                 135                 140

Leu Thr Lys Asn Gln Val Ser Leu Thr Cys Leu Val Lys Gly Phe Tyr
145                 150                 155                 160

Pro Ser Asp Ile Ala Val Glu Trp Glu Ser Asn Gly Gln Pro Glu Asn
                165                 170                 175

Asn Tyr Lys Thr Thr Pro Pro Val Leu Asp Ser Asp Gly Ser Phe Phe
            180                 185                 190

Leu Tyr Ser Lys Leu Thr Val Asp Lys Ser Arg Trp Gln Gln Gly Asn
        195                 200                 205

Val Phe Ser Cys Ser Val Leu His Glu Ala Leu His Ser His Tyr Thr
    210                 215                 220

Gln Lys Ser Leu Ser Leu Ser Pro Gly Lys
225                 230
```

<210> SEQ ID NO 23
<211> LENGTH: 234
<212> TYPE: PRT
<213> ORGANISM: Artificial Sequence
<220> FEATURE:
<223> OTHER INFORMATION: IgG1 Fc with T250Q/M428L mutations

<400> SEQUENCE: 23

```
Lys Val Glu Pro Lys Ser Cys Asp Lys Thr His Thr Cys Pro Pro Cys
1               5                   10                  15

Pro Ala Pro Glu Leu Leu Gly Gly Pro Ser Val Phe Leu Phe Pro Pro
            20                  25                  30

Lys Pro Lys Asp Gln Leu Met Ile Ser Arg Thr Pro Glu Val Thr Cys
        35                  40                  45

Val Val Val Asp Val Ser His Glu Asp Pro Glu Val Lys Phe Asn Trp
    50                  55                  60
```

Tyr Val Asp Gly Val Glu Val His Asn Ala Lys Thr Lys Pro Arg Glu
65                  70                  75                  80

Glu Gln Tyr Asn Ser Thr Tyr Arg Val Val Ser Val Leu Thr Val Leu
                85                  90                  95

His Gln Asp Trp Leu Asn Gly Lys Glu Tyr Lys Cys Lys Val Ser Asn
            100                 105                 110

Lys Ala Leu Pro Ala Pro Ile Glu Lys Thr Ile Ser Lys Ala Lys Gly
        115                 120                 125

Gln Pro Arg Glu Pro Gln Val Tyr Thr Leu Pro Ser Arg Asp Glu
    130                 135                 140

Leu Thr Lys Asn Gln Val Ser Leu Thr Cys Leu Val Lys Gly Phe Tyr
145                 150                 155                 160

Pro Ser Asp Ile Ala Val Glu Trp Glu Ser Asn Gly Gln Pro Glu Asn
                165                 170                 175

Asn Tyr Lys Thr Thr Pro Pro Val Leu Asp Ser Asp Gly Ser Phe Phe
            180                 185                 190

Leu Tyr Ser Lys Leu Thr Val Asp Lys Ser Arg Trp Gln Gln Gly Asn
        195                 200                 205

Val Phe Ser Cys Ser Val Leu His Glu Ala Leu His Asn His Tyr Thr
210                 215                 220

Gln Lys Ser Leu Ser Leu Ser Pro Gly Lys
225                 230

<210> SEQ ID NO 24
<211> LENGTH: 234
<212> TYPE: PRT
<213> ORGANISM: Artificial Sequence
<220> FEATURE:
<223> OTHER INFORMATION: IgG1 Fc with N434A mutations

<400> SEQUENCE: 24

Lys Val Glu Pro Lys Ser Cys Asp Lys Thr His Thr Cys Pro Pro Cys
1               5                   10                  15

Pro Ala Pro Glu Leu Leu Gly Gly Pro Ser Val Phe Leu Phe Pro Pro
                20                  25                  30

Lys Pro Lys Asp Thr Leu Met Ile Ser Arg Thr Pro Glu Val Thr Cys
            35                  40                  45

Val Val Val Asp Val Ser His Glu Asp Pro Glu Val Lys Phe Asn Trp
        50                  55                  60

Tyr Val Asp Gly Val Glu Val His Asn Ala Lys Thr Lys Pro Arg Glu
65                  70                  75                  80

Glu Gln Tyr Asn Ser Thr Tyr Arg Val Val Ser Val Leu Thr Val Leu
                85                  90                  95

His Gln Asp Trp Leu Asn Gly Lys Glu Tyr Lys Cys Lys Val Ser Asn
            100                 105                 110

Lys Ala Leu Pro Ala Pro Ile Glu Lys Thr Ile Ser Lys Ala Lys Gly
        115                 120                 125

Gln Pro Arg Glu Pro Gln Val Tyr Thr Leu Pro Ser Arg Asp Glu
    130                 135                 140

Leu Thr Lys Asn Gln Val Ser Leu Thr Cys Leu Val Lys Gly Phe Tyr
145                 150                 155                 160

Pro Ser Asp Ile Ala Val Glu Trp Glu Ser Asn Gly Gln Pro Glu Asn
                165                 170                 175

Asn Tyr Lys Thr Thr Pro Pro Val Leu Asp Ser Asp Gly Ser Phe Phe
            180                 185                 190

Leu Tyr Ser Lys Leu Thr Val Asp Lys Ser Arg Trp Gln Gln Gly Asn
            195                 200                 205

Val Phe Ser Cys Ser Val Met His Glu Ala Leu His Ala His Tyr Thr
    210                 215                 220

Gln Lys Ser Leu Ser Leu Ser Pro Gly Lys
225                 230

<210> SEQ ID NO 25
<211> LENGTH: 234
<212> TYPE: PRT
<213> ORGANISM: Artificial Sequence
<220> FEATURE:
<223> OTHER INFORMATION: IgG1 Fc with T307A/E380A/N434A mutations

<400> SEQUENCE: 25

Lys Val Glu Pro Lys Ser Cys Asp Lys Thr His Thr Cys Pro Pro Cys
1               5                   10                  15

Pro Ala Pro Glu Leu Leu Gly Gly Pro Ser Val Phe Leu Phe Pro Pro
            20                  25                  30

Lys Pro Lys Asp Thr Leu Met Ile Ser Arg Thr Pro Glu Val Thr Cys
        35                  40                  45

Val Val Val Asp Val Ser His Glu Asp Pro Glu Val Lys Phe Asn Trp
    50                  55                  60

Tyr Val Asp Gly Val Glu Val His Asn Ala Lys Thr Lys Pro Arg Glu
65                  70                  75                  80

Glu Gln Tyr Asn Ser Thr Tyr Arg Val Val Ser Val Leu Ala Val Leu
                85                  90                  95

His Gln Asp Trp Leu Asn Gly Lys Glu Tyr Lys Cys Lys Val Ser Asn
            100                 105                 110

Lys Ala Leu Pro Ala Pro Ile Glu Lys Thr Ile Ser Lys Ala Lys Gly
        115                 120                 125

Gln Pro Arg Glu Pro Gln Val Tyr Thr Leu Pro Pro Ser Arg Asp Glu
    130                 135                 140

Leu Thr Lys Asn Gln Val Ser Leu Thr Cys Leu Val Lys Gly Phe Tyr
145                 150                 155                 160

Pro Ser Asp Ile Ala Val Ala Trp Glu Ser Asn Gly Gln Pro Glu Asn
                165                 170                 175

Asn Tyr Lys Thr Thr Pro Pro Val Leu Asp Ser Asp Gly Ser Phe Phe
            180                 185                 190

Leu Tyr Ser Lys Leu Thr Val Asp Lys Ser Arg Trp Gln Gln Gly Asn
        195                 200                 205

Val Phe Ser Cys Ser Val Met His Glu Ala Leu His Ala His Tyr Thr
    210                 215                 220

Gln Lys Ser Leu Ser Leu Ser Pro Gly Lys
225                 230

<210> SEQ ID NO 26
<211> LENGTH: 233
<212> TYPE: PRT
<213> ORGANISM: Artificial Sequence
<220> FEATURE:
<223> OTHER INFORMATION: IgG1 Fc with E233P/L234V/L235A mutations and
      G236 deleted

<400> SEQUENCE: 26

Lys Val Glu Pro Lys Ser Cys Asp Lys Thr His Thr Cys Pro Pro Cys
1               5                   10                  15

Pro Ala Pro Pro Val Ala Gly Pro Ser Val Phe Leu Phe Pro Pro Lys

```
                     20                  25                  30
Pro Lys Asp Thr Leu Met Ile Ser Arg Thr Pro Glu Val Thr Cys Val
            35                  40                  45
Val Val Asp Val Ser His Glu Asp Pro Glu Val Lys Phe Asn Trp Tyr
50                  55                  60
Val Asp Gly Val Glu Val His Asn Ala Lys Thr Lys Pro Arg Glu Glu
65                  70                  75                  80
Gln Tyr Asn Ser Thr Tyr Arg Val Val Ser Val Leu Thr Val Leu His
                85                  90                  95
Gln Asp Trp Leu Asn Gly Lys Glu Tyr Lys Cys Lys Val Ser Asn Lys
            100                 105                 110
Ala Leu Pro Ala Pro Ile Glu Lys Thr Ile Ser Lys Ala Lys Gly Gln
        115                 120                 125
Pro Arg Glu Pro Gln Val Tyr Thr Leu Pro Pro Ser Arg Asp Glu Leu
    130                 135                 140
Thr Lys Asn Gln Val Ser Leu Thr Cys Leu Val Lys Gly Phe Tyr Pro
145                 150                 155                 160
Ser Asp Ile Ala Val Glu Trp Glu Ser Asn Gly Gln Pro Glu Asn Asn
                165                 170                 175
Tyr Lys Thr Thr Pro Pro Val Leu Asp Ser Asp Gly Ser Phe Phe Leu
            180                 185                 190
Tyr Ser Lys Leu Thr Val Asp Lys Ser Arg Trp Gln Gln Gly Asn Val
        195                 200                 205
Phe Ser Cys Ser Val Met His Glu Ala Leu His Asn His Tyr Thr Gln
    210                 215                 220
Lys Ser Leu Ser Leu Ser Pro Gly Lys
225                 230

<210> SEQ ID NO 27
<211> LENGTH: 1341
<212> TYPE: DNA
<213> ORGANISM: Artificial Sequence
<220> FEATURE:
<223> OTHER INFORMATION: nti-TSLP humanized antibody heavy chain based
      on 202H2 with IgG2 Fc

<400> SEQUENCE: 27
caagtgcagc tggtgcagtc cggagccgag gtgaagaagc ccggctccag cgtgaaggtg     60
agctgcaaag cctccggcta caccttcagc agctactggg tgaactgggt cagacaagcc    120
cccggccaag actggagtg gattggccag atctatcccg gcgacggcga caccgattac    180
gcccagaagt tccaaggcag agccacactg accgccgaca gtccaccag caccgcctac    240 atggagctga gctctctgag gagcgaggat accgccgtgt acttctgcgc tagaggcacc    300
tactacaaca ctactacgg caccgactac tggggccaag gcaccaccgt gaccgtgagc    360
agcgccagca ccaagggccc atccgtcttc cccctggccc cttgctccag aagcacctcc    420
gagagcacag ccgccctcgg atgtctggtg aaagactact cccccgagcc tgtgaccgtg    480
agctggaaca gcggcgccct gacaagcggc gtgcatacct tcctgccgt gctgcagagc    540 agcggcctgt actccctgtc cagcgtggtg accgtgccca gcagcaattt cggcacccag    600
acctacacct gtaacgtgga tcacaagccc tccaacacca agtggacaa gaccgtggag    660 aggaagtgct gtgtggaatg ccccccttgt cctgccccctc cgtggctgg ccccagcgtg    720 ttcctcttcc ctcccaagcc caaggacacc ctcatgatca gcagaacacc cgaggtgacc    780
tgcgtcgtgg tggacgtgtc ccacgaggac cccgaggtgc agttcaactg gtacgtggac    840
```

```
ggcgtggagg tgcacaacgc aagaccaag cccagggagg agcagttcaa ttccaccttc    900
agggtggtga gcgtgctgac cgtggtgcac caggactggc tgaacggcaa ggagtacaag    960
tgcaaggtga gcaacaaggg cctgcccgcc cccatcgaaa agaccatttc caaaaccaaa   1020
ggccagccca gggagcccca ggtgtacaca ctgcccccca gcagagagga gatgacaaag   1080
aaccaggtga gcctgacatg cctggtgaag ggcttttacc ctagcgacat cgctgtggag   1140
tgggagagca cggccagcc cgagaacaac tacaagacaa cccctcccat gctggattcc   1200
gatggctcct tcttcctgta ctccaagctg accgtggaca gagcaggtg gcagcagggc   1260 aacgtgttct cctgttccgt gatgcatgag gccctgcaca accactacac ccagaagtcc   1320
ctgagcctga gccccggcaa g                                            1341
```

```
<210> SEQ ID NO 28
<211> LENGTH: 645
<212> TYPE: DNA
<213> ORGANISM: Artificial Sequence
<220> FEATURE:
<223> OTHER INFORMATION: anti-TSLP humanized antibody light chain based
      on 202L3

<400> SEQUENCE: 28
gatatccagc tgacccagag ccccagcttt ctgagcgcta gcgtgggaga cagagtgacc     60
atcacatgca gcgtgtccag cagcatcagc agcagcaatc tgcactggta ccagcagaag    120
cccggcaagg cccccaagcc ttggatctac ggaaccagca atctggccag cggcgtgcct    180
agcagatttt ccggatccgg aagcggcacc gagtacacac tgaccatcag ctctctgcag    240
cccgaagacg ccgctaccta ctactgccag cagtggagca gctaccctct gaccttcggc    300
caaggcacca gctggagat caagcgtacg gtggctgcac catctgtctt catcttcccg    360
ccatctgatg agcagttgaa atctggaact gcctctgttg tgtgcctgct gaataacttc    420
tatcccagag aggccaaagt acagtggaag gtggataacg ccctccaatc gggtaactcc    480
caggagagtg tcacagagca ggacagcaag gacagcacct acagcctcag cagcaccctg    540
acgctgagca agcagacta cgagaaacac aaagtctacg cctgcgaagt cacccatcag    600
ggcctgagct cgcccgtcac aaagagcttc aacaggggag agtgt                   645
```

```
<210> SEQ ID NO 29
<211> LENGTH: 645
<212> TYPE: DNA
<213> ORGANISM: Artificial Sequence
<220> FEATURE:
<223> OTHER INFORMATION: anti-TSLP humanized antibody light chain based
      on 202L4

<400> SEQUENCE: 29
gagatcgtgc tgacccagag ccccgatttc cagtccgtga cccccaagga aaggtgacc     60 attacatgct ccgtgagcag cagcatcagc agcagcaatc tgcactggta ccagcagaag    120
cccgatcaga gccccaagcc ttggatttac ggcacaagca atctggccag cggagtgccc    180
tccagattca gcggcagcgg aagcggcacc gactacacac tgaccatcaa ctctctggag    240
gccgaggatg ccgccaccta ctactgccag cagtggagca gctaccctct gaccttcggc    300
caaggcacca gctggaaat caagcgtacg gtggctgcac catctgtctt catcttcccg    360
ccatctgatg agcagttgaa atctggaact gcctctgttg tgtgcctgct gaataacttc    420
tatcccagag aggccaaagt acagtggaag gtggataacg ccctccaatc gggtaactcc    480
```

```
caggagagtg tcacagagca ggacagcaag gacagcacct acagcctcag cagcaccctg    540
acgctgagca aagcagacta cgagaaacac aaagtctacg cctgcgaagt cacccatcag    600
ggcctgagct cgcccgtcac aaagagcttc aacaggggag agtgt                    645

<210> SEQ ID NO 30
<211> LENGTH: 159
<212> TYPE: PRT
<213> ORGANISM: Homo sapiens

<400> SEQUENCE: 30

Met Phe Pro Phe Ala Leu Leu Tyr Val Leu Ser Val Ser Phe Arg Lys
1               5                   10                  15

Ile Phe Ile Leu Gln Leu Val Gly Leu Val Leu Thr Tyr Asp Phe Thr
            20                  25                  30

Asn Cys Asp Phe Glu Lys Ile Lys Ala Ala Tyr Leu Ser Thr Ile Ser
        35                  40                  45

Lys Asp Leu Ile Thr Tyr Met Ser Gly Thr Lys Ser Thr Glu Phe Asn
50                  55                  60

Asn Thr Val Ser Cys Ser Asn Arg Pro His Cys Leu Thr Glu Ile Gln
65                  70                  75                  80

Ser Leu Thr Phe Asn Pro Thr Ala Gly Cys Ala Ser Leu Ala Lys Glu
                85                  90                  95

Met Phe Ala Met Lys Thr Lys Ala Ala Leu Ala Ile Trp Cys Pro Gly
            100                 105                 110

Tyr Ser Glu Thr Gln Ile Asn Ala Thr Gln Ala Met Lys Lys Arg Arg
        115                 120                 125

Lys Arg Lys Val Thr Thr Asn Lys Cys Leu Glu Gln Val Ser Gln Leu
130                 135                 140

Gln Gly Leu Trp Arg Arg Phe Asn Arg Pro Leu Leu Lys Gln Gln
145                 150                 155

<210> SEQ ID NO 31
<211> LENGTH: 63
<212> TYPE: PRT
<213> ORGANISM: Homo sapiens

<400> SEQUENCE: 31

Met Phe Ala Met Lys Thr Lys Ala Ala Leu Ala Ile Trp Cys Pro Gly
1               5                   10                  15

Tyr Ser Glu Thr Gln Ile Asn Ala Thr Gln Ala Met Lys Lys Arg Arg
            20                  25                  30

Lys Arg Lys Val Thr Thr Asn Lys Cys Leu Glu Gln Val Ser Gln Leu
        35                  40                  45

Gln Gly Leu Trp Arg Arg Phe Asn Arg Pro Leu Leu Lys Gln Gln
50                  55                  60
```